(12) United States Patent  
Chaudhri et al.

(10) Patent No.: US 8,621,393 B2  
(45) Date of Patent: Dec. 31, 2013

(54) MULTIMEDIA CONTROL CENTER

(75) Inventors: Imran Chaudhri, San Francisco, CA (US); Thomas Madden, Redwood City, CA (US); Scott Forstall, Mountain View, CA (US); Duncan Robert Kerr, San Francisco, CA (US); Nick King, San Jose, CA (US); Stephen O. Lemay, San Francisco, CA (US); Richard W. Fabrick, II, Campbell, CA (US); Bas Ording, San Francisco, CA (US); Eric Seymour, San Jose, CA (US); Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 13/134,245

(22) Filed: Jun. 2, 2011

(65) Prior Publication Data

US 2011/0243525 A1  Oct. 6, 2011

Related U.S. Application Data

(62) Division of application No. 11/249,139, filed on Oct. 11, 2005, now Pat. No. 7,966,577.

(60) Provisional application No. 60/724,622, filed on Oct. 7, 2005, provisional application No. 60/725,544, filed on Oct. 10, 2005.

(51) Int. Cl.  
*G06F 3/048* (2013.01)

(52) U.S. Cl.  
USPC ............ 715/835; 715/810; 715/823; 715/765

(58) Field of Classification Search  
USPC ......... 715/764, 765, 810, 811, 815, 835, 838, 715/839, 823  
See application file for complete search history.

(56) References Cited

U.S. PATENT DOCUMENTS

| | | | |
|---|---|---|---|
| 4,847,781 A | 7/1989 | Brown et al. | |
| 5,555,354 A | 9/1996 | Strasnick et al. | |
| 5,835,094 A * | 11/1998 | Ermel et al. | 715/848 |
| 5,838,326 A | 11/1998 | Card et al. | |
| 6,005,601 A * | 12/1999 | Ohkura et al. | 725/52 |
| 6,064,380 A | 5/2000 | Swenson et al. | |
| 6,088,032 A * | 7/2000 | Mackinlay | 715/848 |
| 6,201,540 B1 * | 3/2001 | Gallup et al. | 715/764 |
| 6,236,398 B1 * | 5/2001 | Kojima et al. | 345/419 |
| 6,262,724 B1 | 7/2001 | Crow et al. | |
| 6,295,062 B1 | 9/2001 | Tada et al. | |
| 6,448,987 B1 | 9/2002 | Easty et al. | |
| 6,654,030 B1 | 11/2003 | Hui | |
| 6,868,225 B1 | 3/2005 | Brown et al. | |

(Continued)

OTHER PUBLICATIONS

"U.S. Appl. No. 12/778,038, Advisory Action mailed Sep. 4, 2012", 4 pgs.

(Continued)

*Primary Examiner* — Xiomar L Bautista  
(74) *Attorney, Agent, or Firm* — Schwegman Lundberg & Woessner, P.A.

(57) ABSTRACT

Techniques and systems for centralized access to multimedia content stored on or available to a computing device are disclosed. The centralized access can be provided by a media control interface that receives user inputs and interacts with media programs resident on the computing device to produce graphical user interfaces that can be presented on a display device.

13 Claims, 47 Drawing Sheets

(56) References Cited

U.S. PATENT DOCUMENTS

| | | | |
|---|---|---|---|
| 6,876,729 B1 | 4/2005 | Kuter | |
| 6,889,001 B1 | 5/2005 | Nikaido et al. | |
| 6,914,551 B2 | 7/2005 | Vidal | |
| 6,990,671 B1 | 1/2006 | Evans et al. | |
| 7,032,177 B2 | 4/2006 | Novak et al. | |
| 7,096,431 B2 | 8/2006 | Tambata et al. | |
| 7,205,471 B2 | 4/2007 | Looney et al. | |
| 7,721,208 B2 | 5/2010 | Madden | |
| 7,966,577 B2 | 6/2011 | Chaudhri et al. | |
| 2001/0050690 A1* | 12/2001 | Giles et al. | 345/636 |
| 2002/0091662 A1 | 7/2002 | Bogia | |
| 2002/0196266 A1 | 12/2002 | Mou et al. | |
| 2003/0016951 A1 | 1/2003 | Jakel et al. | |
| 2004/0047588 A1 | 3/2004 | Okada et al. | |
| 2004/0056837 A1 | 3/2004 | Koga et al. | |
| 2004/0080537 A1* | 4/2004 | Adler | 345/764 |
| 2004/0155907 A1 | 8/2004 | Yamaguchi et al. | |
| 2004/0162845 A1 | 8/2004 | Kim et al. | |
| 2004/0223737 A1 | 11/2004 | Johnson | |
| 2005/0027539 A1 | 2/2005 | Weber et al. | |
| 2005/0060666 A1 | 3/2005 | Hoshino et al. | |
| 2005/0132055 A1 | 6/2005 | Neogi | |
| 2005/0138664 A1 | 6/2005 | Neogi | |
| 2005/0155077 A1 | 7/2005 | Lawrence et al. | |
| 2005/0198574 A1 | 9/2005 | Lamkin et al. | |
| 2006/0001645 A1 | 1/2006 | Drucker et al. | |
| 2006/0025920 A1* | 2/2006 | Nezu et al. | 701/200 |
| 2006/0036959 A1 | 2/2006 | Heatherly et al. | |
| 2006/0059426 A1 | 3/2006 | Ogikubo | |
| 2006/0064720 A1 | 3/2006 | Istvan et al. | |
| 2006/0095865 A1 | 5/2006 | Rostom | |
| 2006/0143327 A1 | 6/2006 | Hsieh et al. | |
| 2006/0156246 A1 | 7/2006 | Williams et al. | |
| 2006/0206428 A1 | 9/2006 | Vidos | |
| 2006/0206779 A1 | 9/2006 | Wehn et al. | |
| 2007/0016860 A1 | 1/2007 | Lim | |
| 2007/0028267 A1 | 2/2007 | Ostojic et al. | |
| 2007/0070066 A1* | 3/2007 | Bakhash | 345/419 |
| 2007/0080823 A1 | 4/2007 | Fu | |
| 2007/0083616 A1 | 4/2007 | Madden | |
| 2007/0083911 A1 | 4/2007 | Madden et al. | |
| 2007/0101364 A1 | 5/2007 | Morita | |
| 2007/0157095 A1 | 7/2007 | Bilow et al. | |
| 2007/0169115 A1 | 7/2007 | Ko et al. | |
| 2007/0189737 A1 | 8/2007 | Chaudhri et al. | |
| 2010/0223553 A1 | 9/2010 | Madden | |

OTHER PUBLICATIONS

"Application software," Wikipedia, the free encyclopedia, http://en.wikipedia.org/wiki/Application_software, 3 pages, May 22, 2006.
"Digital audio," Wikipedia, the free encyclopedia, http://en.wikipedia.org/wiki/Digital_audio, 3 pages, May 25, 2006.
"Digital Media," Wikipedia, the free encyclopedia, http://en.wikipedia.org/wiki/Digital_Media, 2 pages.
"Digital video," Wikipedia, the free encyclopedia, http://en.wikipedia.org/wiki/Digital_video, 3 pages, May 6, 2006.
'ITunes," Wikipedia, the free encyclopedia, http://en.wikipedia.org/wiki/ITunes, 11 pages, May 22, 2006.
"Media player," Wikipedia, the free encyclopedia, http://en.wikipedia.org/wiki/Media_player, 1 page, May 20, 2006.
"Multimedia," Wikipedia, the free encyclopedia, http://en.wikipedia.org/wiki/Multimedia, 2 pages, May 25, 2006.
Microsoft, Windows XP Media Center Edition, First released: Jan. 2002—Last released: Nov. 2004, An article summarizing the program is provied in lieu of the actual software itself.
"Windows XP Media Center Edition", http://en.wikipedia.org/wiki/Windows_XP_Media_Center_Edition, downloaded Sep. 27, 2005, pp. 1-5.
Microsoft Windows XP for Home Users Service Pack 2 Edition, Jul. 7, 2005, Peachpit Press, 13 pages.
Ralph LaBarge, DVD Authoring & Production, 2001, Focal Press, pp. 113 and 252.
Salling Clicker 2.2.1, User Manual, Salling Software AB, 2005.
Remote for iTunes (URM-15T), product information datasheet, Keyspan, http://www.keyspan.com/products/usb/urm15t, dowloaded Sep. 25, 2005. pp. 1-2.
Express Remote (URM-17A), product information datasheet, Keyspan, http://www.keyspan.com/products/usb/urm15t, downloaded Sep. 25, 2005. pp. 1-2.
"Keyspan Express Remote Supports Apple's Airport Express," Press Relase, Keyspan, Nov. 10, 2004.
"Keyspan Express Remote", Product Fact Sheet, Keyspan, published Sep. 25, 2005.
Keyspan: DMR Software v. 1.3 for Mac OS.X User Manuar rev. 04.09.01A, published 1998.
Doom9 What's on a DVD, Apr. 28, 2001, http://web.archive.org/web/20010428123010/http://www.doom9.org/dvd-structure.htm.
DVD Authoring Terminology, Feb. 19, 2004, http://web.archive.org/web/20040219211732/http://www.mainfest-tech.com/links/dvd_terms.htm.
"U.S. Appl. No. 11/247,975, Advisory Action mailed Oct. 14, 2009", 3 pgs.
"U.S. Appl. No. 11/247,975, Advisory Action mailed Nov. 25, 2008", 3 pgs.
"U.S. Appl. No. 11/247,975, Final Office Action mailed Jul. 31, 2009", 17 pgs.
"U.S. Appl. No. 11/247,975, Final Office Action mailed Sep. 16, 2008", 14 pgs.
"U.S. Appl. No. 11/247,975, Non Final Office Action mailed Feb. 10, 2009", 16 pgs.
"U.S. Appl. No. 11/247,975, Non Final Office Action mailed Mar. 20, 2008", 18 pgs.
"U.S. Appl. No. 11/247,975, Notice of Allowance mailed Jan. 7, 2010", 12 pgs.
"U.S. Appl. No. 11/247,975, Preliminary Amendment filed Jan. 17, 2006", 3 pgs.
"U.S. Appl. No. 11/247,975, Response filed May 11, 2009 to Non Final Office Action mailed Feb. 10, 2009", 13 pgs.
"U.S. Appl. No. 11/247,975, Response filed Jun. 17, 2008 to Non Final Office Action mailed Mar. 20, 2008", 15 pgs.
"U.S. Appl. No. 11/247,975, Response filed Sep. 30, 2009 to Final Office Action mailed Jul. 31, 2009", 12 pgs.
"U.S. Appl. No. 11/247,975, Response filed Oct. 30, 2009 to Advisory Action mailed Oct. 14, 2009", 13 pgs.
"U.S. Appl. No. 11/247,975, Response filed Nov. 14, 2008 to Final Office Action mailed Sep. 16, 2008", 13 pgs.
"U.S. Appl. No. 11/249,032, Appeal Brief filed Sep. 20, 2010", 39 pgs.
"U.S. Appl. No. 11/249,032, Decision on Pre-Appeal Brief Request mailed Aug. 19, 2010", 2 pgs.
"U.S. Appl. No. 11/249,032, Examiner Interview Summary mailed Jul. 14, 2009", 2 pgs.
"U.S. Appl. No. 11/249,032, Examiner's Answer to Appeal Brief mailed Dec. 8, 2010", 35 pgs.
"U.S. Appl. No. 11/249,032, Final Office Action mailed Apr. 1, 2010", 21 pgs.
"U.S. Appl. No. 11/249,032, Final Office Action mailed May 12, 2009", 20 pgs.
"U.S. Appl. No. 11/249,032, Non Final Office Action mailed Oct. 1, 2008", 18 pgs.
"U.S. Appl. No. 11/249,032, Non Final Office Action mailed Oct. 14, 2009", 20 pgs.
"U.S. Appl. No. 11/249,032, Preliminary Amendment filed May 5, 2006", 7 pgs.
"U.S. Appl. No. 11/249,032, Reply Brief filed Feb. 8, 2011", 15 pgs.
"U.S. Appl. No. 11/249,032, Response filed Jan. 2, 2009 to Non Final Office Action mailed Oct. 1, 2008", 19 pgs.
"U.S. Appl. No. 11/249,032, Response filed Jan. 14, 2010 to Non Final Office Action mailed Oct. 14, 2009", 12 pgs.
"U.S. Appl. No. 11/249,032, Response filed Jul. 31, 2009 to Final Office Action mailed May 12, 2009", 12 pgs.
"U.S. Appl. No. 11/249,139, 312 Amendment filed Apr. 26, 2011", 8 pgs.
"U.S. Appl. No. 11/249,139, Final Office Action mailed Oct. 27, 2010", 12 pgs.

(56) References Cited

OTHER PUBLICATIONS

"U.S. Appl. No. 11/249,139, Non Final Office Action mailed Jul. 16, 2010", 10 pgs.

"U.S. Appl. No. 11/249,139, Notice of Allowance mailed Feb. 18, 2011", 12 pgs.

"U.S. Appl. No. 11/249,139, Preliminary Amendment filed Jun. 12, 2006", 8 pgs.

"U.S. Appl. No. 11/249,139, PTO Response to 312 Communication mailed Apr. 29, 2011", 2 pgs.

"U.S. Appl. No. 11/249,139, Response filed Jan. 27, 2011 to Final Office Action mailed Oct. 27, 2010", 11 pgs.

"U.S. Appl. No. 11/249,139, Response filed May 13, 2010 to Restriction Requirement mailed Apr. 13, 2010", 1 pg.

"U.S. Appl. No. 11/249,139, Response filed Oct. 18, 2010 to Non Final Office Action mailed Jul. 16, 2010", 12 pgs.

"U.S. Appl. No. 11/249,139, Restriction Requirement mailed Apr. 13, 2010", 5 pgs.

"U.S. Appl. No. 12/083,954, Notice of Allowance mailed Jan. 7, 2010", 12 pgs.

"U.S. Appl. No. 12/778,038, Advisory Action mailed Oct. 14, 2009", 3 pgs.

"U.S. Appl. No. 12/778,038, Advisory Action mailed Nov. 25, 2008", 3 pgs.

"U.S. Appl. No. 12/778,038, Final Office Action mailed May 14, 2012", 15 pgs.

"U.S. Appl. No. 12/778,038, Non Final Office Action mailed Jan. 18, 2012", 15 pgs.

"U.S. Appl. No. 12/778,038, Non Final Office Action mailed Feb. 10, 2009", 16 pgs.

"U.S. Appl. No. 12/778,038, Response filed Apr. 13, 2012 to Non Final Office Action mailed Jan. 18, 2012", 14 pgs.

"U.S. Appl. No. 12/778,038, Response filed Aug. 24, 2012 to Final Office Action mailed May 14, 2012", 12 pgs.

* cited by examiner

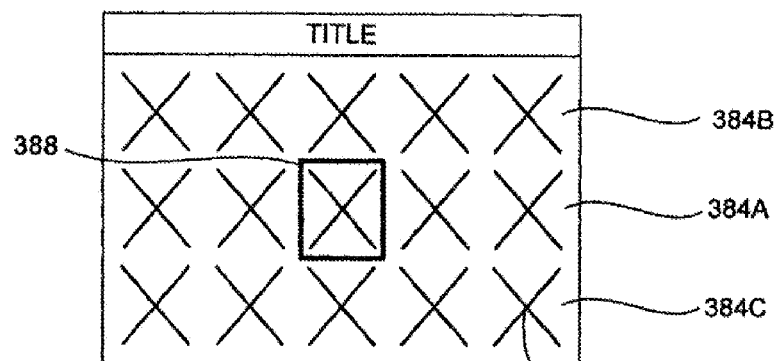
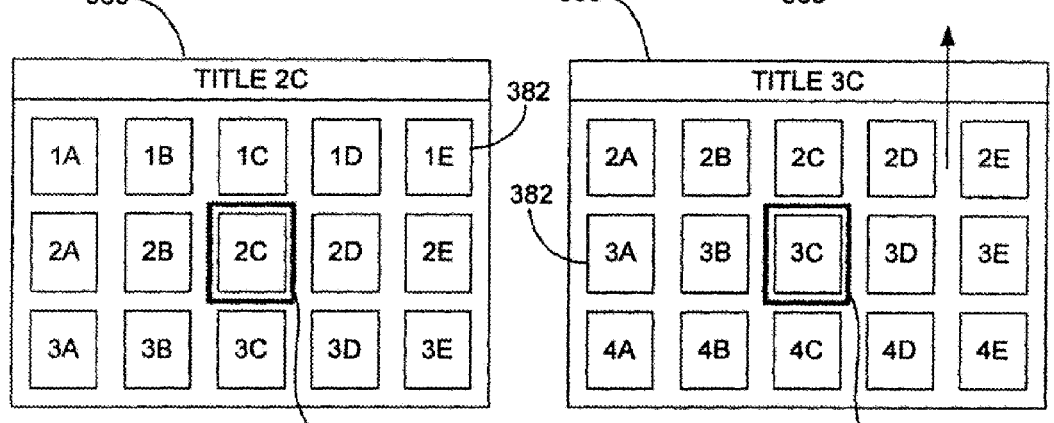
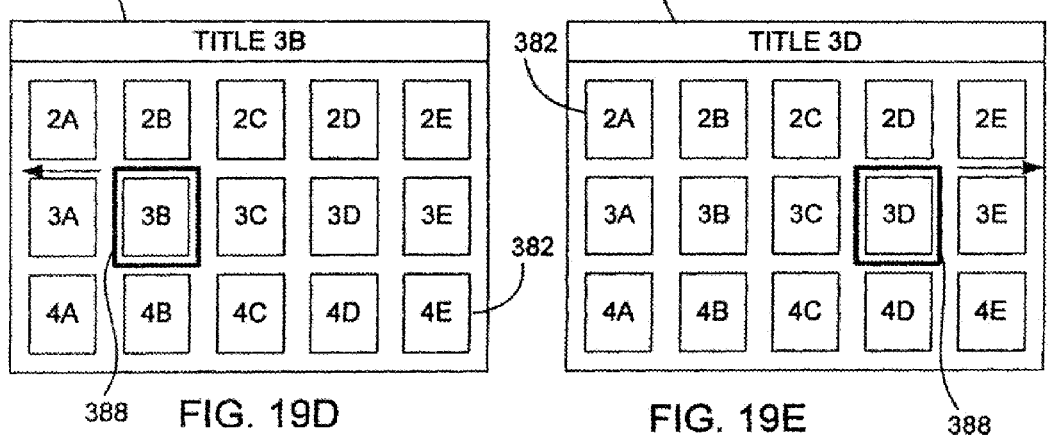

MULTIMEDIA CONTROL CENTER

CROSS-REFERENCE TO RELATED APPLICATIONS

This application is a divisional application of U.S. patent application Ser. No. 11/249,139, filed Oct. 11, 2006, and entitled "MULTIMEDIA CONTROL CENTER," which is hereby incorporated herein by reference, which in turn claims priority to: (i) U.S. Provisional Patent Application No. 60/724,622, filed Oct. 7, 2005, and entitled "MULTIMEDIA SYSTEM," which is hereby incorporated herein by reference; and (ii) U.S. Provisional Patent Application No. 60/725,544, filed Oct. 10, 2005, and entitled "MULTIMEDIA CONTROL CENTER," which is hereby incorporated herein by reference.

This application is also related to: (i) U.S. patent application Ser. No. 11/245,937, filed Oct. 7, 2005, and entitled "TECHNIQUES FOR PAIRING REMOTE CONTROLLERS WITH HOST DEVICES," which is hereby incorporated by reference herein; (ii) U.S. patent application Ser. No. 11/247,975, filed Oct. 10, 2005, and entitled "MULTI-MEDIA CENTER FOR COMPUTING SYSTEMS," which is hereby incorporated by reference herein; and (iii) U.S. patent application Ser. No. 11/249,032, filed Oct. 11, 2005, and entitled "INTELLIGENT MEDIA NAVIGATION," which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to user interfaces and, more particularly, to user interfaces for multimedia computer systems.

2. Description of the Related Art

For several years, personal computers have utilized various media applications. The media applications are individualized programs that allow users to browse through and output various media items associated with the media applications. By way of example, computers may come bundled with photo management programs for managing and viewing photos, music management programs for managing and listening to music, video applications for managing and viewing video stored on the computer, and DVD application for playing DVDs. Examples of these programs may include iPhoto, iTunes, and Quicktime, all of which are manufactured by Apple Inc. of Cupertino, Calif.

While these programs may be simple to use, when the computer is operated as a media playing device, the user typically does not need all the functionality that these programs offer. Furthermore, users typically do not want to go hack and forth from one application to the other as this can be time intensive and distracting. Moreover, users have become accustom to viewing content from a remote location (TV remote), and therefore they desire the same functionality in a multimedia computer.

Therefore, an improved cross platform user interface that is easy to use and that unites various media applications, and more particularly a user interface that provides a centralized location for accessing various media applications is desired. A user interface that allows the personal computer to function more like a media player is also desired.

SUMMARY

The invention relates, in one embodiment, to a main menu associated with a media control center. The main menu includes a plurality of media icons. Each media icons represents a different media feature of a multimedia control center. The media icons are arranged along a closed path and at preset icon positions along the closed path. The media icons move as a group around the closed path between icon positions in accordance with a navigation signal.

The invention relates, in another embodiment, to a method of operating a main menu of a media control center. The method includes presenting a plurality of media icons on a screen. Each media icon represents a different media feature of a multimedia control center. The method also includes arranging the media icons along a closed path and at preset icon positions along the closed path. The method further includes moving the media icons as a group around the closed path between icon positions in accordance with a navigation signal.

The invention relates, in another embodiment, to a menu associated with a media control center. The menu includes a plurality of media items arranged in a list. At least some of the media items have viewable media content associated therewith. The menu also includes a movable selector feature capable of traversing through the list of media items so as to highlight one of the media items. The menu further includes a view region where viewable media content associated with a highlighted media item is outputted.

The invention relates, in another embodiment, to a method of operating a menu of a media control center. The method includes providing a plurality of media items. Each media item has viewable media content associated therewith. The method also includes presenting the media items in a list and including a movable selector feature capable of traversing through the list so as to highlight one of the media items. The method further includes presenting the viewable media content associated with a highlighted media item next to the list of media items.

The invention relates, in another embodiment, to a menu method associated with a media control center. The method includes providing a plurality of images. Each image represents a media item. The method also includes placing the images in rows. Each row includes a plurality of side by side images. The method further includes providing first, second and third row positions in a viewing area of the display screen. The first row position is located at a first edge of the viewing area. The second row position is located at a second edge of the view area. The third row position is located in the middle of the viewing area. The method additionally includes initially presenting rows of images at the first row position, the second row position, and the third row position. The rows of images move vertically across a viewing area between the row positions and in and out of the viewing area. Upon receiving a navigation signal, the method also includes moving the row of images initially positioned in the first row position out of the viewing area, moving a new row of images into the viewing area and into the second row position, and moving the remaining rows of presented images over one row position. Moreover, the method includes initially presenting a slider for highlighting one of the images within one of the row positions. The slider is movably restrained within the row position and capable of moving horizontally across the row and between the side by side images of the row. Upon receiving a second navigation signal, the method also includes moving the slider from one image to the other. The highlighted image is the media item that is activated when an activation signal is received.

The invention relates, in another embodiment, to a menu associated with a media control center. The menu includes a blurred media application window disposed in the background of a viewing area. The menu also includes a list of control options disposed in the foreground of the viewing area and over the blurred media application window. At least one of the control options is configured to initiate a transition from the list of control options to the blurred media application window. The transition includes fading the list of control options out of the viewing area while focusing the media application window into the foreground of the viewing area.

The invention relates, in another embodiment, to a method of operating a DVD player with a media control center and a remote control with a single menu button. The method includes loading a DVD movie in response to the menu command from the single menu button of the remote control. The DVD movie has a DVD menu. The method also includes generating a menu that integrates a DVD feature menu of the media control center with a DVD menu. The menu has two states. In a first state the DVD feature menu is presented in the foreground. In a second state, the DVD menu is presented in the foreground. The DVD feature menu has a first control option for playing the DVD movie and a second control option for transitioning from the first to the second state. While in the first state, the method further includes playing the DVD movie when the first control option is activated, or transitioning to the second state when the second control option is activated. While in the second state, the method additionally includes playing the movie in accordance with a play signal, or transitioning to the first state in response to a menu command from the single menu button of the remote control. While the DVD movie is playing, the method additionally includes stopping the movie and marking the location of the stopped movie in response to the menu command from the single menu button of the remote control and proceeding back to the menu.

BRIEF DESCRIPTION OF THE DRAWINGS

The patent or application file contains at least one drawing executed in color. Copies of this patent or patent application publication with color drawings will be provided by the Office upon request and payment of the necessary fee. The invention may best be understood by reference to the following description taken in conjunction with the accompanying drawings in which:

FIGS. 19A-19E are diagrams of a feature folder, in accordance with one embodiment of the present invention.

FIG. 37A-37F are diagrams of transitioning from a media carousel to a Video feature menu, in accordance with one embodiment of the present invention.

DETAILED DESCRIPTION OF EMBODIMENTS OF THE INVENTION

The invention relates to techniques and systems for centralized access to multimedia content stored on or available to a computing device. The centralized access can be provided by a media control interface that receives user inputs and interacts with media programs resident on the computing device to produce graphical user interfaces that can be presented on a display device.

In one embodiment, the user inputs being provided to the media control interface are provided by a remote controller. The remote controller transmits user input requests to the media control interface in a wireless manner. For example, the remote controller can be an infrared remote controller.

Embodiments of various aspects of the invention are discussed below with reference to FIGS. 1-37E. However, those skilled in the art will readily appreciate that the detailed description given herein with respect to these figures is for explanatory purposes as the invention extends beyond these limited embodiments.

Computer System

Figure 1:
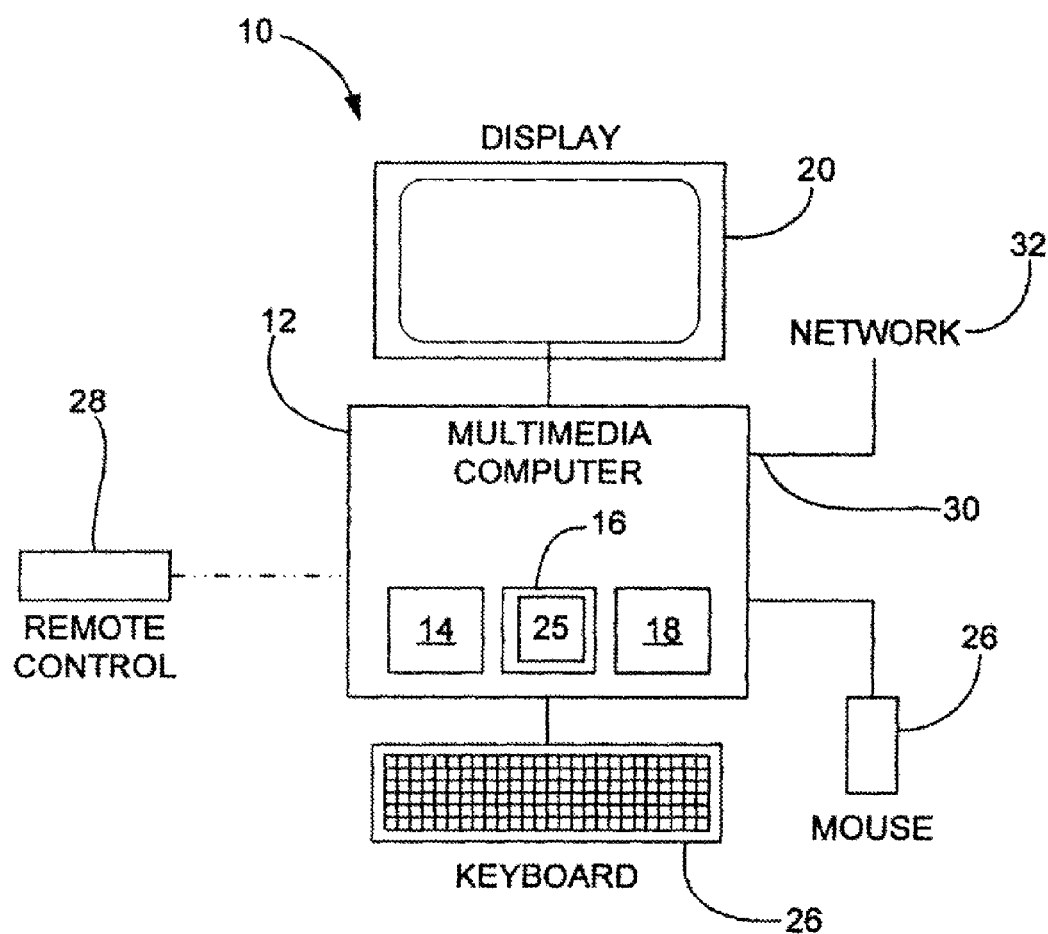
FIG. 1 is a simplified block diagram of a computer system, in accordance with one embodiment of the present invention.

FIG. 1 is a block diagram of an exemplary computer system 10, in accordance with one embodiment of the present invention. The computer system 10 includes a multimedia computer 12. The multimedia computer 12 may be a general purpose computer such as an IBM compatible computer or an Apple compatible computer. This may for example include without limitation towers, desktops, laptops, tablets or handheld computers, embedded devices, consumer electronic devices, cell phones, or other electronic devices. Examples of Apple computers include iMac, Power Mac G3, Power Mac G4, Power Mac G5, Mac mini, eMac, iBook, and Powerbook, all of which are or have been manufactured by Apple Inc. of Cupertino Calif.

The multimedia computer 10 typically includes a processor 14 configured to execute instructions and to carry out operations associated with the computer system 10. For example, using instructions retrieved for example from memory, the processor 14 may control the reception and manipulation of input and output data between components of the computing system 10. The processor 14 can be implemented on a single-chip, multiple chips or multiple electrical components.

In most cases, the processor 14 together with an operating system operates to execute computer code and produce and use data. By way of example, the operating system may correspond to Mac OS X, OS/2, DOS, Unix, Linux, Palm OS, Windows, and the like. The operating system can also be a special purpose operating system, such as may be used for limited purpose appliance-type computing devices.

The operating system, other computer code and data may reside within a memory block 16 that is operatively coupled to the processor 14. Memory block 16 generally provides a place to store computer code and data that are used by the computer system 10. By way of example, the memory block 16 may include Read-Only Memory (ROM), Random-Access Memory (RAM), hard disk drive and/or the like.

The computer code and data can also reside on a removable storage medium that is loaded or installed onto the computer system 10 when needed. Removable storage mediums may include, for example CD and/or DVDs that are loaded into an optical drive 18 contained inside the computer 12. By way of example, the optical drive may be a super Drive, which is manufactured by Apple Inc. of Cupertino, Calif. Alternatively, removable storage mediums may include floppy disks, USB storage keys, magnetic tape, and the like.

The computer system 10 also includes a display device 20 that is operatively coupled to the processor 14. The display device 20 may be integrated with the computer 12 or it may be a separate component (as shown). The display device 20 may be a liquid crystal display (LCD). Alternatively, the display device 668 may be a monitor such as a monochrome display, CGA display, EGA display, VGA display, super VGA display, CRT display, or the like. The display device may also correspond to a plasma display or a display implemented with electronic inks.

The display device 20 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics.

The multimedia computer system 10 also includes one or more input devices 26 that are operatively coupled to the multimedia computer 12. The input devices 26 may be integral with the multimedia computer or they may be separate components (e.g., peripheral). Peripheral input devices 26 may be connected to the computer system 10 through wired connections (e.g., cables/ports), or alternatively they may be connected to the computer system 10 through wireless connections. By way of example, the data link may correspond to PS/2, FIREWIRE, USB, IR, RF, Bluetooth or the like. Examples of input devices that can be used include buttons, switches, keypads, keyboards, mice, trackballs, touch pads, joy sticks, touch screens and the like.

The multimedia computer system 10 also includes a network connection 30 for communicating with a network 32 such as the internet or world wide web. The network connection 30 allows a user to view and download content from the network 32. By way of example, the network connection may be embodied as a network card or modem. In one embodiment, the network connection allows a user to download media content such as video files (movies, trailers, music videos), audio files (e.g., songs, audiobooks, etc), photo files pictures), and/or the like, to the multimedia computer. The media content may for example be based on MP3 or MP4 formats.

Although not shown, the computer system may also include capabilities for connecting to other devices including I/O devices such as printers, scanners, speakers or dedicated handheld devices such as cameras, PDAs, music players, game players, and the like.

In accordance with one embodiment of the present invention, the memory block 16 includes a media control center program 25 that unifies various multimedia applications of the multimedia computer into a single centralized environment. The multimedia applications may for example be selected from photo management programs, video management programs, music management programs, and DVD management programs. By way of example, the photo management programs may be iPhoto, the video management program may be Quicktime, and the music management program may be iTunes, all of which are manufactured by Apple Inc. of Cupertino, Calif.

The media control center program 25 may include a central-user-interface that allows access to the various multimedia applications. The central-user-interface can graphically represent each multimedia application as a selectable item in a main menu. The central-user-interface can also graphically represent various layers behind the main menu such as for example submenus directed more closely to a particular media.

In accordance with one embodiment, the computer system also includes a multimedia remote control 28. The remote control 28 allows a user to remotely control the multimedia control center. The remote control may for example be connected to the multimedia computer via an infrared connection (IR). Generally speaking, the remote control allows a user to select and play various media items that are overseen by the multimedia control center.

Remote Control

Figure 2:
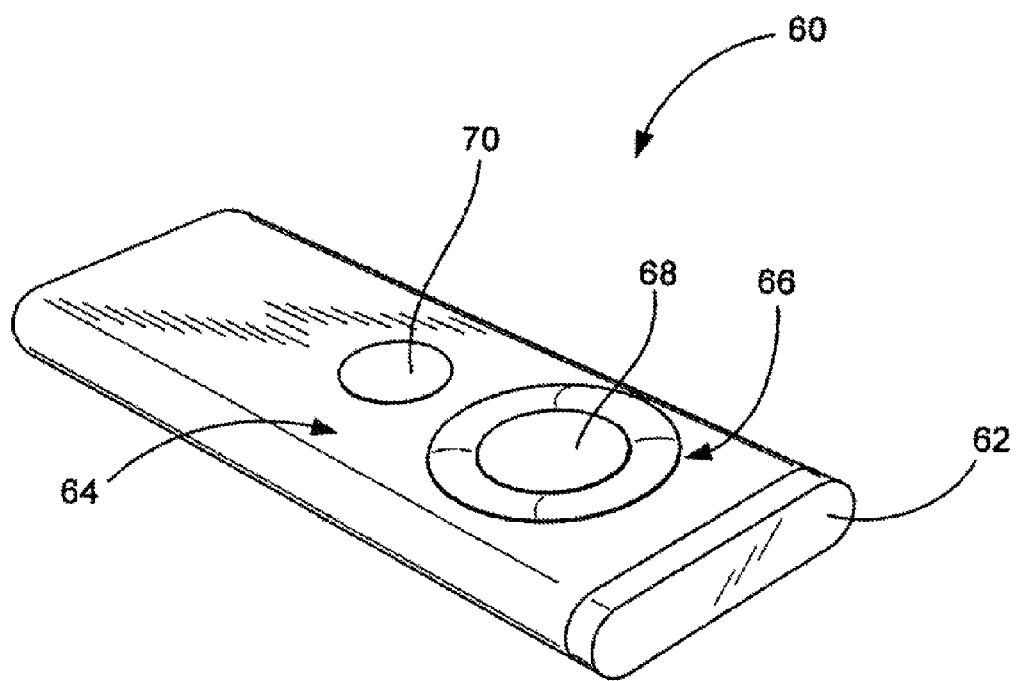
FIG. 2 is a perspective view of a remote control, in accordance with one embodiment of the present invention.

The wireless controller or portable remote controller used herein can have many different shapes and configurations. FIG. 2 is a perspective view of a remote controller 60 suitable for use in one embodiment of the invention. The remote controller 60 is, for example, suitable for use as the remote control illustrated in FIG. 1. The remote controller 60 is lightweight, low powered and highly portable. Typically, the remote controller 60 is small enough to be easily held within a single hand of its user. The remote controller 60 includes a wireless transmission window 62 through which transmitted wireless (e.g., infrared) signals can be output. The remote controller 60 also includes user input devices 64. In this embodiment, the user input device 64 includes a set of four input buttons 66 arranged in a circular fashion, a center button 68 that is surrounded by the set of four input buttons 66, and another button 1010. These various buttons can, for example, be implemented by mechanical switches or touch-sensitive surfaces.

These buttons can be mapped to various different functions depending on the particular application program on a host device that is being controlled by the remote controller 60. For example, if the application program on the host device being controlled is a media player application, then the user input device 64 can provide media playback controls. As an example, the set of four input buttons 66 can provide functions such as volume up (top), volume down (bottom), next track (right) and previous track (left); the center button 68 can provide a play/pause function; and the other button 1010 can provide a menu request function. Moreover, other management, type commands can be mapped to combinations of buttons to minimize the number of buttons and to avoid accidental management commands.

In accordance with one embodiment, the remote control is configured to navigate through various GUIs of a multimedia control center. In one embodiment, the left and right buttons are used to rotate features of a main menu (e.g., carousel). In another embodiment, the menu button is used to transition from a desktop to a main menu of the multimedia control center. For example, pressing the main menu button may be used to exit the desktop and enter the main menu of the multimedia control center, or to exit the main menu of the multimedia control center and enter the desktop (depends which window is currently opened). Once in the multimedia control center, the menu button may be used to go back to the previous screen or menu layer. That is, if in a sub/submenu, pressing menu will take the user back to submenu, and pressing menu again will take the user to menu. In yet another embodiment, the play/pause button may be used to activate a feature menu when navigating through the main menu of the multimedia control center. For example, when a feature is highlighted in the main menu, pressing the play pause button may be used to exit the main menu and enter the feature menu. Alternatively, when in submenus containing a list of media items, pressing the play/pause button may be used to activate the media item.

Software Diagram

Figure 3:
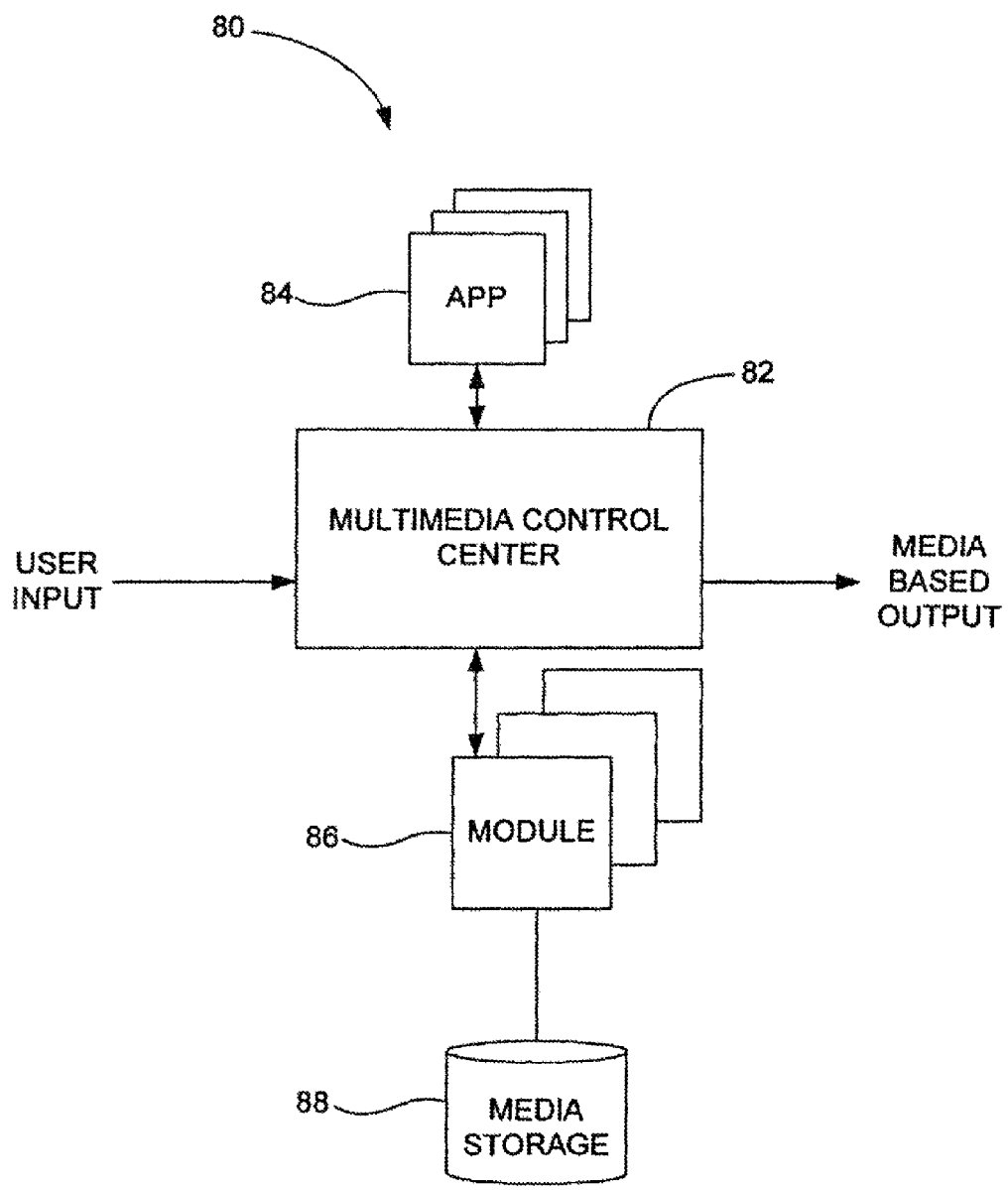
FIG. 3 is a simplified block diagram of a multimedia system, in accordance with one embodiment of the present invention.

FIG. 3 is a block diagram of a media control system 80, in accordance with one embodiment of the present invention. The media control system 80 includes a multimedia control center 82. The multimedia control center 82 operates on a computing device, such as a multimedia computer. The multimedia control center 82 couples to a plurality of media applications 84. Each of the media applications 84 can operate on one or more different types of media, including audio, images, and video (e.g., movies). These media applications 84 can be installed on the computer and operable individually as well as operable through the multimedia control center 82. In order for the multimedia control center 82 to properly operate or interact with the media applications 84, the media control system 80 includes a plurality of media modules 86. Each of the modules can correspond, in one embodiment, to one of the media applications 84. The modules 86 are then used by the multimedia control center 82 to not only assist with interaction with the media applications 84, but also to permit access to one or more media storage devices 88 which stores the media data which is utilized by the media applications 84. Hence, the multimedia control center 82 can directly access the stored media data within the one or more media storage devices 88 by way of the media modules 86.

The multimedia control center 82 can receive user inputs by way of a remote device. In one embodiment, the remote device is a remote controller, such as an infrared remote controller. A user can interact with the remote device to cause user requests to be transmitted to the computer operating the multimedia control center 82. Upon receiving the user inputs, the multimedia control center 82 can interact with the appropriate media application 84 or media module 86. In addition, the multimedia control center 82 can cause graphical user interfaces to be presented on a display. The graphical user interfaces can correspond to the media data from the media storage devices 88. The display can also present graphical user interfaces provided by the media applications 84. Still further, the media applications can output graphical user interfaces to the display, while the multimedia control center 82 also produces a partial graphical user interface that can be provided along with the graphical user interfaces by the media applications 84.

One aspect of the media control system 80 is that a user of a remote device is able to interact with a plurality of installed application programs operating on a computer through use of a multimedia control center. Here, the multimedia control center can direct the incoming user input to the appropriate media application. The multimedia control center can also provide its own user interfaces to facilitate the user of the remote device in navigating to and/or selecting media applications or media content to be presented, such as at a display device. Another aspect of the media control system 80 is that a multimedia control center can manage interaction with a plurality of media applications. In this regard, the multimedia control center 82 intelligently determines which media application or application related media content is to be utilized in response to user input requests. Another aspect of the media control system 80 is a multimedia graphical user interface that enables a user, even a remote user, to navigate through multiple media types to select, preview or play media data.

Media Center Heirarchy

Figure 4:
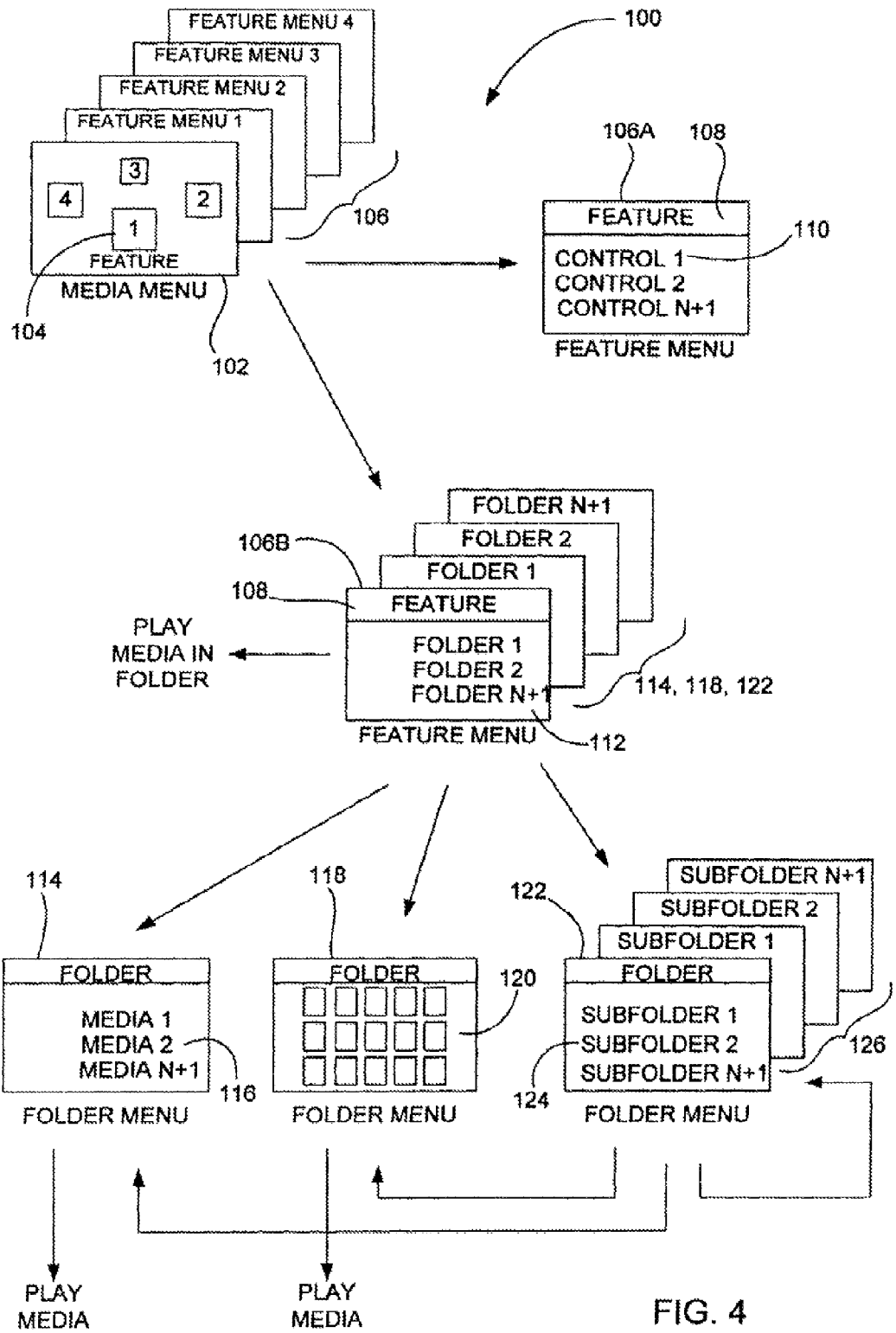
FIG. 4 is a diagram of a GUI hierarchy, in accordance with one embodiment of the present invention.

FIG. 4 is a diagram of a GUI hierarchy 100 for a media control center, in accordance with one embodiment of the present invention. The GUI hierarchy may for example be used in conjunction with a media control center described in previous figures. The GUI hierarchy 100 includes a media menu 102 that serves as a central location for accessing various media. The media menu 102 contains a plurality of media features 104 that point to feature menus 106 stored behind the media menu 102. The media features 104 may be displayed as a list of media features or as graphical icons (as shown). When a media feature 104 is activated, the feature menu 106 associated with the activated media feature 104 is opened. The feature menus 106 typically include a header that identifies the media feature 104 and a list of submenus; media items, folders, and control options, that are associated with the media feature 104.

In one embodiment, a first feature menu 106A includes a header 108 and a list of control options 110. The control options 110 may for example be used to perform actions in an application that is being controlled by the media control center. By way of example, the first feature menu may be a DVD feature menu, and may include controls for starting a movie, resuming play of a movie, ejecting a disc, accessing the menu of the DVD, or muting the movie.

In another embodiment, a second feature menu 106B includes a header 108 and a list of folders 112. When activated, the content inside the folders 112 can be played or opened. When played, the application that runs the media content is opened and the media content associated with the folder 112 is played. When opened, the content inside the folder 112 is displayed. The content can be displayed as a folder menu 114 having a list of media items 116, a folder menu 118 having a group of icons or thumbnail images 120 that represent media items, or a folder menu 122 having a second list of folders 124 (e.g., subfolders). When a media item 116 or 120 is activated, the application that runs the media content associated with the media item is opened and the media content is played.

The second feature menus 106B may correspond to music feature menus, photo feature menus, video feature menus, and the like.

The music feature menu may contain a plurality of media items, folders or control options including but not limited to songs, playlists, artists, albums, shuffle songs, podcasts, genres, composers, and audio books. Each of the folders includes a plurality of subfolders or a list of media items. In the case of "songs" for example a list of all the songs stored in a data store are presented in the list. In order to play a song, the user simply has to traverse a highlight bar through the list, and select the desired song. In the case of "playlists", a list of all the playlists are presented in a list. Each playlist contains a preselected group of songs. In order to play a song in the playlist, the user simply has to traverse a highlight bar through the list, and select the desired song. Once activated, an additional screen may be used to provide information about the song as for example album, title, artist, album art, and time of play.

The photo feature menu may contain a plurality of folders or control options including but not limited to library, last roll, last 12 months, and photo albums. Each of the folders includes either a plurality of subfolders or a list of media items. In the case of "library" for example a list of all the pictures stored in the data store are presented in the list. Thumbnail images rather than titles of the pictures may be used. For example, the thumbnail images may be presented in rows and columns. In order to show a photo, the user simply has to traverse a highlight bar through the list or thumbnail images, and select the desired picture. In the case of a "photo album", the activation thereof causes a slide show of the photo album to be presented.

The video feature menu may contain a plurality of folders or control options including but not limited to my videos, movie trailers and music videos. Each of the folders includes a list of media items. My videos contain for example a list of home video movies or short video movies. Movie trailers contain a list of movie trailers. The movie trailers may be in the form of thumbnail images of the movie poster and may be presented in rows and columns. In order to play a movie trailer, the user simply has to move a highlight bar to traverse through the thumbnail images, and select the desired movie. Music videos contain a list of music videos stored in the data store (similar to songs folder). Alternatively, the music videos may be presented similarly to songs or movie trailers (except that album art is used instead of movie poster art). In order to play a music video, the user simply has to traverse a highlight bar through the list or thumbnail images, and select the desired music video.

Traversing Through Media Hierarchy

Figure 5A:
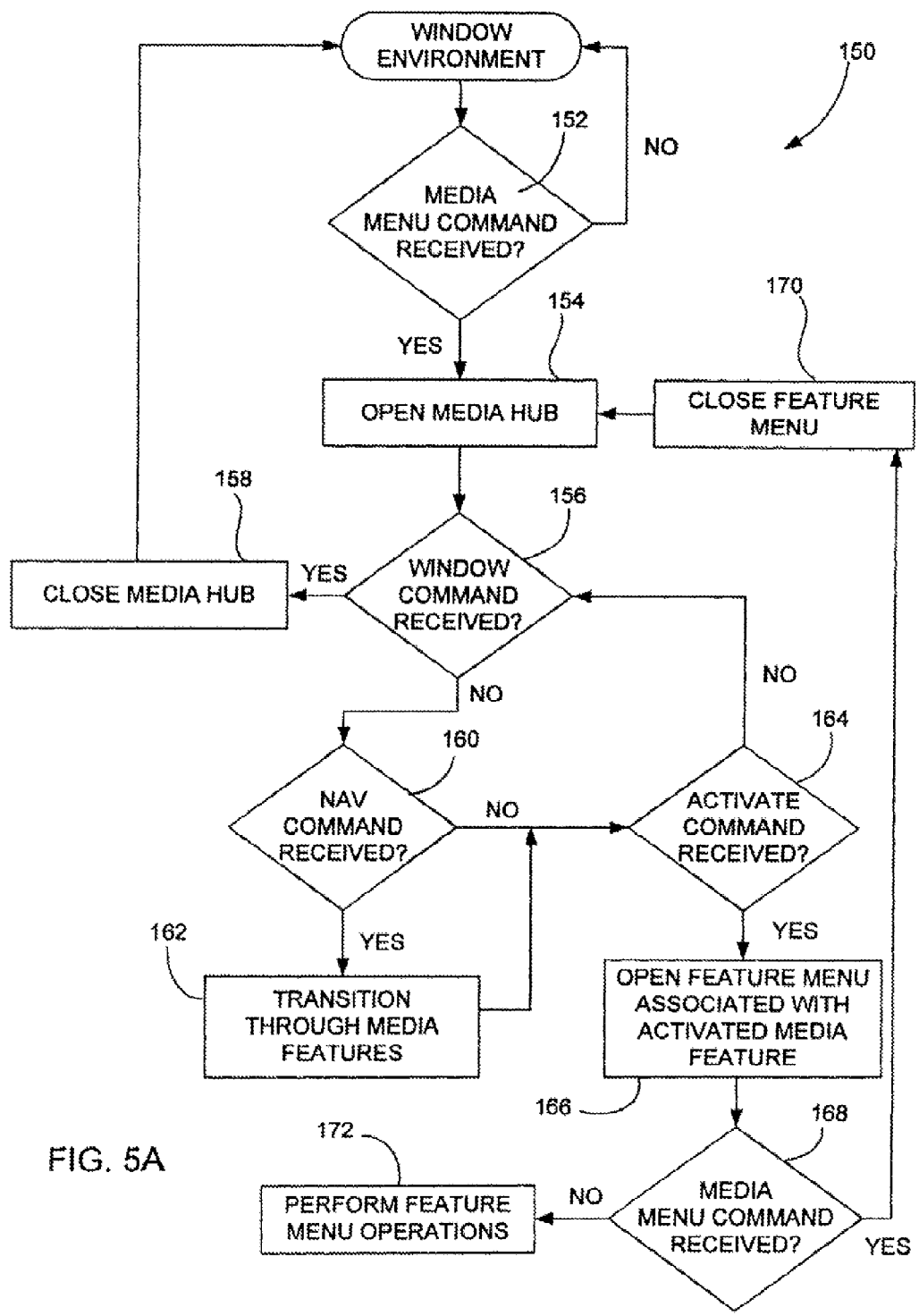
FIG. 5A is a multimedia method, in accordance with one embodiment of the present invention.

FIG. 5A is a multimedia method 150, in accordance with one embodiment of the present invention. The multimedia method 150 begins at block 152 where a determination is made as to whether or not a media hub initiation command is received. The media hub initiation command may be generated when a user selects the menu button on the remote control shown in FIG. 2 (when an application such as a desktop is opened).

If the command is received, the method 150 proceeds to block 154 where the media hub is opened. This generally includes activating and presenting the media menu on a display, and removing the current application from the screen. The current application typically stays active, but hidden from view. The media menu includes a collection of media features that indicate media that can be selected. The media features may for example be icons representative of a particular media (e.g., DVD, Videos, Photos, Music, etc). Any number of media features may be presented. In most cases, a transition effect is used to transition the screen from the current application to the media hub environment. By way of example, the transitioning effect may include cross dissolve, fading in/out, overlap, push or scale down. The transitioning effect may also include marching the icons into the screen one by one.

Once the media hub is opened, the method 150 proceeds to block 156 where a determination is made as to whether or not a window reinstating command is received. The window reinstating command may be generated when a user selects the menu button on the remote control shown in FIG. 2 when the media hub is displayed. If a window reinstating command is received, the method 150 proceeds to block 158 where the media huh is closed. This generally includes deactivating and removing the media hub from the screen, and presenting the previous application on the screen. In most cases, a transition effect is used to transition the display from the media hub environment to the previous application. The closing transition effect may be the same as, different than or opposite the opening transition effect.

If a window reinstating command is not received, the method 150 proceeds to block 160 where a determination is made as to whether or not navigation commands are received. The navigation commands may be generated when a user selects the control wheel on the remote control shown in FIG. 2. For example, pressing up and down or side to side. If navigation commands are received, the method 150 proceeds to block 162 where the media features are transitioned or flipped through in accordance with the navigation commands. For example, the various media features may be highlighted or moved to a feature selection position.

If navigation commands are not received, the method 150 proceeds to block 164 where a determination is made as to whether or not an activation command is received. The activation command may be generated when a user selects the selection button on the remote control shown in FIG. 2. The media feature currently highlighted or placed in the feature selection position is the media feature that is activated. If the selection command is not received, the method 150 proceeds back to block 156.

If the selection command is received, the method 150 proceeds to block 166 where a feature menu associated with the selected media feature is opened. This generally includes activating and presenting the feature menu on the screen, and removing the media menu environment from the screen. The media menu environment typically stays active, but hidden from view. The feature menus may include a list of folders, or a collection of media items that can be selected. The folders may contain further subfolders or list of media items that can be selected (and so on). The media items may for example be music, photos, or videos. Any number of folders, or media items may be presented. Alternatively or additionally, the feature menus may include a list of control options that when selected cause an action to be performed. For example, the control options may be associated with operating a DVD player. In most cases, a transition effect is used to transition the display from the media menu to the feature menus. Similar or different transition effects may be used between the various feature menus and the media menu.

Following the opening of the feature menu, the method 150 proceeds to block 168 where a determination is made as to whether or not a media huh initiation command is received. The media hub initiation command may be generated when a user selects the menu button on the remote control shown in FIG. 2. If the media hub initiation command is received, the method 150 proceeds to block 170 where the feature menu is closed This generally includes deactivating and removing the feature from the screen, and presenting the media menu on the screen. In most cases, a transition effect is used to transition the display from the feature menu to the media menu. The closing transition effect may be similar or different than the opening transition effect.

If the media hub initiation command is not received, the method 150 proceeds to feature menu operations 172 including for example navigating through folders, lists of media items or control options, and activating a particular folder, lists of media items or control options. When folders are selected, content may be played or new subfolders or lists of media items may be displayed. When particular media items are selected, they are presented and/or played. For example, if a photo album is selected, the photo management program is instructed to play the photo album. If a song is selected, the music management program is instructed to play the song. If a video is selected, the video management program is instructed to play the video. If a control option is selected the action associated with the control option is performed. For example, in the case of a DVD feature menu, the control option may be play DVD, and therefore when selected the DVD player is instructed to play the DVD loaded in the DVD player.

In one embodiment, various transition effects are performed when folders, lists of media items or control options are selected. For example, the DVD feature menu may include a transition effect between it and the actual DVD menu supplied by the DVD player. The transition effect may for example include blurring out and placing the actual DVD menu behind the DVD feature menu, and/or fading out the DVD feature menu and focusing the actual DVD menu when the DVD menu control option is selected. In another embodiment, the feature menus folders may include inventive way of presenting the highlighted but un-activated media items. For example, the feature menus or folders may include a preview window that plays the media item that is highlighted but un-activated. The preview window allows a user to see the contents contained the folder before activating the folder. For example, in the case of a photo album, the preview window may sequence through the photos contained in the photo album that is highlighted. The same can be said for videos.

Figure 5B:
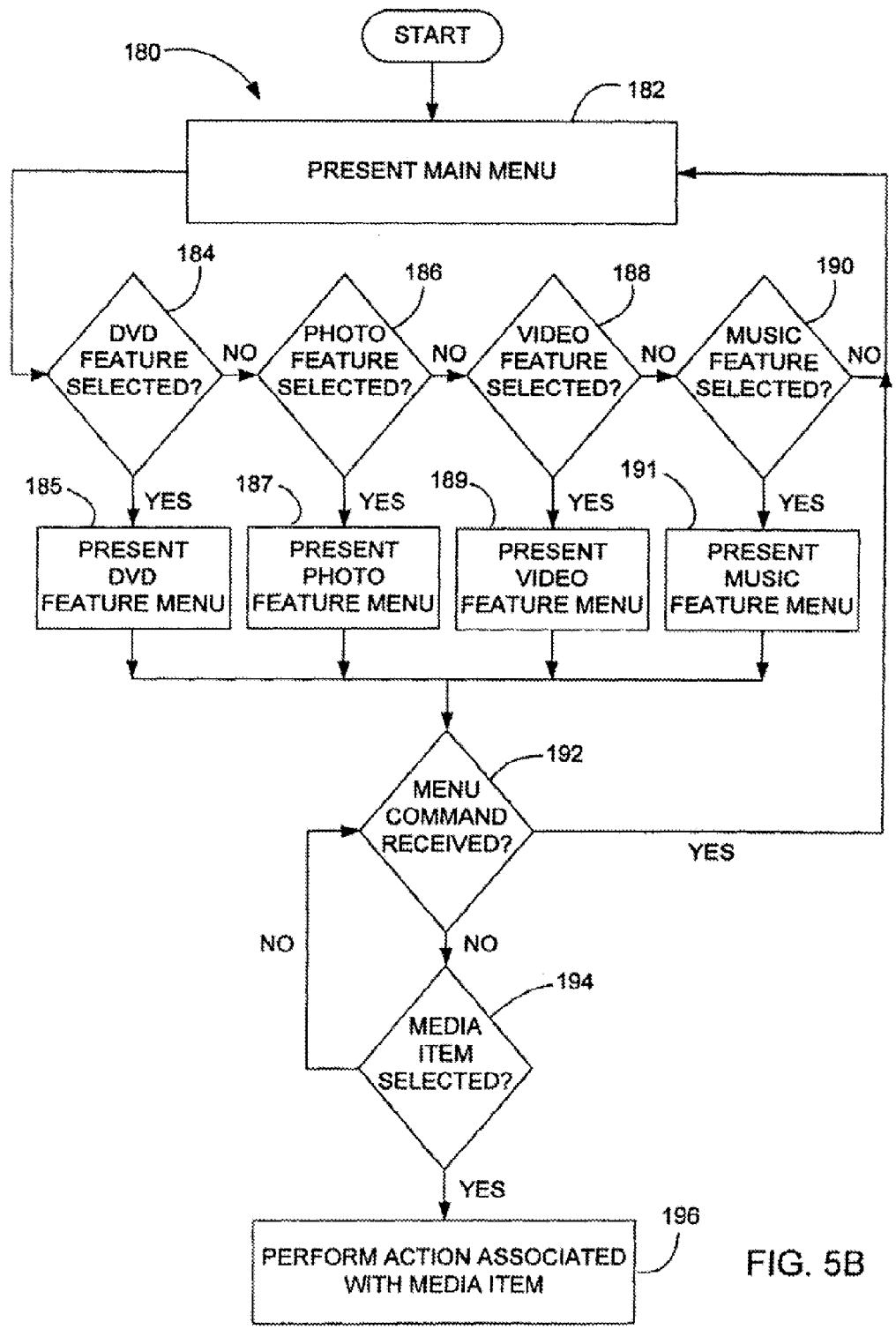
FIG. 5B is a multimedia method, in accordance with one embodiment of the present invention.

FIG. 5B is a multimedia method 180, in accordance with one embodiment of the present invention. The multimedia method 180 begins at block 182 where a main menu is presented. The main men may for example correspond to the main menu described below. The main menu includes a plurality of media features, and more particularly, a DVD feature, Photo feature, Video feature, and a Music feature. Following block 182, the method proceeds to blocks 184, 186, 188, and 190 where a determination is made as to whether or not one of the media features has been selected. If the DVD feature is selected, a DVD feature menu is presented (block 185 video feature is selected, a Video feature menu is presented (block 189). If the Music feature is selected, a Music feature menu is presented (block 191). Each of the feature menus typically include a plurality of menu items. Examples of feature menus may be found in FIGS. 25-35. When a feature menu is opened, the method proceeds to block 192 where a determination is made as to whether or not a menu command is received. The menu command may for example be the menu button of the remote control described in FIG. 2. If a menu command is received, the method proceeds hack to block 182 where the main menu is presented. If a menu command is not received, the method proceeds to block 194 where a determination is made as to whether or not a media item has been selected/activated. For example, highlighting one of the media items with a selector bar and thereafter pressing the play/pause button of the remote control shown in FIG. 2. If a media item is not selected/activated, the method proceeds back to block 192. If a media item is selected/activated, the method proceeds to block 196 where an action associated with the media item is performed. For example, opening a media file or another submenu.

Media Carousel

FIG. 6 is a diagram of a media carousel 200 embodied in a GUI, in accordance with one embodiment of the present invention. The media carousel 200 may be the media menu of the media hub. That is, it may provide a central location for accessing various media features.

As shown, the media carousel 200 includes a plurality of media icons 202 associated with the media features of the media hub. The media icons 202 represent the media features and when activated take the user to feature menus associated with the media feature they represent. The media features may be associated with all sorts of media including but not limited to Photos, Videos, DVD, music, TV, etc. Thus, the carousel 200 may include a photo icon representative of a photo feature, a music icon representative of a music feature, a DVD disk icon representative of a DVD feature, a video icon representative of a video feature, or a TV icon representative of a TV feature.

Figure 6B:
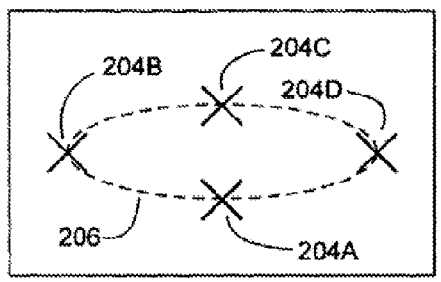
FIGS. 6A-6H are diagrams of a media carousel, in accordance with one embodiment of the present invention.

The layout and configuration of the media icons 202 may be widely varied. Referring to FIG. 6B, the media icons 202 may be placed at preset positions 204 along closed path or line 206 (that may or may not be hidden from view). The closed path or line may form any shape including for example standard shapes as circles, ovals, squares, rectangles, triangles, hexagons, octagons, trapezoids, etc, or advanced shapes such as L shaped, H shaped, etc. The number of preset positions 204 generally corresponds to the number of features to be presented in the carousel 200 (there is an icon for each feature and a position for each icon) Furthermore, the preset positions 204 may be positioned anywhere on the line 206, although in the preferred embodiment, the present positions 204 are substantially equally spaced along the line 206.

Referring to FIGS. 6C-6H, the media icons 202 are configured to move along the line 206 from one preset position 204 to the next preset position 204. For example, when a navigation command is received, the media icons 202 are all moved over one position. That is, they move as a group along the line 206 and stop when they all have shifted to the next preset position 204. If the navigation command is a left command, the media icons 202 typically rotate around the line 206 in a counter clockwise motion (see arrows in FIG. 6F-6H). If the navigation command is a right command, the media icons 202 typically rotate around the line 206 in a clockwise motion (see arrows in FIGS. 6C-E).

As shown in all the figures, the media carousel 200 includes a primary position 204A and one or more secondary positions 204B, 204C and 204D. The primary position 204A is the location where the media icons 202 move when they are to be selected. That is, the media icons 202 can be activated when they are in the primary position 204A. In essence, placing the media icon 202 in the primary position 204A is analogous to highlighting the media icon 202 (selected but not activated). The secondary positions 204B-D are holding positions, and the media icons 202 located thereon are locked from activation.

The primary position 204A can be any one of the preset positions 204, although it is typically the position that best presents a feature to be selected. For example, one that places the media icon 202 towards the center of the screen. For the oval path 206 shown, the primary position 204A may be located at the highest or lowest point on the oval path 206 (as shown).

Figure 6A:
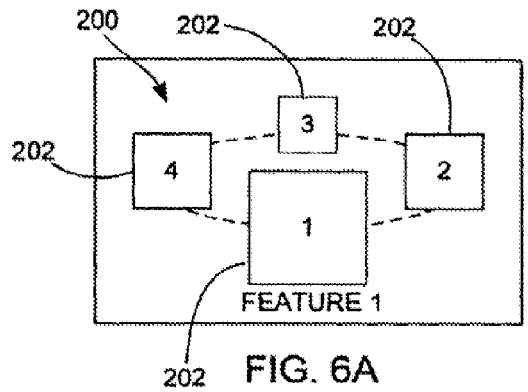
Figure 6C:
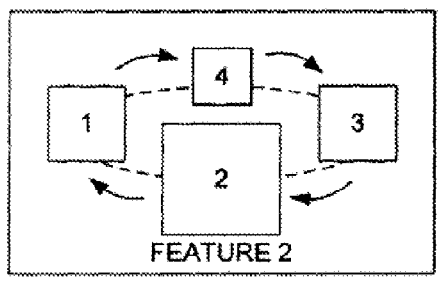

In one embodiment, a media label 208 that identifies the media feature appears underneath the media icon 202 when the media icon 202 is placed in the primary position 204A. For example, the label "FEATURE 1" appears underneath icon #1 when icon #1 is placed in the primary position (as shown in FIG. 6A), the label "FEATURE 2" appears underneath icon #2 when icon #2 is placed in the primary position (as shown in FIG. 6C), the label "FEATURE 3" appears underneath icon #3 when icon #3 is placed in the primary position (as shown in FIG. 6D), the label "FEATURE 4" appears underneath icon #4 when icon #4 is placed in the primary position (as shown in FIG. 6E). In the case given above, the DVD icon may include a "DVD" label, the photo icon may include a "PHOTO" label, the video icon may include a "VIDEO" label, and the music icon may include a "MUSIC" label.

In one embodiment, the media icons 202 are configured to appear as though they are on a visual plane with the media icon 202 in the primary position 204A appearing in the foreground, and the media icons 202 in the secondary positions 204B-D appearing in the background (looks like they are behind and transitioning to a vanishing point from the media icon in the primary position). This effect may be achieved by reducing the size of the media icons 202 when they are in the secondary positions 204B-D and further making the media icons 202 become smaller and smaller the further the media icons 202 are from the primary position 204A in the visual plane. For example, the secondary position(s) 204C that is furthest from the primary position along the vertical is located at the horizon line of the visual plane and therefore is the smallest. When following these rules, a worms eye view (the visual angle of the viewer being low) will be created when the primary position 204A is at the highest point on the path 206, and a birds eye view (the visual angle of the viewer being raised) will be created when the primary position 204A is at the lowest point on the path 206 (as shown). The depth of view in either the worms eye view or birds eye view can be adjusted by altering the height of the oval path. A larger depth of view will be created with an oval path having a larger height, and a smaller depth of view will be created with an oval path having a short height. By way of example, the visual plane may be tilted between about 60 and 656 degrees.

In the illustrated embodiment for example the media icons 202 in the secondary positions 204B and 204D to the left and right of the primary position 204A are made smaller than the media icon 202 in the primary position 204A, and the media icon 202 in the middle secondary position 204C between the left and right secondary positions 204B and 204D is made smaller than the media icons 202 to the left and right secondary positions 204B and 204D. Put another way, the primary media icon is full sized, the left and right media icons are medium size and the last media icon is small sized. In essence, when following the path, the media icons at the secondary positions get smaller the further they are located from the primary position.

Referring to FIGS. 6C-6H, when the media icons 202 are moved along the path 206 from position to position, the sizes of the media icons 202 change in accordance with the direction of movement and/or the resultant position. For example, the media icons 202 decrease in size when moving away from the primary position 204A, and increase in size when moving towards the primary position 204A. The media icons 202 may start to change their size at or anywhere between the last and next icon positions. For example, the change may occur instantaneously once the new position is reached or it may occur gradually from the time it leaves the last icon position to the time it reaches the new icon position. The later is believed to be more fluid and dynamic and thus is the preferred method, i.e., increasing or decreasing the size gradually from one size to the other while the media icon is moved from one position to the other.

As shown in FIGS. 6C-6E, for each right command (e.g., each left click of the navigation wheel on the remote control), the media icons 202 are moved over one position, and as they do they change from large to medium when going from primary position 204A to first secondary position 204B and from medium to small when going from first secondary position 204B to second secondary position 204C. In addition, they change from small to medium when going from the second secondary position 204C to the third secondary position 204D, and from medium to large when going from the third secondary position 204D to the primary position 204A.

Figure 6F:
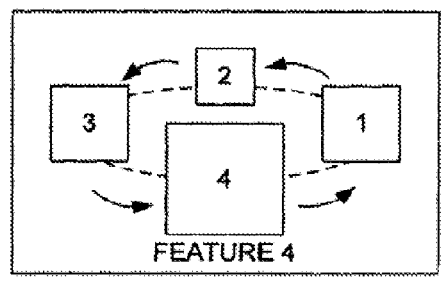
Figure 6D:
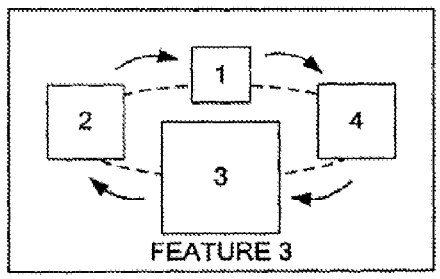
Figure 6G:
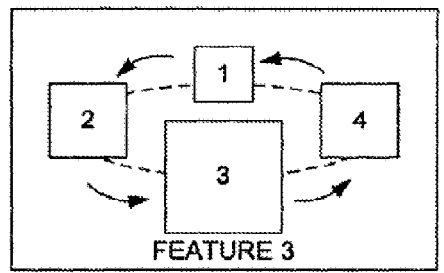
Figure 6E:
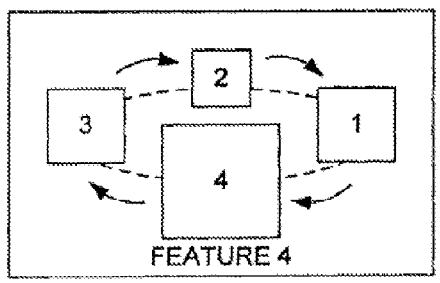
Figure 6H:
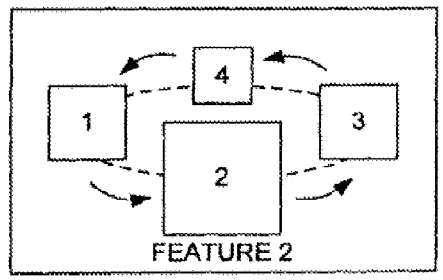

As shown in FIGS. 6F-6H, for each left command (e.g., each right click of the navigation wheel on the remote control), the media icons 202 are moved over one position, and as they do they change from small to medium when going from the second secondary position 204C to the first secondary position 20413, and from medium to large when going from the first secondary position 20413 to the primary position 204A. In addition, they change from large to medium when going from primary position 204A to third secondary position 204D and from medium to small when going from third secondary position 204D to second secondary position 204C.

Although not shown, in one embodiment, the media icons 202 may include a reflected portion that extends downward from the base of the media icon 202. The reflected portion may be created by making a copy of the media icon, cropping the copy of the media icon (e.g., shortening), vertically flipping the cropped image, altering the transparency of the flipped image from semi transparent at the top to fully transparent at the bottom (e.g., gradient), and attaching the top of the flipped image to the bottom of the media icon. The reflected portion may be configured to change as the icon is moved onto the screen as well as about the carousel.

Method of Operating a Media Menu as a Carousel

Figure 7:
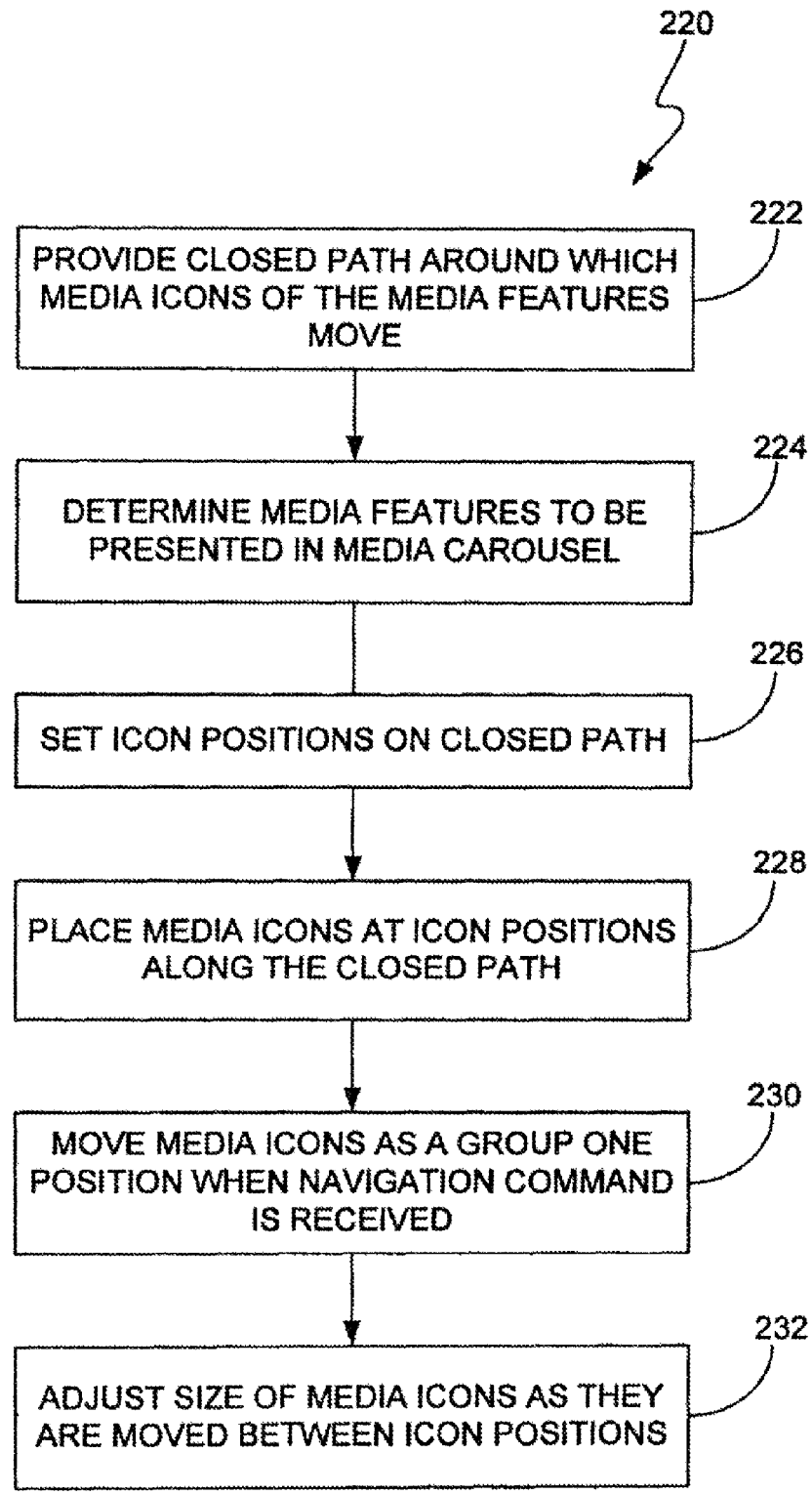
FIG. 7 is a method of operating a media menu as a media carousel, in accordance with one embodiment of the present invention.

FIG. 7. is a method 220 of operating a media menu as a media carousel, in accordance with one embodiment of the present invention. The method 220 begins at block 222 where a closed path is provided around which media icons of the media features move similar to a carousel (see FIG. 6)

Thereafter, in block 224, a determination is made as to the media features to be presented in the media carousel. For example, the media carousel may include a default set of features or it may be programmable (e.g., a user selects features to be added to the media hub and the selection is reflected in the media carousel).

Following block 224, the method proceeds to block 226 where the icon positions are set on the path. The positions are based on the number of media features to be presented. In one implementation, the positions are placed at equal distances from one another along the closed path. The icon positions include at least a primary position and one or more secondary positions. The primary position is typically positioned in the center of the screen although this is not a requirement.

Following block 226, the method proceeds to block 228 where media icons of the media features are placed (presented) at each of the icon positions along the closed path. The media icon placed at the primary position is made hull size. The media icons placed at the secondary positions are made smaller than full size. In fact, the media icons are made smaller and smaller the further they get from the primary position along the closed path.

Following block 228, the method proceeds to simultaneously occurring blocks 230 and 232. In block 230, the media icons are moved as a group one position when a navigation command is received. The navigation command may for example be generated by a navigation pad of a remote control. The direction of movement is typically based on the direction supplied by the navigation command. If the navigation command supplies a left directional indicator, the media icons move counterclockwise from one position to the next. If the navigation command supplies a right directional indicator, the media icons move clockwise from one position to the next. In block 232, the size of the media icons are adjusted as they are moved between positions. The size of the media icons are reduced the further they are moved away from the primary position along the close path, and increased the closer they are moved towards the primary position along the closed path.

Method of Transitioning to a Media Carousel from an Open Window

Figure 8:
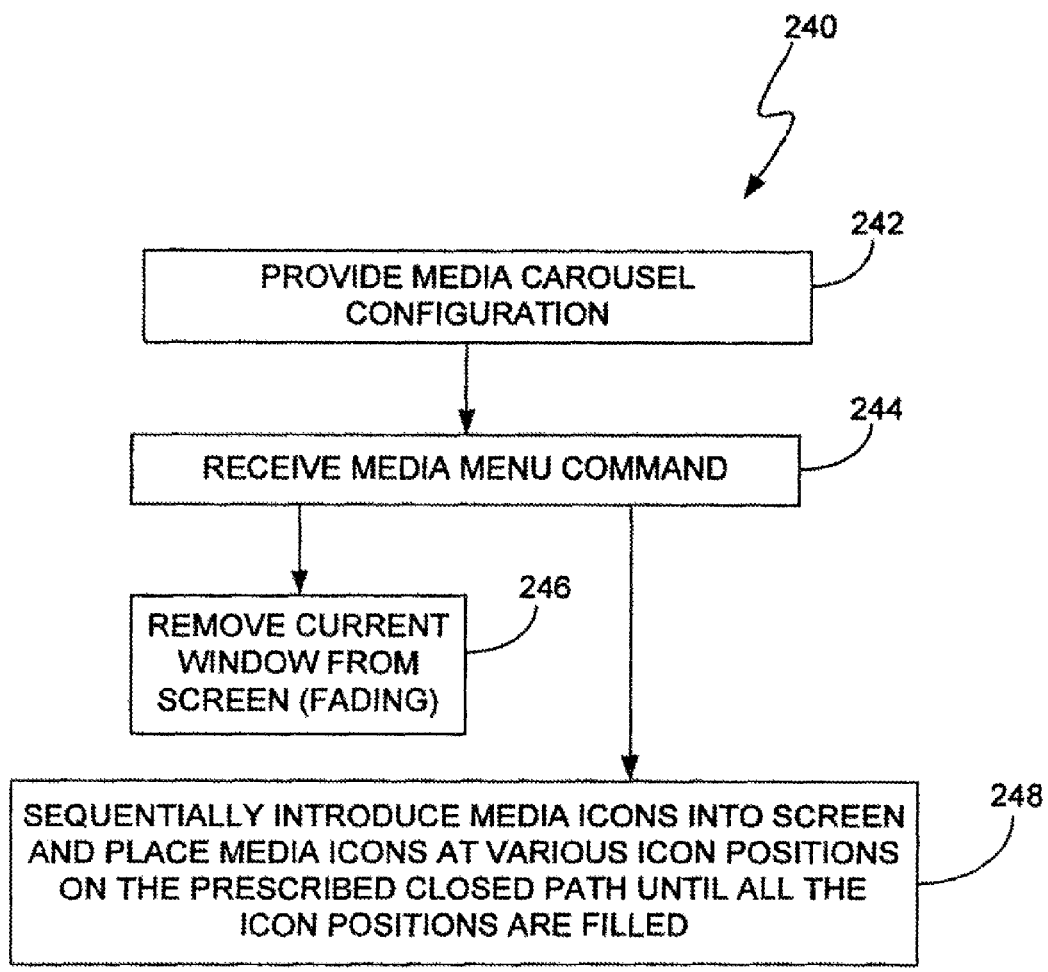
FIG. 8 is a method of transitioning to a media carousel from an application window, in accordance with one embodiment of the present invention.

FIG. 8 is a method 240 of transitioning to a media carousel from an application window, in accordance with one embodiment of the present invention. The method 240 begins at block 242 where a media carousel configuration is provided. The configuration may for example correspond to the carousel described in FIG. 6. As mentioned, the media carousel includes a plurality of icons movably restrained to a prescribed closed path. The icons move between positions including a primary position and one or more secondary positions.

In block 244, a media menu command is received. The command may for example be generated by selecting the menu button on the remote control shown in FIG. 2.

Following block 244, the method proceeds to block 246 where the current window that is being displayed is faded off of the screen. The current window may be associated with a desktop or other application that is being run. At the same time, the current window may be reduced in size and move upwards to the top of the screen. This sequence makes it appear as though the current window disappears into the background.

At the same time, in block 248, the media icons are sequentially introduced into the screen (one after the other), and placed at the various icon positions on the prescribed closed path until all the icon positions are filled. The icons are typically introduced one by one at equal intervals.

In one embodiment, the icons follow the same lead-in path as they are introduced at the side of the screen and move to the closed path of the media carousel.

In another embodiment, the icons follow separate lead in paths as they are introduced from the side of the screen and move to the closed path of the media carousel. Each path leads the icons to different icon positions on the closed path of the carousel. The icon that is set to be placed at the primary position follows a primary lead in path. The icon that is set to be placed at the rightmost secondary position follows a first secondary lead in path. The icon that is set to be placed at the middle back secondary position follows a second secondary lead in path. The icon that is set to be placed at the leftmost secondary position follows a third secondary lead in path. The lead in paths may start at about the same location at the same side of the screen. Alternatively, the lead in paths may start at different locations at the same side of the screen. Alternatively, the lead in paths may start at different locations at different sides of the screen.

In an embodiment, the amount of time it takes to remove the current window is the same amount of time it takes to introduce all the media icons, i.e., removing the current window takes at about the same time as placing all the media icons in their desired positions.

It should be appreciated that the transition between a carousel menu and the current window (e.g., desktop) may be reversed when going from the media carousel to the current window. For example, the media icons may be sequentially removed from the screen (one after the other), and at the same time the current window can be transitioned back into the screen (e.g., fade in, increase size and move downward until window fills screen).

Method of Sequentially Introducing Media Icons into a Screen

Figure 9:
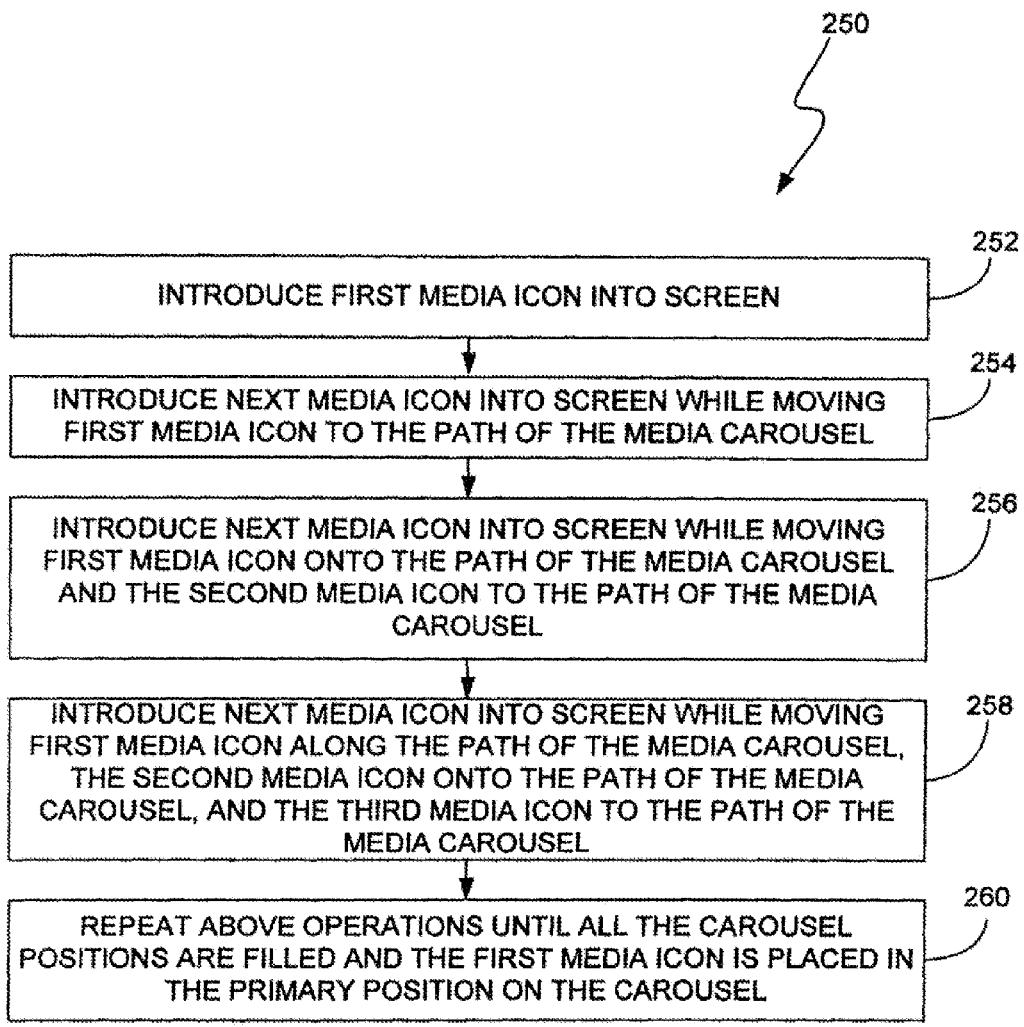
FIG. 9 is a method of sequentially and continuously introducing media icons onto a screen, in accordance with one embodiment of the present invention.

FIG. 9 is a method 250 of sequentially and continuously introducing media icons onto a screen, in accordance with one embodiment of the present invention. The method may for example correspond to block 248 of FIG. 8. The method 250 generally begins at block 252 where the first media icon is introduced into the screen from the side of the screen (see FIG. 10B). The side may be any side of the screen and may even be a corner. The first media icon is typically the media icon that will end up at the primary position.

Figure 10A:
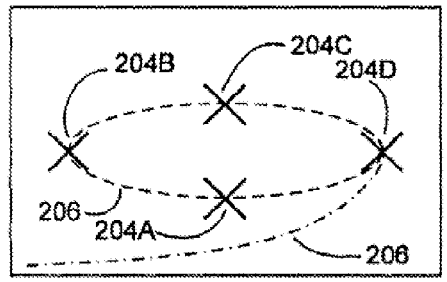
FIGS. 10A-10G are diagrams illustrating the method of sequentially and continuously introducing media icons onto a screen, in accordance with one embodiment of the present invention.
Figure 10B:
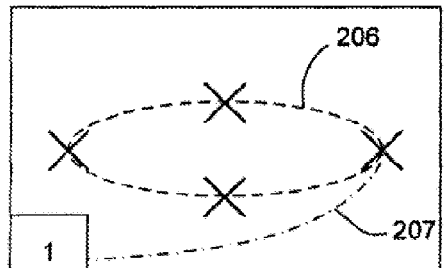
Figure 10C:
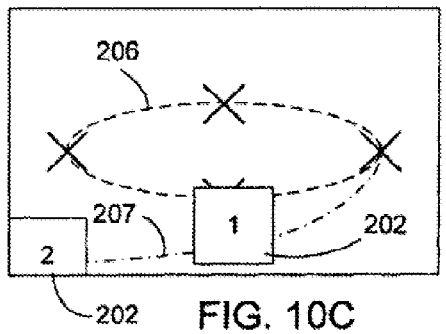

Following block 252, the method proceeds to block 254 where the next media icon is introduced into the screen from the side of the screen while the first media icon is continued to be moved to an entry position on the media carousel (see FIG. 10C). The entry position is typically the furthest position from the primary position. This is typically accomplished in a continuous motion. The first media icon follows a path that that eventually brings it to the entry position.

Figure 10D:
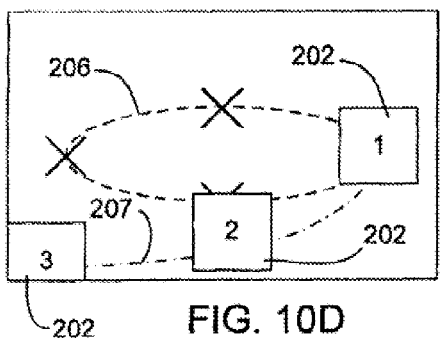

Following block 254, the method proceeds to block 256 where the next media icon is introduced into the screen from the side of the screen while moving the first media icon to the entry position on the prescribed path of the carousel and while moving the second media icon towards the entry position on the media carousel (see FIG. 10D). This is typically accomplished in a continuous motion.

Figure 10E:
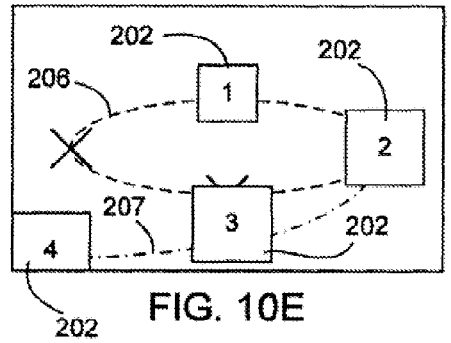

Following block 256, the method proceeds to block 258 where the next media icon is introduced into the screen from the side of the screen while moving the first media icon to the next position on the prescribed path of the carousel, the second media icon to the entry position on the media carousel, and the third media icon towards the entry position on the media carousel (see FIG. 10E). This is typically accomplished in a continuous motion.

Following block 258, the method proceeds to block 260 where the above operations are repeated until all the carousel positions are filled and the first media icon is placed in the primary position on the carousel. For example, in the case of four media icons, the first media icon is moved to the next position on the prescribed path of the carousel, the second media icon is moved to the next position on the media carousel, the third media icon is moved to the entry position on the media carousel, and the fourth media icon is moved towards the entry position (see FIG. 10F). Thereafter, the first media icon is moved to the next position on the prescribed path of the carousel (e.g., primary position), the second media icon is moved to the next position on the media carousel, the third media icon is moved to the next position on the media carousel, and the fourth media icon is moved to the entry position (see FIG. 10G). Thereafter, the media carousel can be operated as discussed in FIG. 7.

FIGS. 10A-10G are diagrams illustrating the method described in FIG. 9. FIG. 10A shows the prescribed path 206 of FIG. 6A along with a secondary path 207. The media icons follow the secondary path when moving into the screen and onto the prescribed path 206. That is, the secondary path delivers the media icons to the path 206 from the side of the screen. Like the carousel path 206, the secondary path may be displayed or hidden from view (preferred).

Figure 10F:
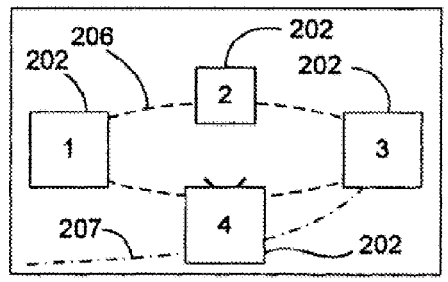
Figure 10G:
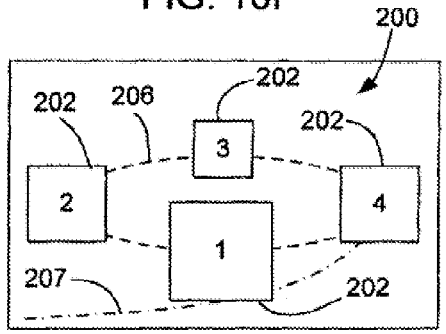

Once the sequence is started, the first icon is brought into view at the left bottom corner of the screen (FIG. 10B). Thereafter, it follows the secondary path 207 towards the entry position 204D and a second icon is brought into view at the left bottom corner of the screen (FIG. 10C). Thereafter, the first icon reaches the entry position 204D of the carousel 200 while the second icon moves towards the entry position 204D and while a third icon is brought into view at the left bottom corner of the screen (FIG. 10D). Thereafter, the first icon moves to the next position 204C of the carousel 200 while the second icon moves into the entry position 204D, the third icon is moved towards the entry position and a fourth icon is brought into view at the left bottom corner of the screen (FIG. 10F). Thereafter, the first icon moves to the next position 204B of the carousel 200, the second icon moves to the next position 204C, the third icon moves into the entry position 204D and the fourth icon is moved towards the entry position 204D (FIG. 10F). Thereafter, the first icon moves to the next position 204A of the carousel 200, the second icon moves to the next position 204I3, the third icon moves into the next position 204C and the fourth icon moves into the entry position 204D (FIG. 10G).

It should be appreciated that the sequence described above may be reversed when transitioning from the media carousel back to the current window (e.g., desktop). Instead of entering the screen, the media icons exit the screen following the same path as they entered. The only difference may be the order of the icons as their positions may have changed since they entered the screen. The icon in the primary position exits last and the icon at the rightmost secondary position exits first. Alternatively, a different secondary path may be used when exiting the carousel. For example, the secondary path may be horizontally flipped such that the icons leave the opposite side of the screen. In this embodiment, the icon in the primary position still exits last, however, the icon at the leftmost secondary position exits first.

Figure 11:
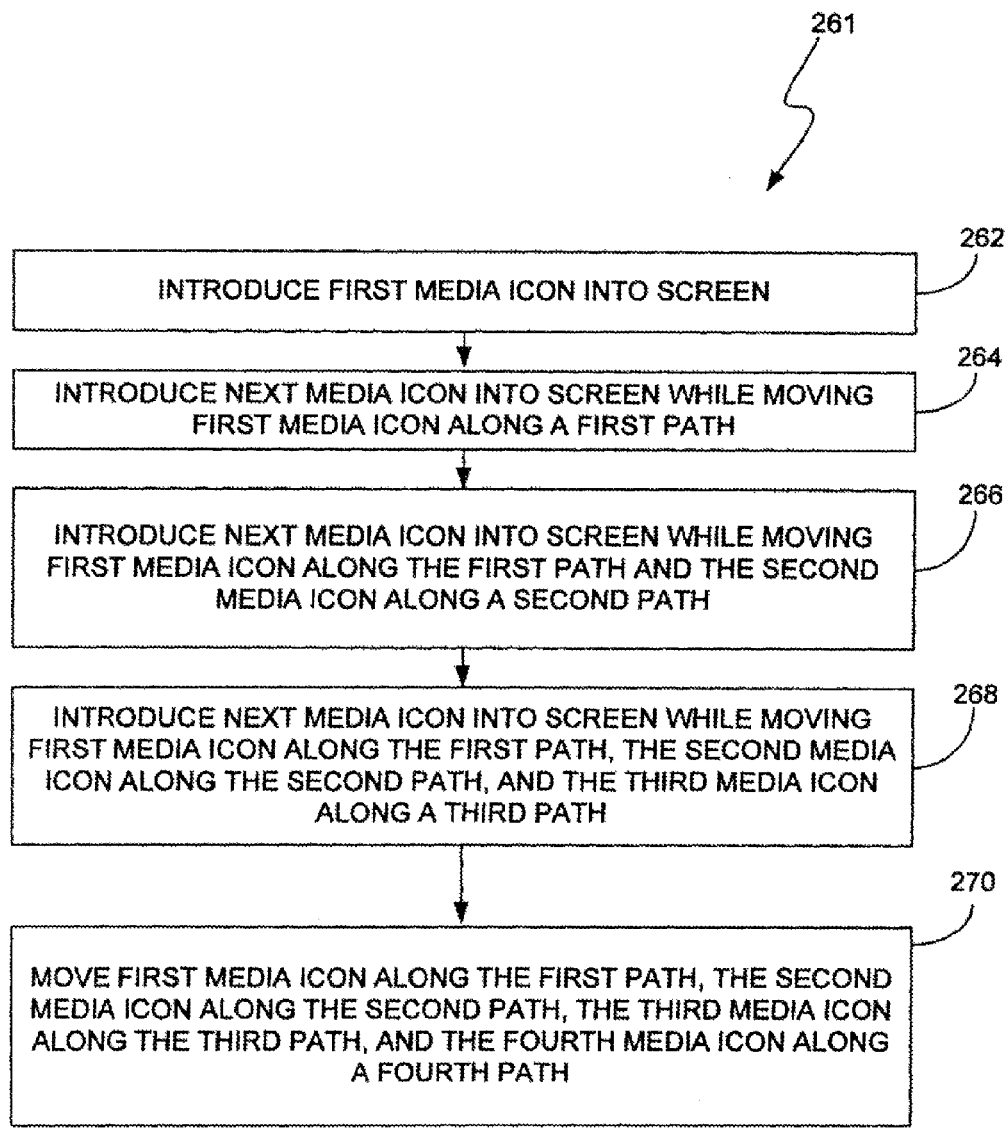
FIG. 11 is a method of sequentially and continuously introducing media icons onto a screen, in accordance with one embodiment of the present invention.

FIG. 11 is a another method 261 of sequentially and continuously introducing media icons onto a screen, in accordance with one embodiment of the present invention. The method may for example correspond to block 248 of FIG. 8. The method is typically accomplished in a continuous motion. The method 261 generally begins at block 262 where the first media icon is introduced into the screen (see FIG. 12B). In most cases, the first media icon is the media icon that was at the primary position when the menu was closed. Although, it should be noted that a default setting could be used.

Figure 12A:
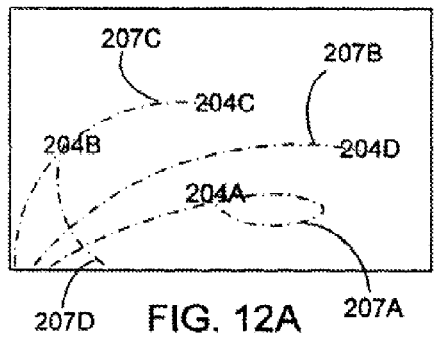
FIGS. 12A-12F are diagrams illustrating the method of sequentially and continuously introducing media icons onto a screen, in accordance with one embodiment of the present invention.
Figure 12D:
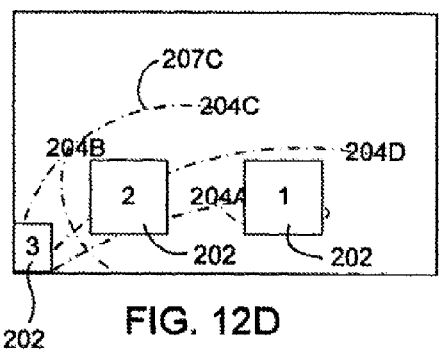
Figure 12B:
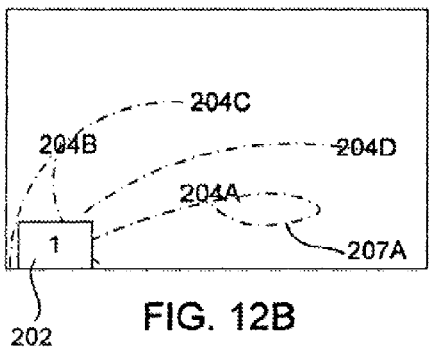
Figure 12E:
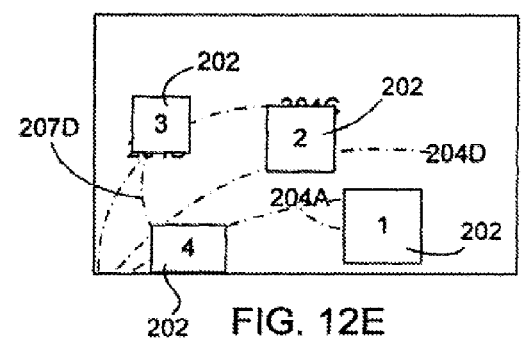
Figure 12C:
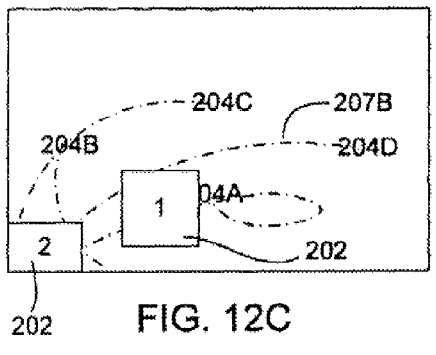

Following block 262, the method proceeds to block 264 where the next media icon is introduced into the screen while the first media icon is moved along a first path towards the primary position of the media carousel (see FIG. 12C).

Following block 264, the method proceeds to block 266 where the next media icon is introduced into the screen while the first media icon is moved further along the first path towards the primary position of the media carousel and the second media icon is moved along a second path towards the rightmost secondary position of the media carousel (see FIG. 12D). The second media icon may reduce in size as it moves along the path from the edge of the screen to its secondary position.

Following block 266, the method proceeds to block 268 where the next media icon is introduced into the screen while the first media icon is moved further along the first path towards the primary position of the media carousel, the second media icon is moved further along a second path towards the rightmost secondary position of the media carousel and the third media icon is moved along a third path towards the middle back secondary position of the media carousel (see FIG. 12E). The third media icon may reduce in size as it moves along the path from the edge of the screen to its secondary position.

Figure 12F:
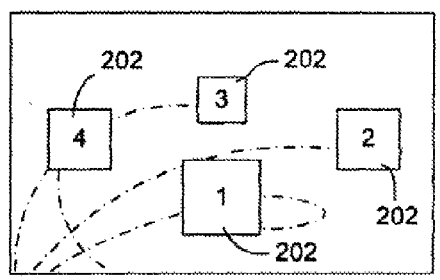

Following block 268, the method proceeds to block 270 where the first media icon is moved further along the first path towards the primary position of the media carousel, the second media icon is moved further along a second path towards the rightmost secondary position of the media carousel, the third media icon is moved further along a third path towards the middle back secondary position of the media carousel, and the fourth media icon is moved towards the leftmost secondary position of the media carousel (see FIG. 12F). The second media icon may reduce in size as it moves along the path from the edge of the screen to its secondary position.

The media icons continue to move along their paths until each media icon reaches its destination on the media carousel. In fact, in one embodiment, the media icons are configured to reach their destination at the same time. This may be accomplished by adjusting the lengths of the paths, the time when the media icons are introduced, and the speed of the media icons as they are moved along their paths.

FIGS. 12A-12F are diagrams illustrating the method described in FIG. 11. FIG. 12A shows the closed path 206 of the media carousel and a plurality of lead in paths 207A, 207B, 207C and 207D. The lead in paths 207A-207D direct the media icons 202 to the icon positions 204A-204D on the closed path 206 of the media carousel 200. The lead in paths 207A-207D are configured to make it appear as if the media icons 202 are rotating or spiraling into position on the carousel 200 (parading or marching into view). Like the carousel path 206, the lead in paths 207A-207D may be displayed or hidden from view (preferred).

The first lead in path 207A starts from the bottom of the screen near the bottom left corner, and ends at the primary position 204A on the closed path 206. The first lead in path 207A may be somewhat arcuate and include a circular portion where the path 207A crosses over itself before ending at the primary position 204A.

The second lead in path 207B starts from the bottom of the screen near the bottom left corner, and ends at the rightmost secondary position 204D on the closed path 206. Like the first lead in path 207A, the second lead in path 207B may be somewhat arcuate. Furthermore, the second lead in path 207B is typically spaced apart and above the first lead in path 207A.

The third lead in path 207C starts from the bottom of the screen near the bottom left corner, and ends at the middle secondary position 204C on the closed path 206. Like the first and second lead in paths, the third lead in path 207C may be somewhat arcuate. Furthermore, the third lead in path 207C is typically spaced apart and above the second lead in path 207B.

The fourth lead in path 207D starts from the bottom of the screen, and ends at the leftmost secondary position 204B on the closed path 206. Like the rest of the lead in paths, the fourth lead in path 207D may be somewhat arcuate. Furthermore, the fourth lead in path 207D typically crosses over the first and second lead in paths 207A and 207B.

As should be appreciated, the layout including the arcuate paths make the icons appears as if they are entering the screen and rotating or spiraling clockwise into position in the carousel. Various paths may be used to provide the same effect.

Once the sequence is started, the first icon 202 is brought into view at the left bottom corner of the screen (FIG. 12B). Thereafter, it follows the first lead in path 207A and a second icon 202 is brought into view at the left bottom corner of the screen (FIG. 12C).

Thereafter, the first icon 202 continues to follow the first lead in path 207A while the second icon 202 follows the second lead in path 20713 and while a third icon 202 is brought into view at the left bottom corner of the screen (FIG. 12D).

Thereafter, the first icon 202 continues to travel along the first lead in path 207A, the second icon 202 continues to travel along the second lead in path 207B, the third icon 202 follows the third lead in path 207C and a fourth icon 202 is brought into view at the left bottom portion of the screen (FIG. 12E).

Thereafter, the first icon 202 moves to the primary position 204A, the second icon 202 moves to the rightmost secondary position 204D, the third icon 202 moves to the middle secondary position 204C and the fourth icon 202 moves to the leftmost secondary position 20413 (FIG. 12F).

The sequence described above may be reversed when transitioning from the media carousel back to the current window (e.g., desktop). Instead of entering the screen, the media icons exit the screen following the same paths as they entered. The only difference may be the order of the icons as their positions may have changed since they entered the screen. The icon in the primary position exits last and the icon at the leftmost secondary position exits first. Alternatively, a different path may be used when exiting the carousel. For example, the paths may be horizontally flipped such that the icons leave the opposite side of the screen. In this embodiment, the icon in the primary position still exits last, however, the icon at the rightmost secondary position exits first.

Feature Menu

Figure 13A:
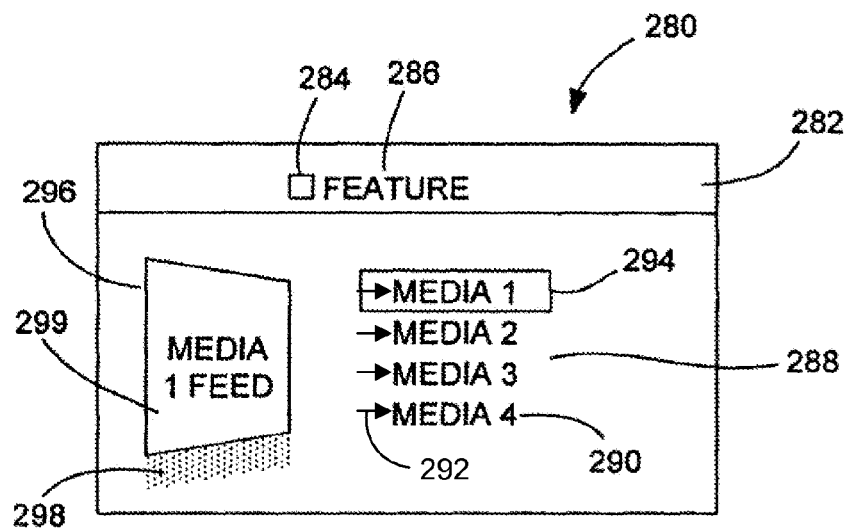
FIGS. 13A-13C are diagrams of a menu, in accordance with one embodiment of the present invention.
Figure 13B:
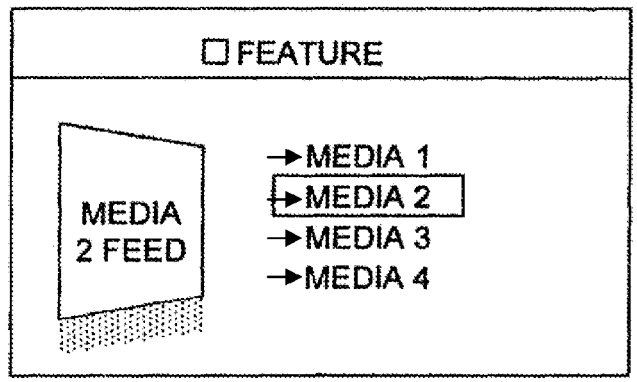
Figure 13C:
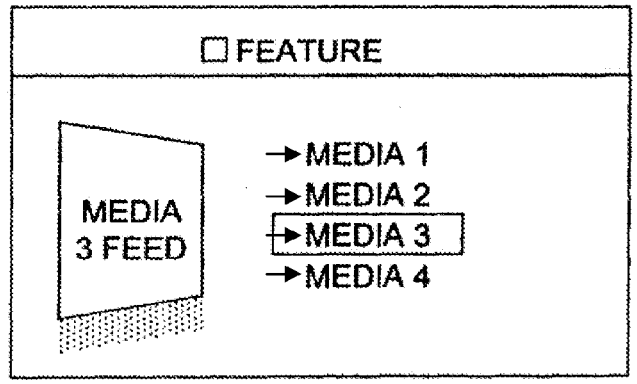

FIG. 13 is a diagram of a graphical user interface for a menu 280, in accordance with one embodiment of the present invention. The menu 280 provides a location where a user can browse through folders (or media items) associated with a particular feature. The menu 280 may for example be a feature menu or a submenu of the feature menu. The feature menu is the screen that appears when the media icon is selected/activated from the carousel. The submenu is the screen that appears when a folder is selected/activated from the feature menu.

The menu 280 includes a header 282 that provides information about the menu 280. For example, in the case of a feature menu, the header may include a media icon 284 and a feature label 286. The media icon 284 is placed next to the feature label 286, and together they are centered on the screen. In the case of a submenu, the header 282 may include a title or name of the submenu (which may be the name of the folder that was activated).

The menu 280 also includes a list of folders 288 (or media items) disposed underneath the header 282. The list 288 includes a collection of folders 290 (or media items) that point to media files. The arrows 292 next to the folders 290 indicate that the folders 290 contain media files. A selector bar 294 is configured to traverse through the list of folders 288 so as to highlight one of the folders 290. That is, the selector bar 294 can be moved vertically from one folder to another (line by line). This may for example be accomplished with the remote control by pressing the navigation pad up or down.

The menu 280 additionally includes a preview window 296 that allows a user to view the contents of the folder 290 that is highlighted with the selector bar 294. This enables a user to make better decisions when selecting/activating a folder 290, i.e., the user can see the contents and therefore decide if the folder is the desired folder for viewing. When a folder 290 is highlighted, the media files associated with the highlighted folder are retrieved from the data store and played at the preview window 296 (see FIG. 13A). When a new folder is highlighted, the previous media files are stopped and the media files associated with the newly highlighted folder are retrieved from the data store and played at the preview window 296 (see FIGS. 1B and 13C). This may be implemented in a seamless continuous manner.

In one embodiment, the preview window 296 may be skewed in order to make it look like it is extending from the foreground into the background. This effect may be created by lowering the top right corner and raising the bottom right corner of each frame of the media file as the media file is played.

In another embodiment, the preview window 296 may include a reflected portion 298 that extends downward from the base of the frame 299. The reflected portion 298 may be created by making a copy of the frame 299 that is being played, cropping the copy of the frame (e.g., shortening), vertically flipping the cropped frame, altering the transparency of the flipped frame from semi transparent at the top to fully transparent at the bottom (e.g., gradient), and attaching the top of the flipped frame to the bottom of the original frame. Thereafter, the combination may be skewed as mentioned above (and as shown).

Method of Presenting a Menu

Figure 14:
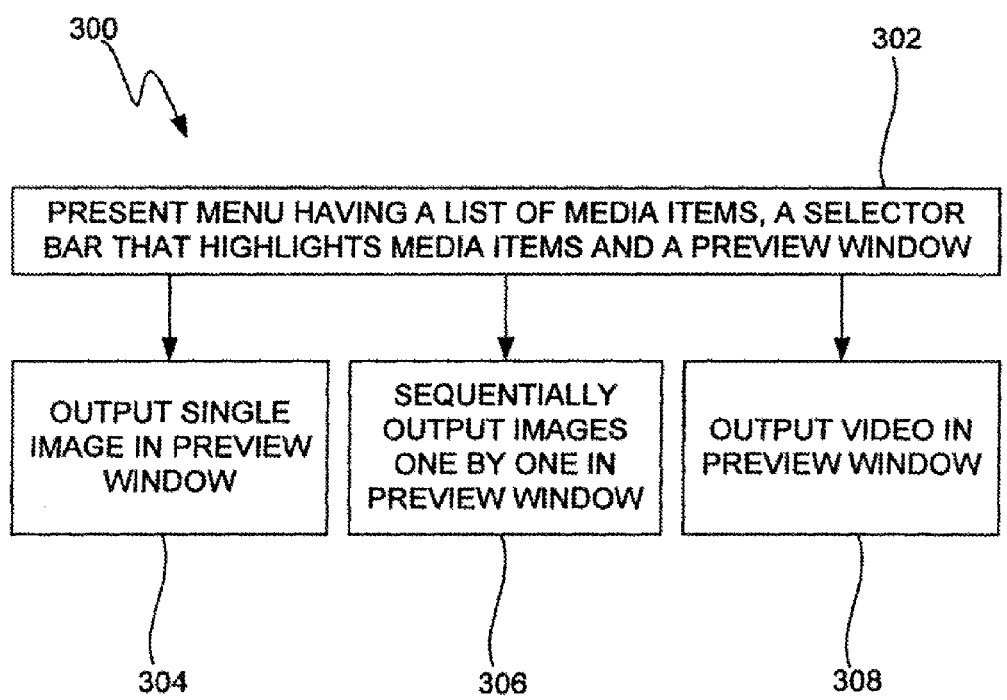
FIG. 14 is a method of presenting a menu, in accordance with one embodiment of the present invention.

FIG. 14 is a method 300 of presenting a menu, in accordance with one embodiment of the present invention. The menu may for example correspond to the menu shown in FIG. 13. The method 300 starts at block 302 where a menu containing a list of media items and a selector bar that moves through and highlights one of the media items are presented.

If the highlighted media item contains or includes a link to an image, the method 300 proceeds to block 304 where the image associated with the highlighted media item is placed in the on the screen next to the list of media items. This may include resizing the images to fit inside the desired locations. This may also include reconfiguring the images to meet a desired appearance (skewing). This may also include providing a reflection of the image.

If the highlighted media item contains or includes a link to multiple images (e.g., photo album), the method 300 proceeds to block 306 where the images associated with the highlighted media items are continuously and sequentially outputted on the screen one at a time next to the list of media items. This may include resizing the images to fit inside the desired locations. This may also include reconfiguring the images to meet a desired appearance (skewing). This may also include providing a reflection of the image. In some cases, transition effects such as cross dissolve, fading, overlap, push and scale down may be used between images. The display timing and transition effects between images may be widely varied, and may be factory set and/or set via a control panel.

If the highlighted media item contains or includes a link to a video file (e.g., consumer movie, home movie, trailer, music video), the method 300 proceeds to block 308 where the playing video of the video file is placed on the screen next to the list of media items. This may include resizing the frames to fit inside the desired locations. This may also include reconfiguring the frames to meet a desired appearance (skewing). This may also include providing a reflection of the frames.

Following blocks 304-308, the media item is launched when the highlighted media item is activated. For example, if the media item is a photo album, the photo application is launched and the photo album is played in accordance with the photo application (e.g., iTunes). If the media item is a movie, the video application is launched and the movies is played in accordance with the video application (e.g., Quicktime).

Method of Previewing a Movie (or Photo Album)

Figure 15:
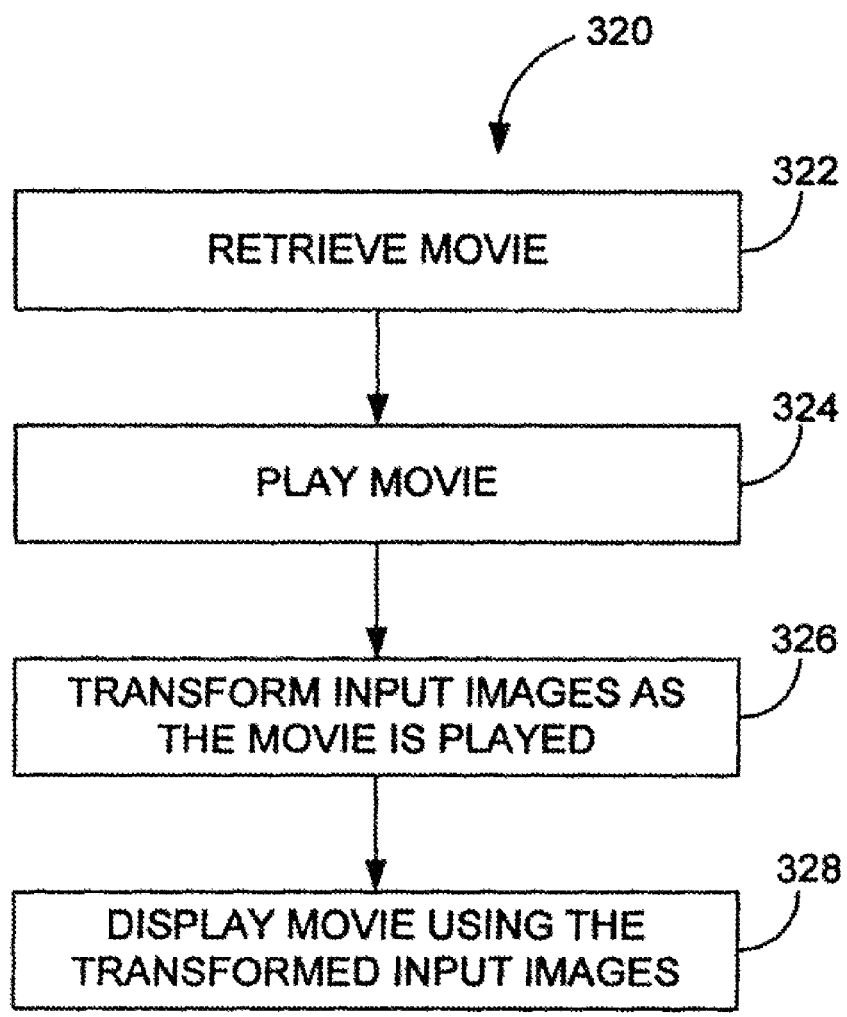
FIG. 15 is a method of previewing a movie or photo album, in accordance with one embodiment of the present invention.

FIG. 15 is a method 320 of previewing a movie or photo album, in accordance with one embodiment of the present invention. The method 320 begins at block 322 where a movie or photo album is retrieved. Thereafter, in block 324, the movie is played by the appropriate application. Thereafter, in block 326, each frame of the movie or each image of the photo album is transformed as the movie or photo album is played, but before it is displayed on the screen. In block 328, the movie is displayed using the transformed frames or images.

Figure 16:
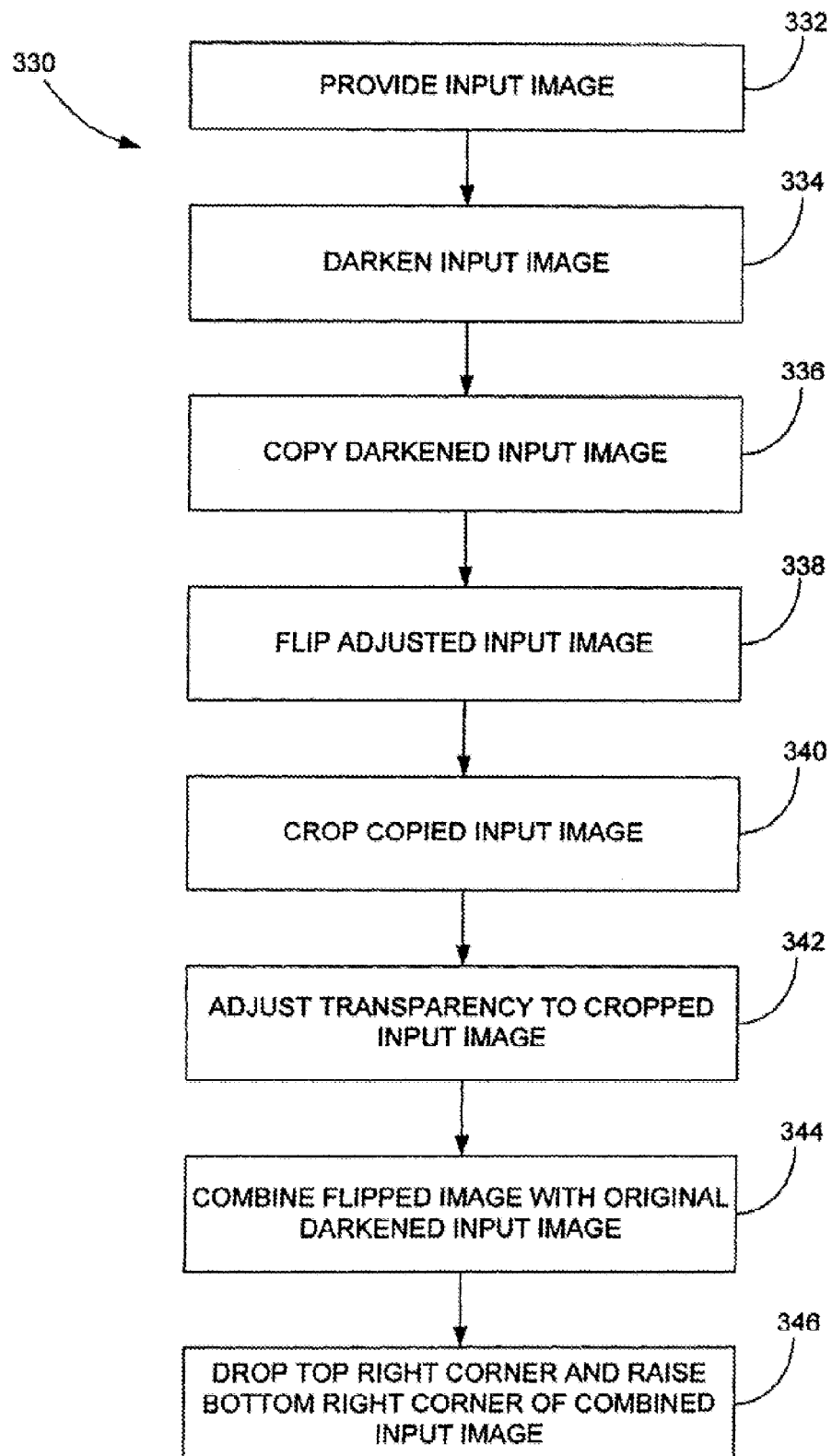
FIG. 16 is a method of reflecting and skewing an input image, in accordance with one embodiment of the present invention.

FIG. 16 is a method 330 of reflecting and skewing an input image, in accordance with one embodiment of the present invention. The method 330 may for example correspond to block 326 in FIG. 15.

The method 330 begins at block 332 where an input image is provided. The input image may for example be a frame of a movie or an image in a slide show or photo album. The input image is typically provided while the movie or slide show is being played.

In block 334, the input image is darkened from the middle to the right edge of the input image. The darkness follows a faded gradient that goes from left to right and that varies from lighter to darker. This makes the image appear as if the right edge is further away from the viewer.

In block 336, the darkened input image is copied, and in block 338, the darkened image is vertically flipped upside down.

In block 340, the bottom of the flipped image is cropped. The height of the cropped image is based on the desired height of the reflected image. The height is typically the maximum height that the reflected image extends downward. In most cases, the height is less than the height of the original image. For example, the height may be less than about 50% the height of original image, and more particularly between about 50% and 40% of the height of the original image, and even more particularly about 40%.

In block 342, the cropped/flipped image from top edge to bottom edge is varied from a low level of transparency (e.g., partially transparent) to a high level of transparency (e.g., fully transparent). In one example, the image is varied from a slight opaque color at the top of the image (70% opaque) to a fully transparent color at the bottom edge of the image (0% opaque). This causes the image to gradually fade into the background color.

In block 344, the transparent image is combined with the base image (e.g., darkened). For example, the top edge of the flipped/transparent image is attached to the bottom edge of the base image. The flipped/transparent image provides the appearance of reflection to the base image.

In block 346, the top right and bottom right corners of the combined image are skewed or moved towards each other thereby tapering the final image. That is, the top right corner is floated downward and the bottom right corner is floated upward. By way of example, the top right corner may be dropped by about 8.5% and the bottom right corner may be raised by about 14%. This completes the effect that makes the right edge of the image look like its further away in space than the left edge.

Method of Transitioning from a Media Carousel to a Feature Menu

Figure 17:
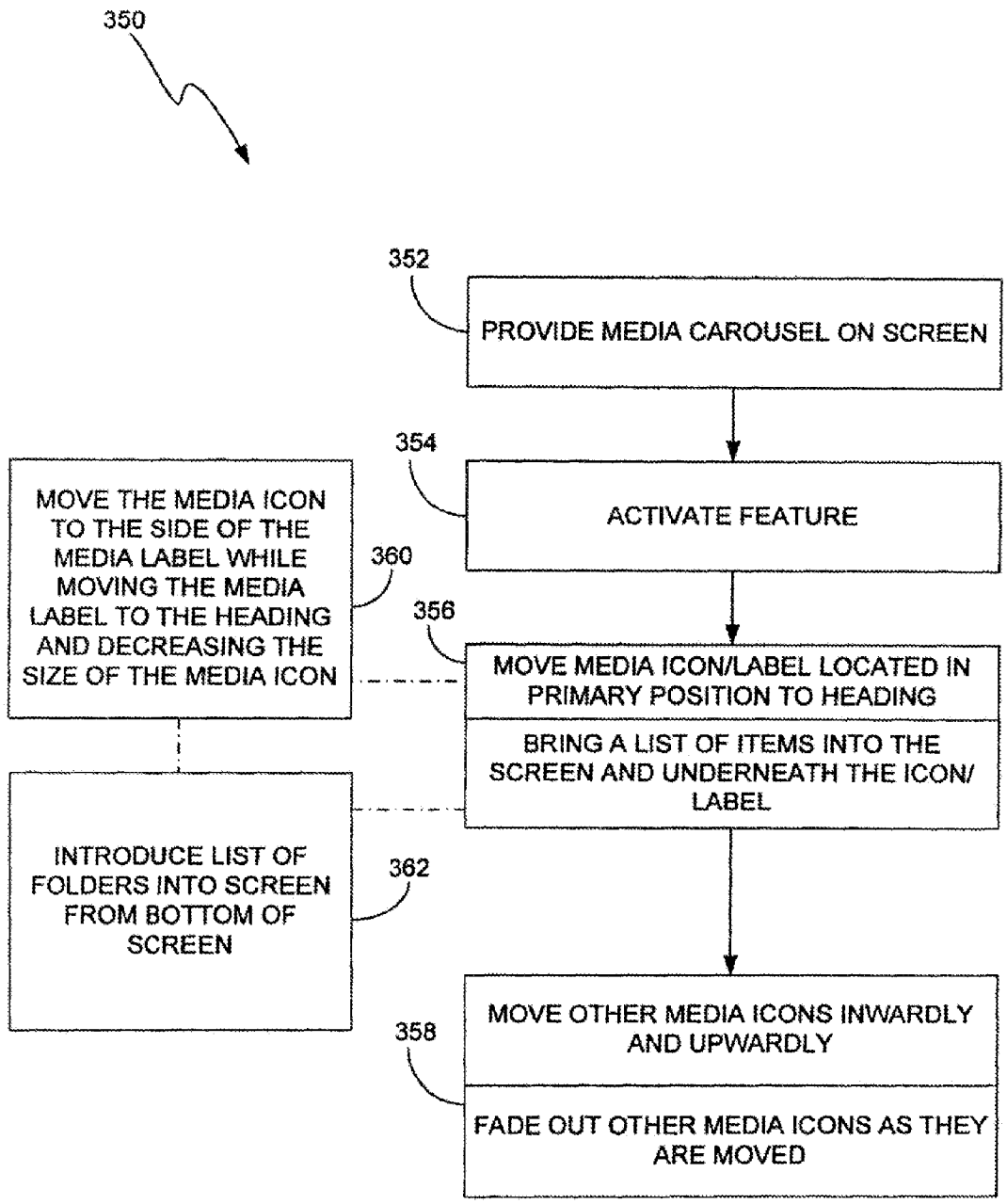
FIG. 17 is a method of transitioning from a media carousel to a feature menu, in accordance with one embodiment of the present invention.

FIG. 17 is a method 350 of transitioning from a media carousel to a feature menu, in accordance with one embodiment of the present invention. The media carousel may for example correspond to the media carousel shown in FIG. 6 and the feature menu may correspond to the menu shown in FIG. 11. The method is illustrated in FIGS. 18A-18D.

Figure 18A:
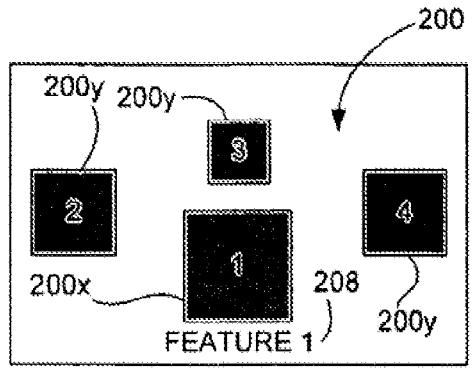
FIG. 18A-18D are diagrams illustrating the method of transitioning from a media carousel to a feature menu, in accordance with one embodiment of the present invention.
Figure 18B:
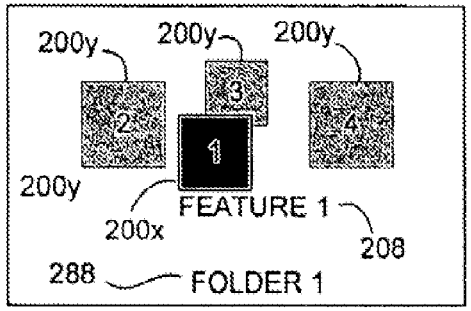

The method 350 beings at block 352 where a media carousel 200 is provided on a screen (see FIG. 18A).

Following block 352, the method 350 proceeds to block 354 where a feature menu command is received. The feature menu command is configured to initiate the opening of a feature menu. By way of example, the features associated with the media icon 202 in the primary position 204A of the media carousel 200 may be activated (Media icon #1 in FIGS. 18A-D).

Following block 354, the method 350 proceeds to transition blocks 356-358 where the screen is transitioned from a media carousel 200 to a feature menu 280. For example, the media carousel 200 is removed from the screen and the feature menu 280 is brought into the screen (see FIGS. 18B-18D).

In block 356, the media icon 202x and label 208 located in the primary position 204A of the carousel 200 is moved to a heading position 282 and a list of folders 288 is brought into view underneath the heading 282.

In block 358, the other media icons 202y of the carousel 200 are moved inwardly towards the vertical center and upwardly towards the top of the screen from their secondary positions 204B-D on the carousel 200. At the same time, the remaining icons are slowly faded off of the screen.

Figure 18C:
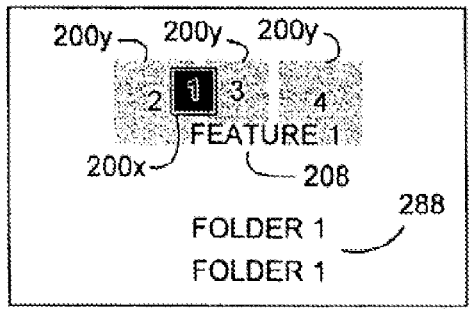
Figure 18D:
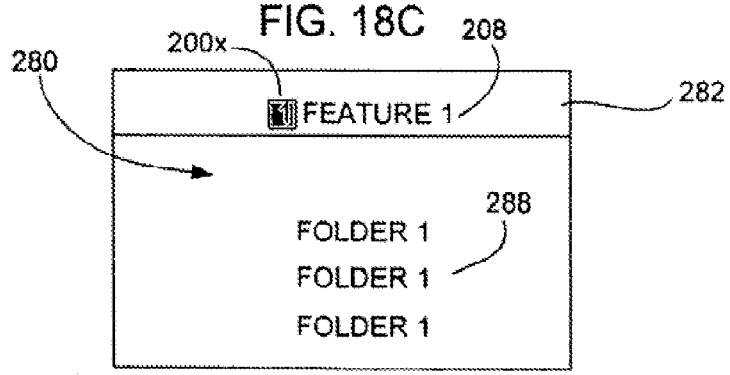

In one embodiment, block 356 is implemented with a transition effect shown in simultaneously occurring blocks 360 and 362. Block 360 includes moving the media icon 202x located in the primary position 204A of the media carousel 200 to the side the media label 208 while moving the media label 208 (substantially front/center of screen) to the top of screen and decreasing the size of the media icon 202x. At the conclusion of the transition (FIG. 18D), the media icon 202x and label 208 have about the same height. Block 362 includes introducing the list of folders 288 into the screen from the bottom of the screen. The list of folders 288 enters the bottom of the screen (FIG. 18B) and moves upward to a point underneath the heading 282 (FIGS. 18C and 18D). Alternatively, the list of folders may be introduced via a fading effect.

Feature Folder

FIGS. 19A-19E are diagrams of a feature folder 380, in accordance with one embodiment of the present invention. The feature folder 380 may for example correspond to the folder 118 shown in FIG. 4.

As shown, the feature folder 380 includes a plurality of thumbnail images or icons 382. Each thumbnail image 382 represents a particular media file. When the thumbnail image 382 is selected and activated, the media application associated with the media file is launched and the media file is played and outputted based on the media application. The media files may be associated with all sorts of media including but not limited to photos, videos, DVD, music, TV, etc. In the case of photos, the thumbnail image may be individual photos or cover photos for a photo album. In the case of videos, the thumbnail images may be movie posters, or album art of a music video. In the case of music, the thumbnail images may be album art. In the case of TV, the thumbnail images may be TV characters, TV scenes or TV posters.

The layout and configuration of the thumbnail images may be widely varied. Referring to FIG. 19B, the thumbnail images 382 may be placed in preset rows 384 and at preset positions 386 within the rows. The number of preset positions 386 generally corresponds to the size of images and the width of the window or screen. Furthermore, the preset positions 386 may be positioned anywhere on the row 384, although in the preferred embodiment, the present positions 386 are substantially equally spaced along the row 384. The number of rows 384 generally correspond to the total number of images 382 to be presented, and the number of positions allowed in each row 384. The thumbnail images can be placed in rows using variety of criteria including for example alphabetically, category, rating, type, etc.

Referring to FIGS. 19C-19D, the rows of thumbnail images are configured to vertically move on and off screen and from one preset row 384 to the next preset row 384. For example, when a navigation command is received, the rows of thumbnail images are all moved up or down one position. That is, they move as group in the vertical direction and stop when they all have shifted to the next preset row. Depending on the direction of movement, either the top row or bottom row is moved off screen thereby allowing a new row to move on screen. If the navigation command is an up command, the rows of thumbnail images typically move downwards one position such that the bottom row moves off and a new top row is introduced. If the navigation command is a down command, the rows of thumbnail images move upwards one position such that the top row moves off and a new bottom row is introduced.

The feature folder may include a primary row 384A and one or more secondary rows 384B and 384C. The primary row 384A is the location where the thumbnail images can be selected and activated. The secondary rows are holding positions, and the thumbnail images located therein are locked from activation. In the instant case, the primary row is the center row, although that is not a requirement.

In order to select images inside the primary row, the feature folder further includes a slider that is only located in the primary row. As shown in FIGS. 19E and 19F, the slider is configured to move horizontally inside the primary row from one preset position to the other. The slider is configured to highlight the thumbnail image to be selected. That is, the highlighted thumbnail image will be the media file that is launched if an activation signal is provided. The slider may be widely varied. In the illustrated embodiment, the slider is embodied as a border that surrounds the thumbnail image.

In one embodiment, the title of the thumbnail image appears in a header 390 when the thumbnail image is highlighted. For example, the label "Title 2C" appears inside the header 390 when the image 2C is highlighted (as shown in FIG. 19B), the label "Title 3C" appears inside the header 390 when the image 3C is highlighted (as shown in FIG. 19C), the label "Title 3B" appears inside the header when the image 313 is highlighted (as shown in FIG. 19D), the label "Title 3D" appears inside the header 390 when the image 3D is highlighted (as shown in FIG. 19E). The title may for example correspond to the title of the movie, song, music video, photo album or the like. Other information 392 relating to the highlighted thumbnail image or the media file associated therewith may also be presented in the header 390. For example, in the case of a movie or movie trailer, the movie rating may be placed in one corner, and the media icon associated with the feature of the feature menu may be placed in the opposite corner. Alternatively, instead of a title, other information relating to the thumbnail image may be given as for example actors, director, artist, etc.

Method of Displaying Media and Traversing Through the Displayed Media (Trailers)

Figure 20:
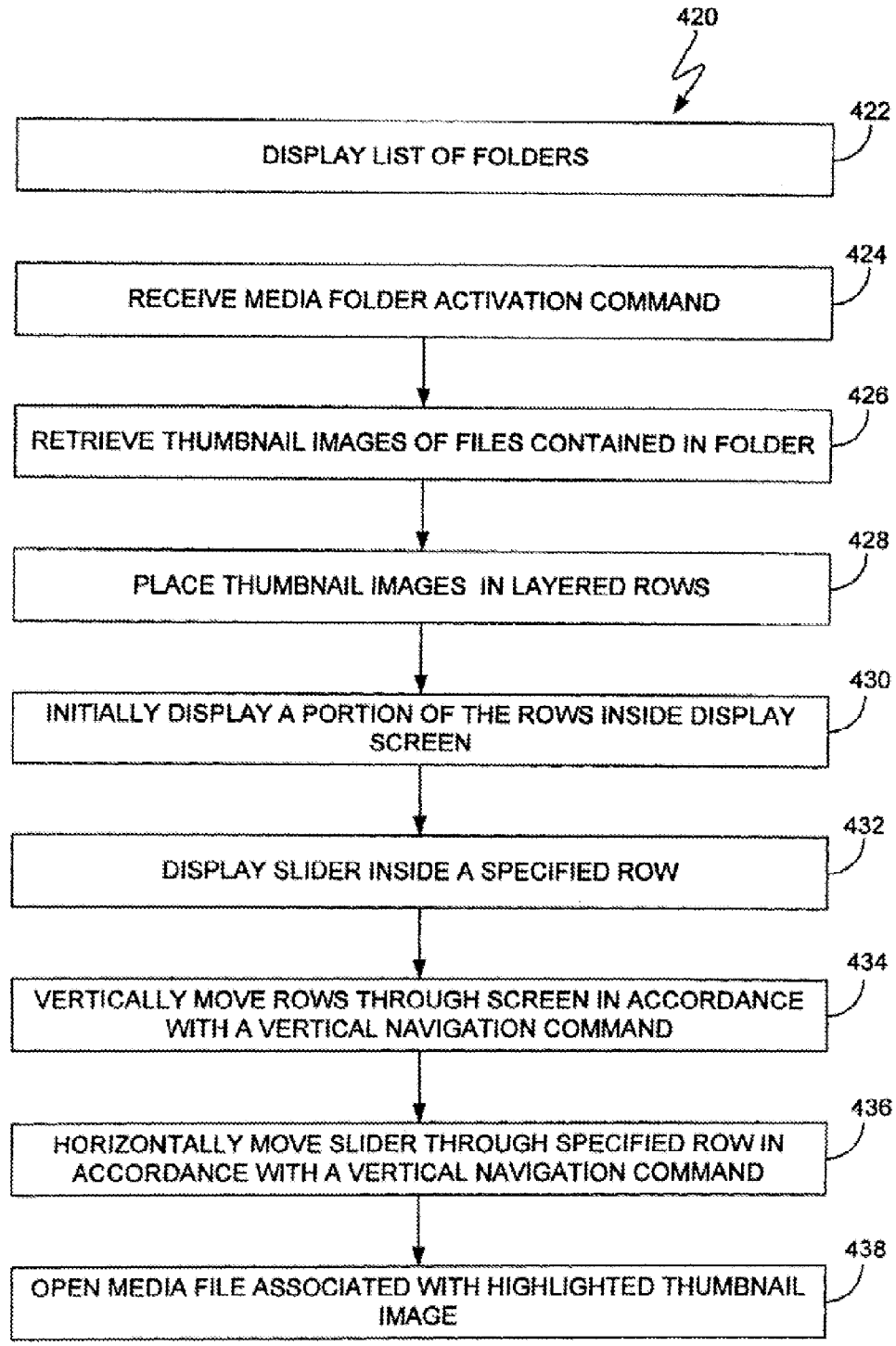
FIG. 20 is a method of displaying media and traversing through the displayed media, in accordance with one embodiment of the present invention.
Figure 21A:
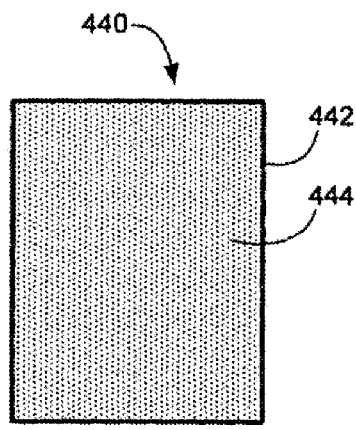
FIGS. 21A-21F are diagrams of a slider for browsing through a group of images, in accordance with one embodiment of the present invention.
Figure 21B:
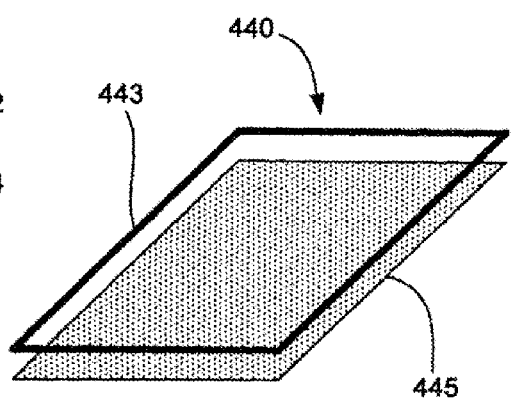
Figure 21C:
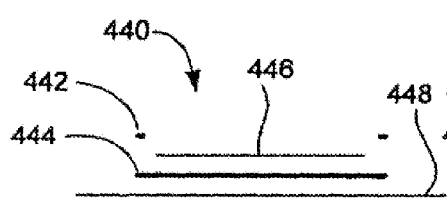
Figure 21D:
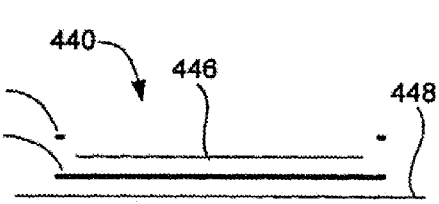
Figure 21E:
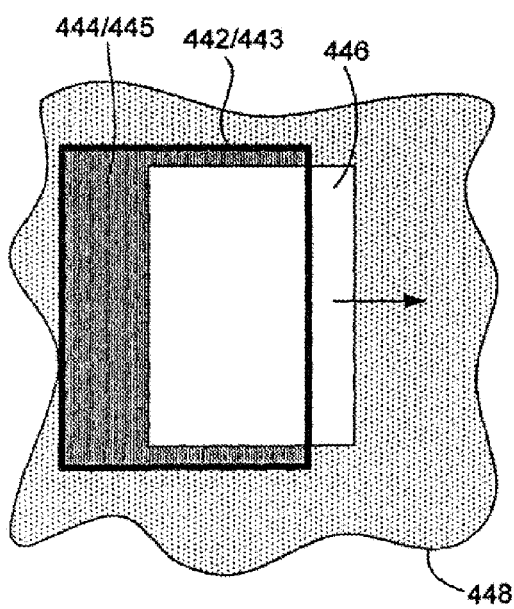
Figure 21F:
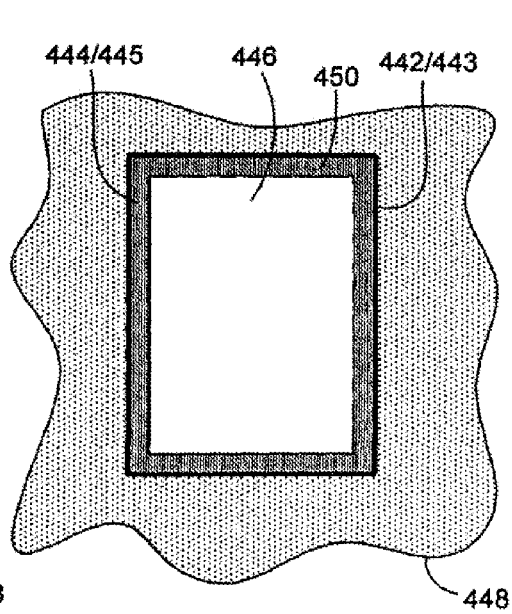

FIG. 20 is a method 420 of displaying media and traversing through the displayed media, in accordance with one embodiment of the present invention. The method includes block 422 where a list of folders are displayed (see for example FIG. 4 or FIG. 13).

Following block 422, the method proceeds to block 424 where a media activation command is received. The command indicates the folder to be opened. For example, a folder is highlighted with a selector bar, and activated with a button click from a remote control.

Following block 424, the method proceeds to block 426 where thumbnail images representing data files contained in the folder are retrieved. For example, they may be retrieved from a local data store or a remote data store (e.g., internet).

Thereafter, in block 428, the thumbnail images are placed in layered rows (e.g., row disposed over row). The images are typically placed at specific positions inside the rows. The number of positions in each row generally depends on the size of the thumbnail images and the width of the window or screen in which the thumbnail images will be viewed (e.g., width of screen).

Following block 428, the method proceeds to block 430 where some of the layered rows are initially displayed. The displayed rows are typically seated at specific lines or row positions inside the window. The remaining rows are not displayed, and remain off screen. The number of specific lines typically depends on the height of the images and the height of the window. The rows are configured to move vertically up and down so that rows currently outside of the viewing area can be seen. In most cases, as a row is moved out of the viewing area, the next row in the sequence of rows appears inside the viewing area.

At the same time, in block 432, a slider is displayed at one of the specified lines or row positions and at one of the image positions inside the row. In one embodiment, the slider is vertically fixed at the specific line or row, i.e., stays at the specified row position and does not move vertically. The slider does however move horizontally within the specific row from one image to the other. The slider can therefore be used to highlight any of the images found in the row.

If a vertical scroll command is received, the method proceeds to block 434 where the rows are vertically moved in accordance with the vertical scroll command. For example, when a user scrolls down, a new row appears at the bottom of the viewing area and all other rows move up one position. If the viewing area is full (specified rows), the top row moves out of the viewing area. Similarly, when a user scrolls up, each new row appears at the top of the viewing area and all other rows move down one position. If the viewing area is full, the bottom row moves out of the viewing area.

If a horizontal command is received, the method proceeds to block 436 where the slider is moved in accordance with horizontal scroll command. For example, when a user scrolls left, the slider moves over one position to the left, and when the user scrolls right, the slider moves over one position to the right.

If an activation command is received, the method proceeds to block 438 where the media file associated with the highlighted thumbnail image is opened. For example, a media application capable of playing the media item is launched, the media data associated with the media item is retrieved and thereafter the media data is played and outputted on the screen. The media data may for example be retrieved from a local data store or a data store located at a remote location (e.g., internet, network, etc.).

Sleeve

FIGS. 21A-21F are diagrams of a slider 440 for browsing through a group of images (media items), in accordance with one embodiment of the present invention. The slider may for example correspond to the slider shown in FIG. 19. In this particular embodiment, the slider 440 is configured as a sleeve that includes an upper layer 442 and a lower layer 444. The upper and lower layers 442 and 444 are an integral unit that move together to highlight a thumbnail image 446. The upper layer 442 slides over the top of the thumbnail image 446 and the lower layer 444 slides under the thumbnail image 446. Furthermore, the lower layer 444 slides over the background image 448.

As shown in the various figures, the upper layer 442 is embodied as a border 443 that surrounds the image 446 so that the image 446 can be viewed. The lower layer 444 is embodied as a full sheet 445 with similar outer dimensions as the border 443. The border 443 is generally sized to be larger than the image 446 thereby creating a gap 450 between the outer edge of the image 446 and the inside edge of the border 443. The gap 450 allows the sheet 445 to be seen. The lower sheet 445 may be solid opaque surface that covers and blocks the background 448 or alternatively the lower sheet 445 may be semi transparent. By being semi transparent the background can be seen through the lower sheet. Because its semi transparent, the color of the lower sheet 445 blends with the color of the background 448 and therefore the region where the lower sheet overlays the background is different than the rest of the background. Some may say that the lower sheet produces a tinting or shadow effect over the background.

Method of Transitioning Between a Feature Menu and an Application Window Associated with the Feature Menu (DVD)

Figure 22:
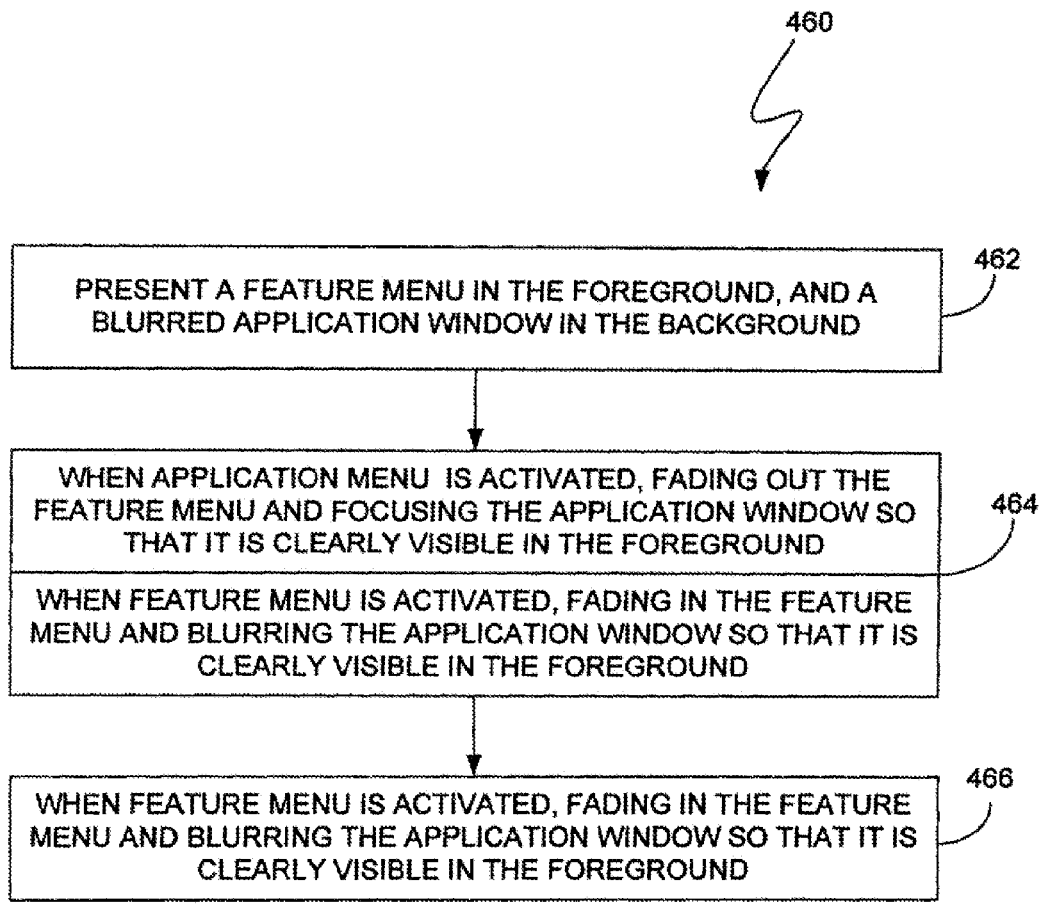
FIG. 22 is a method of transitioning between a feature menu and an application menu associated with the feature menu, in accordance with one embodiment of the present invention.

FIG. 22 is a method 460 of transitioning between a feature menu and an application menu associated with the feature menu, in accordance with one embodiment of the present invention. The feature menu may for example correspond to a DVD feature menu (see FIG. 4) and the application menu may be the main menu of the DVD that is being played.

The method 460 includes, in a first state (block 462), presenting a feature menu in the foreground, and blurring and placing the application menu in the background. See for example FIG. 23A, which shows a feature menu 480 in the foreground and a blurred application window 482 in the background.

The method 460 also includes, in a second state (block 466), presenting the application window clearly in the foreground, and removing the feature menu from the screen. See for example FIG. 23C, which shows an application window 482 in the foreground and no feature menu 480.

Figure 23A:
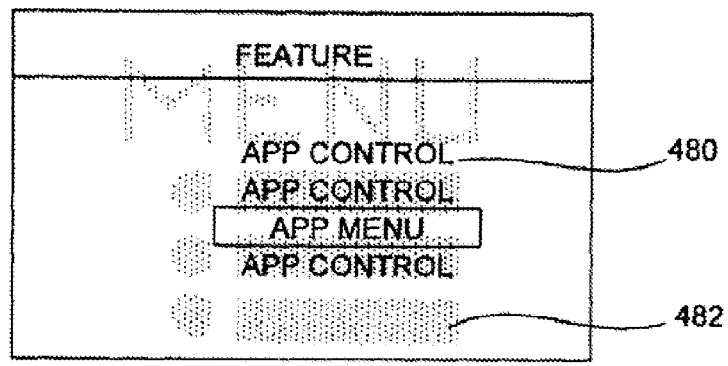
FIGS. 23A-23C are diagrams illustrating the method of transitioning between a feature menu and an application menu associated with the feature menu, in accordance with one embodiment of the present invention.
Figure 23B:
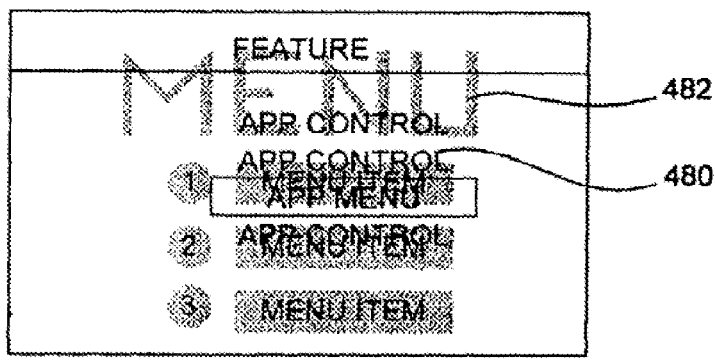
Figure 23C:
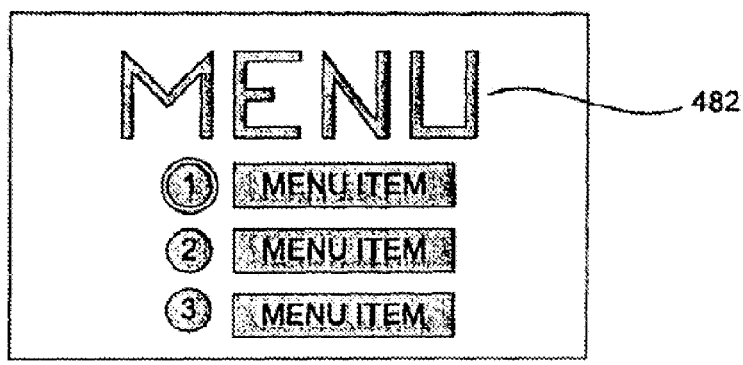

The method also includes (block 464), performing a transition effect when transitioning between the first and the second states (blocks 462 and 466). When transitioning from the first state to the second state, as for example when the application menu option is selected and activated, the transition effect (block 464) includes fading out the feature menu 480 off of the screen, and at the same time and in a continuous manner focusing the blurred application window 482 so that it is un-blurred and clearly visible in the foreground. See for example FIGS. 23B and 23C. In FIG. 23B, the feature menu 480 is partially faded (partially transparent) and the application window 482 is partially blurred. In FIG. 23C, the feature menu 480 has disappeared and the application is no longer blurred (focused).

When transitioning from the second state to the first state, as for example when the menu button on the remote control is activated, the transition effect works in reverse. The reverse transition effect (block 464) includes fading the feature menu 480 into the screen so that the feature menu is in the foreground, and at the same time, continuously blurring and placing the application window 482 in the background. See for example FIGS. 23B and 23A. In FIG. 23B, the feature menu 480 is partially faded (partially transparent) and the application window 482 is partially blurred. In FIG. 23A, the feature menu 480 is in full view (no longer transparent) and the application window 482 is fully blurred behind the feature menu 480.

Method of Superimposing an Overlay Over a DVD

Figure 24:
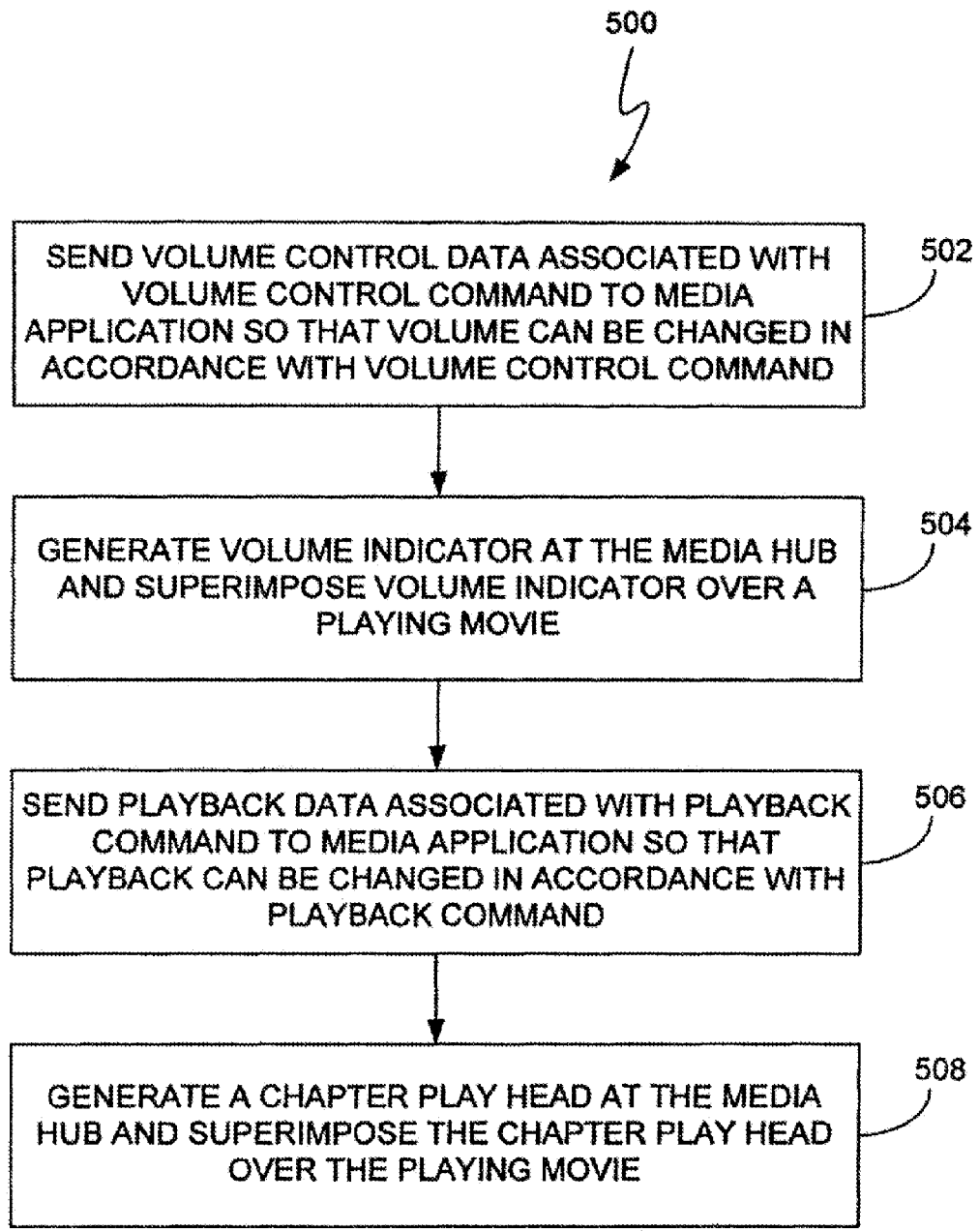
FIG. 24 is a method of superimposing an overlay over an application window, in accordance with one embodiment of the present invention.

FIG. 24 is a method 500 of superimposing an overlay over an application window, in accordance with one embodiment of the present invention. The method is generally performed in an environment where a media hub is loaded over a media application (e.g., DVD application), and the media application has been instructed to play, and is playing a media file (e.g., DVD movie). The playback may have been implemented via the DVD feature menu of the media huh (e.g., selecting and activating the START MOVIE control option in the DVD feature menu) or alternatively the main menu of the DVD (e.g., selecting and activating the START MOVIE control Option in the main menu).

In block 502, if a volume control command is received at the media hub. the volume control data associated with the command is sent to media application so that the volume can be changed in accordance with the volume control command.

In block 504, the media hub generates a volume indicator and superimposes the volume indicator over the playing movie. The volume indicator includes a border and an indicator bar that fills the border according to the current volume setting, i.e., the border is more filled when the setting is high and less filled when the setting is low. A transition effect such as fading in may be used when bringing the volume indicator into view. The volume indicator remains displayed for a preset amount of time after the volume command is received. Once the time is over, the volume indicator is removed from the screen. If multiple commands are received within the preset amount of time, then the time out starts from the last command received. A transition effect such as fading out may be used when the volume indicator is removed from the screen. The volume indicator may be similar to the volume indicator shown in FIG. 31B.

In block 506, if a playback command is received at the media hub, the playback data associated with the command is sent to media application so that the playing movie can be changed in accordance with the playback command (e.g., play, pause, skip, chapter ahead, etc.).

In block 508, the media hub generates a chapter play head and superimposes the chapter play head over the playing movie. A transition effect such as fading in may be used when bringing the chapter play head into view. The chapter play head includes a border and a sliding indicator (e.g., diamond) that moves horizontally within the border. The position of the sliding indicator indicates where the movie is currently playing relative to the entire movie. The chapter play head may additionally include a chapter label centered over the sliding indicator. The chapter label includes the current and total number of chapters, and moves with the sliding indicator. The current chapter of the chapter label may be configured to change in accordance with the current chapter. The chapter play head remains displayed for a preset amount of time after the playback command is received. If multiple commands are received, then the time out starts from the last command received. A transition effect such as fading out may be used when the time out is reached. The chapter playhead may be similar to chapter playhead shown in FIG. 31C with the exception that the chapter play head of the described embodiment additionally includes a chapter label disposed above the diamond.

Method of Implementing a Virtual Chapter Mark (DVD)

Another aspect of the invention pertains to intelligent navigation of sequential media content. In one embodiment, the intelligent navigation allows a user to skip forward or backward through the sequential media content. For example, a user can signal a media control center via a remote controller to inform a media playback application to skip forward or backward. Typically, the sequential media content will have chapter positions and enable a user to sequentially transition to the beginning of chapters (e.g., using a next or previous command on a remote controller). The intelligent navigation allows a user to transition to chapters while also remembering its initial transition point inside the chapter so that the user can decide to transition back to the initial transition point. This initial transition point can be referred to as a virtual chapter. The media control center can maintain one or more virtual chapters to provide users with an intelligent navigation experience.

Figure 25A:
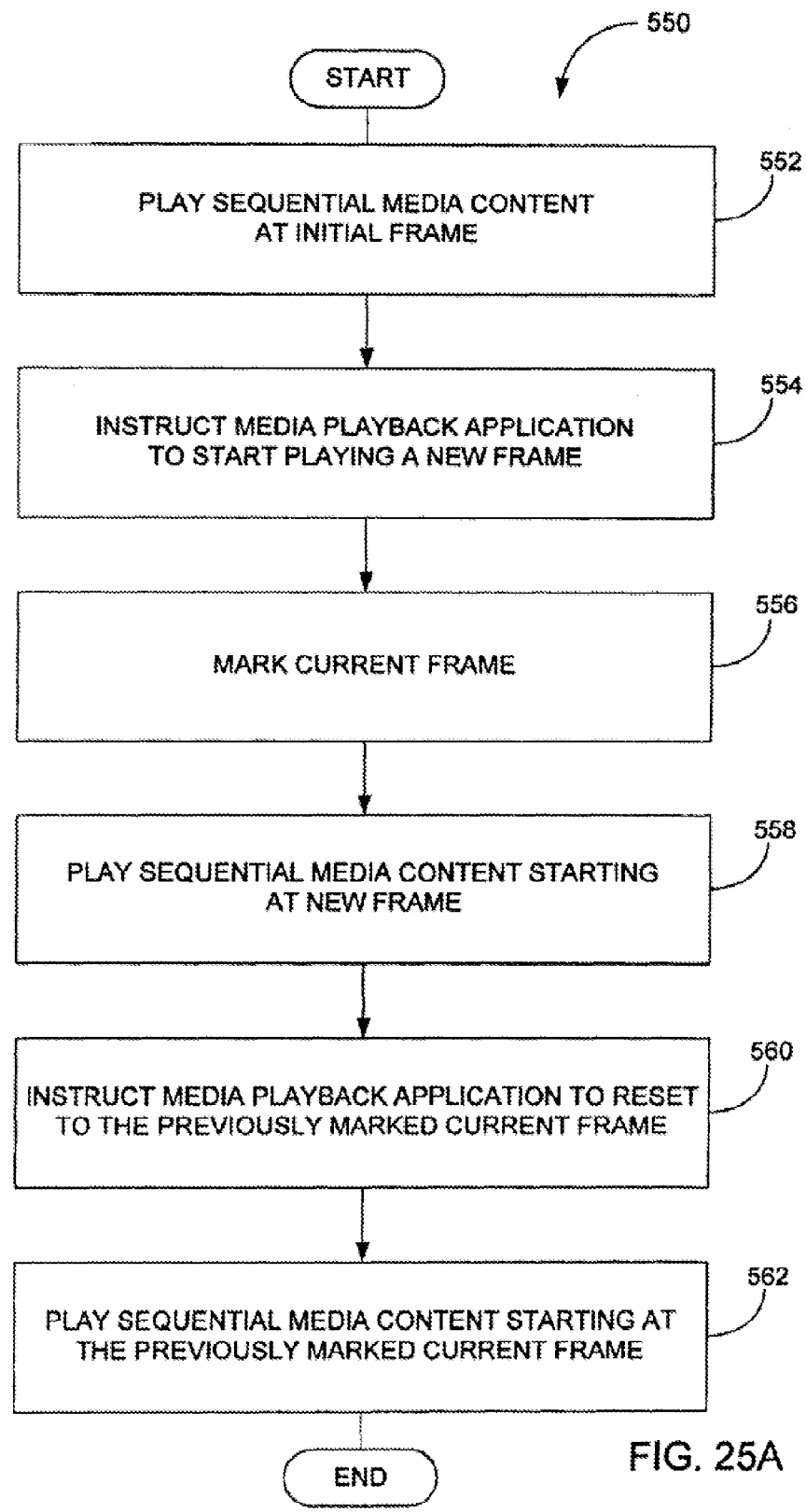
FIG. 25A is a flow diagram of a media play process, in accordance with one embodiment of the present invention.

FIG. 25A is a flow diagram of a media play process 550 according to one embodiment of the invention. The media play process 550 is, for example, performed by a media control center in response to user input commands. In one embodiment, the user input commands can be provided by a remote controller that wirelessly communicates with the media control center.

The media play process 550 initially plays 552 sequential media content at an initial frame. Namely, in response to a play request from a user, the media control center will instruct a media playback application to begin playing the sequential media content at the initial frame. As an example, the sequential media content can pertain to a DVD movie and the media playback application can pertain to a DVD player that operates on a computer, such as a multimedia computer. While the sequential media content is being played by the media playback application, the user can instruct the media control center to jump to another location within the sequential media content and continue playing therefrom. In such case, the media playback application is instructed 554 to start playing at a new frame. The new frame can be identified by a frame indicator, such as a chapter marker, or can be indicated by a timer offset relative to either a frame or the start of the sequential media content. In addition, the media control center marks 556 a current frame where the media playback application was operating when the user requested to jump to another location (e.g., new frame). After the media playback application has been instructed 554 and the current frame has been marked 556, the sequential media content is played 558 by the media playback application starting at the new frame. In effect, the media playback has jumped from the current frame to a new frame. As one example, the new frame is the beginning of an adjacent chapter. Thereafter, a user can instruct the media control center to resume or reset its play position to a prior frame, namely, the current frame that was marked 556. In such case, the media playback application is instructed 560 to reset to the previously marked current frame. Then, the sequential media content is played 562 starting at the previously marked current frame. Here, the media play back is effectively resuming at the point where playing previously left off. At this point, the sequential media content can continuously play until all of the media content has been played. At which point, the media play process 550 ends.

Figure 25B:
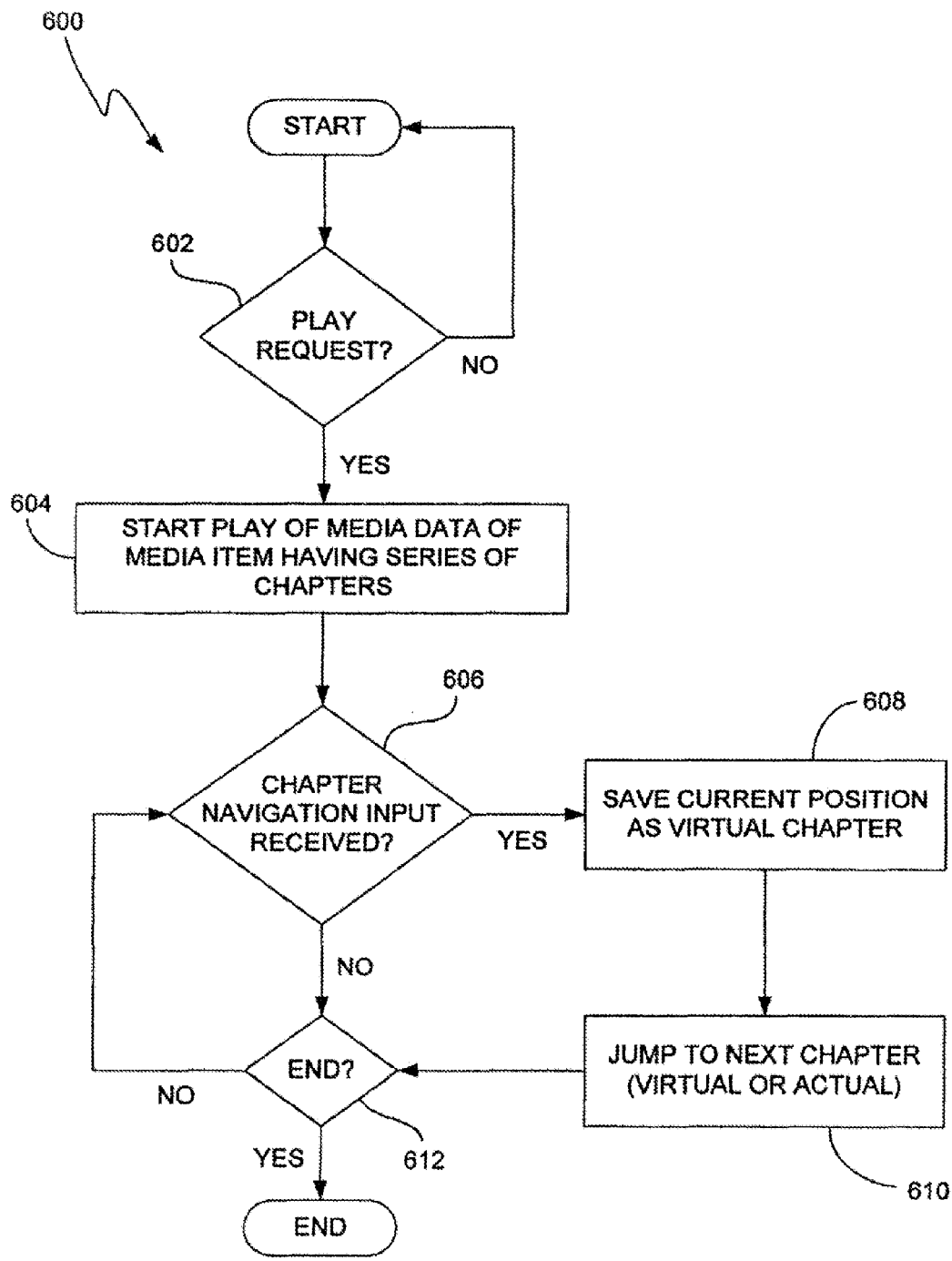
FIG. 25B is a flow diagram of a media navigation process, in accordance with one embodiment of the present invention.

FIG. 25B is a flow diagram of a media navigation process 600 according to one embodiment of the invention. The media navigation process 600 provides intelligent navigation through sequential media content. In one implementation, the media play process 600 can be performed by a media control center.

The media navigation process 600 begins with a decision 602 that determines whether a play request has been received. For example, in one embodiment, a user can initiate a play request by way of a remote controller. However, in other embodiments, a user can initiate a play request by way of a keyboard, a mouse, or other user input device. Upon receiving the play request, media data of a media item associated with the play request can start to be played 604. The media data of the media item is played by a media playback application. The media item can also separate the media data include a series of chapters. Next, a decision 606 determines whether a chapter navigation input has been received during the playing of the media data of the media item. The chapter navigation input is a user request via a remote controller or other input devices as noted previously. For example, a chapter navigation input can pertain to a next chapter input or a previous chapter input. When the decision 606 determines that a chapter navigation input has been received, then a current position within the media data of the media item is saved 608 as a virtual chapter. Here, at the point at which the navigation input is received, the playing of the media data is normally at a random position within a chapter. Hence, the current position is saved as a virtual chapter. This subsequently allows the current position to be returned to in response to a chapter navigation input. The current position being saved 608 as a virtual chapter can be saved as a time offset relative to the media item (e.g., from beginning of a chapter or from start of the media item).

After the current position has been saved 608 as a virtual chapter, the playing of the media data of the media item jumps 610 to a next chapter. The next chapter can be either in a forward direction or a reverse direction, depending upon the chapter navigation input by the user. In addition, the next chapter can be an actual chapter of the media data for the media item or can be a virtual chapter such as stored at block 608. As such, in some cases, the play position for the media data jumps to a virtual chapter which represents a prior current position from which a chapter navigation previously navigated from.

Following the block 610, or following the decision 606 when a chapter navigation input has not been received, a decision 612 determines whether the media navigation process 600 should end. The media navigation process 600 can end upon request from a user request or upon completion of playing of the media data of the media item. When the decision 612 determines that the media navigation process 600 should not end, the media navigation process 600 returns to repeat the decision 606 to allow for additional chapter navigation as well as playing of the remaining portion of the media data of the media item. On the other hand, when the decision 612 determines that the media navigation process 600 should end, the media navigation process 600 ends.

Figures 25C, 25D:
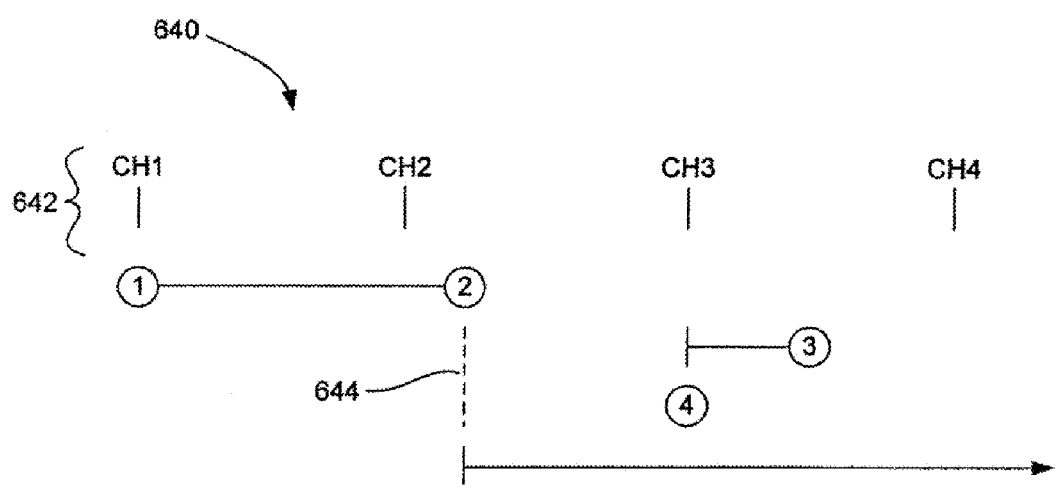
FIGS. 25C and 25D help illustrate the use of virtual chapters, in accordance with one embodiment of the present invention.

FIGS. 25C and 25D help illustrate the use of virtual chapters according to one representative example of one embodiment of the invention. In this example, the virtual chapter is stored and then subsequently utilized to provide an intelligent return to the prior position at which the user had not yet watched or heard the media data of the media item being played. In one embodiment, this representative example can be considered an intelligent rewind operation.

FIG. 25C illustrates a table 620 that contains four sequential user inputs and their associated commands. These commands, in one example, are provided by a user interacting with a remote controller. The remote controller sends these commands to a media control center which forwards the commands to a media playback application that is playing a sequential media item. FIG. 25D illustrates a timeline 644 for playing of a sequential media item 642 having a plurality of predetermined chapters. The sequential media item 642 includes chapter 1 (CH1), chapter 2 (CH2), chapter 3 (CH3), chapter 4 (CH4), etc. The timeline 644 indicates the time at which the four sequential user inputs indicated in the table 620 were input. The first command is a "play" command and causes the sequential media item to begin being played at chapter 1. The sequential media item continues to be played in this example until partially into playing chapter 2. At this point, the user inputs a second command, a "next" command. In response to the next command, the media control center operates to save the current position (associated with its offset position into chapter 2) as a virtual chapter 644, and then causes playing of the media data to jump to and proceed at the beginning of chapter 3. The playing of the media data continues playing through chapter 3 until a third user input which occurs partway through playing chapter 3. The third user input is a "back" command. The media control center receives the "back" command and causes the media playback application to jump to the beginning of chapter 3 where it would continue to play forward from that point. However, in this example, it is assumed that very soon after the third command was input, the fourth command was input which is also a "back" command. In response to the fourth command, the media control center informs the media playback application to return to the position associated with the virtual chapter, and from that point begin playing forward. Here, as illustrated in FIG. 25D, the playing begins at the virtual chapter 644. In other words, the user played a portion of the media data, skipped forward to another chapter, watched that chapter for a period of time, and then decided to return back to the position from which they originally jumped forward from. As a result, the user is effectively able to return back to the position where media data has not been played for the user. Conventionally, the user would have to return back to the beginning of one of the chapters, and as a result, would have to view media data they had already viewed.

In general, the media play process 550 or the media navigation process 600 can store and utilize more than one virtual chapter. Also, the processing could impose a minimum between chapters, so that virtual chapter would not be created until a meaningful separation is present from an existing chapter.

In an embodiment, as part of a first "back" command, the system would go to the virtual chapter mark rather than the beginning of the current chapter.

In an embodiment, in response to a "back" or "next" command, the system would present a list of choices for user selection, the list containing predetermined marks e.g. original chapter marks, and one or more virtual chapter marks, e.g. dynamically created chapter marks.

In an embodiment, the user interface is configured so that virtual chapter marks can be set without using the "next" command. For example, a "set virtual chapter mark" command would allow the user to mark a location without disrupting the flow of the movie.

It should be noted that the concept of virtual chapters is not limited to multimedia control centers and further DVD movies, and that any digital video presentation program or system can be configured with virtual chaptering.

Figure 26A:
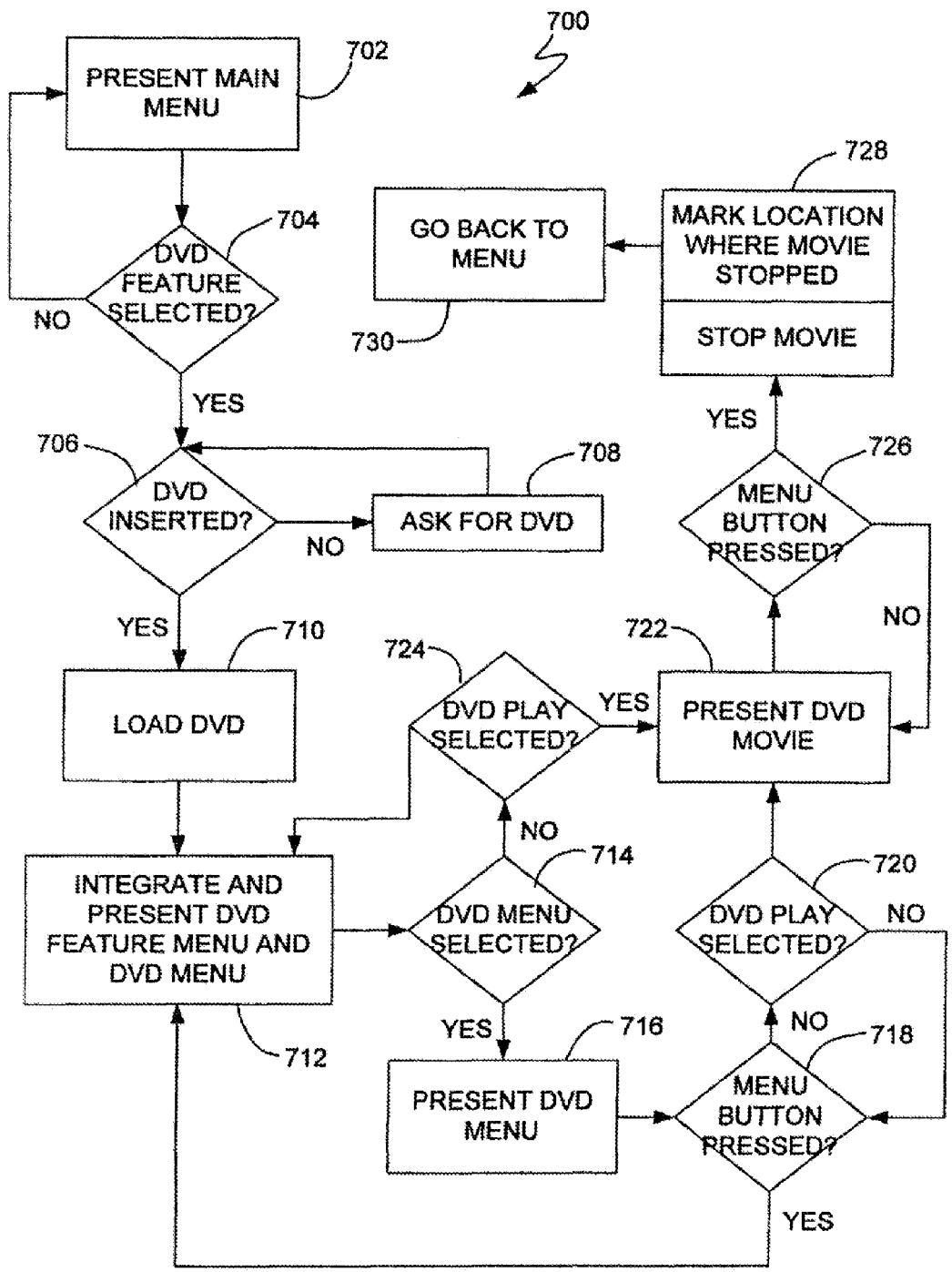
FIG. 26A is a method of operating a DVD player in conjunction with a media control center, in accordance with one embodiment of the present invention.

FIG. 26A is a method 700 of operating a DVD player, in accordance with one embodiment of the present invention. The method 700 begins at block 702 where a main menu is presented. The main menu may for example be the media carousel described in FIGS. 6 and/or 25. In this embodiment, the main menu includes at least a DVD feature. In block 704, a determination is made as to whether or not the DVD feature has been selected/activated. If it is not selected, the method remains at block 702. If selected/activated, the method proceeds to block 706 where a determination is made as to whether or not a DVD is inserted in the DVD drive. If there is no DVD, the method proceeds to block 708 where the user is prompted to insert a DVD in the DVD drive. If there is a DVD, the method proceeds to block 710 where the DVD is loaded (e.g., spins up the DVD drive and reads the DVD).

Thereafter in block 712, the DVD menu is integrated with the DVD feature menu. In particular, the DVD feature menu is placed in the foreground and the DVD menu is placed in the background. Further, the DVD menu is blurred. The DVD feature menu includes various control options including begin playing DVD, resume playing DVD, DVD menu, etc. Thereafter in block 714, a determination is made as to whether the DVD menu has been selected/activated. If selected/activated, the method proceeds to block 716 where the DVD menu is presented. This may for example include placing the DVD menu in the foreground, and more particularly focusing the DVD menu so that it is no longer blurred. Moreover, the DVD feature menu is typically removed (e.g., faded out).

Following block 716, the method proceeds to block 718 where a determination is made as to whether or not the menu button on a remote control is pressed (see FIG. 2). If the menu button has been pressed, the method proceeds back to block 712. If the menu button has not been pressed, the method proceeds to block 720 where a determination is made as to whether or not a DVD play feature has been selected/activated. For example, the user, using the remote control, traverses through the DVD control options of the DVD menu using the up/down/left/right buttons and highlights the play control and thereafter presses play/pause button on the remote control. If it has not been selected, the method proceeds back to block 718. If it has been selected/activated, the method proceeds to block 722 where a DVD is presented. For example, the DVD menu is removed and the movie is outputted on the screen.

Going back to block 714, if the DVD menu is not selected, the method proceeds to block 724 where a determination is made as to whether or not a DVD play control has been selected/activated. This may be accomplished by highlighting the Begin playing or resume playing movie option on the DVD feature menu, and thereafter pressing the play/pause button on the remote control. If the plat control is not selected, the method proceeds back to block 712. If the play control is selected/activated, the method proceeds to block 722 where the DVD movie is presented. For example, the DVD feature menu is removed and the movie is outputted on the screen. Following block 722, the method proceeds to block 726 where a determination is made as to whether or not the menu button on the remote control is pressed. If the button has not been pressed, the method continues to output the movie. If the button has been pressed, the method proceeds to block 728 where the DVD movie is stopped and the location of the movie is retained for future use.

Thereafter, in block 730, the method includes going back to a menu. In one embodiment, the method includes going back to the DVD menu. In another embodiment, the method include going back to the DVD feature menu. In yet another embodiment, the method includes making a determination as to which menu instructed the movie to play, and then going back to the menu that instructed the movie to play. For example, if the method flowed through block 724, the method includes going back to block 712, and if the method flowed through block 720, the method includes going back to block 716.

One advantage of this method is the ability to navigate both sets of menus with a single menu button on a remote control. Conventional know how would use two dedicated buttons for these two tasks. This however, would confuse the user as they would be unsure which button does what.

Figure 26B:
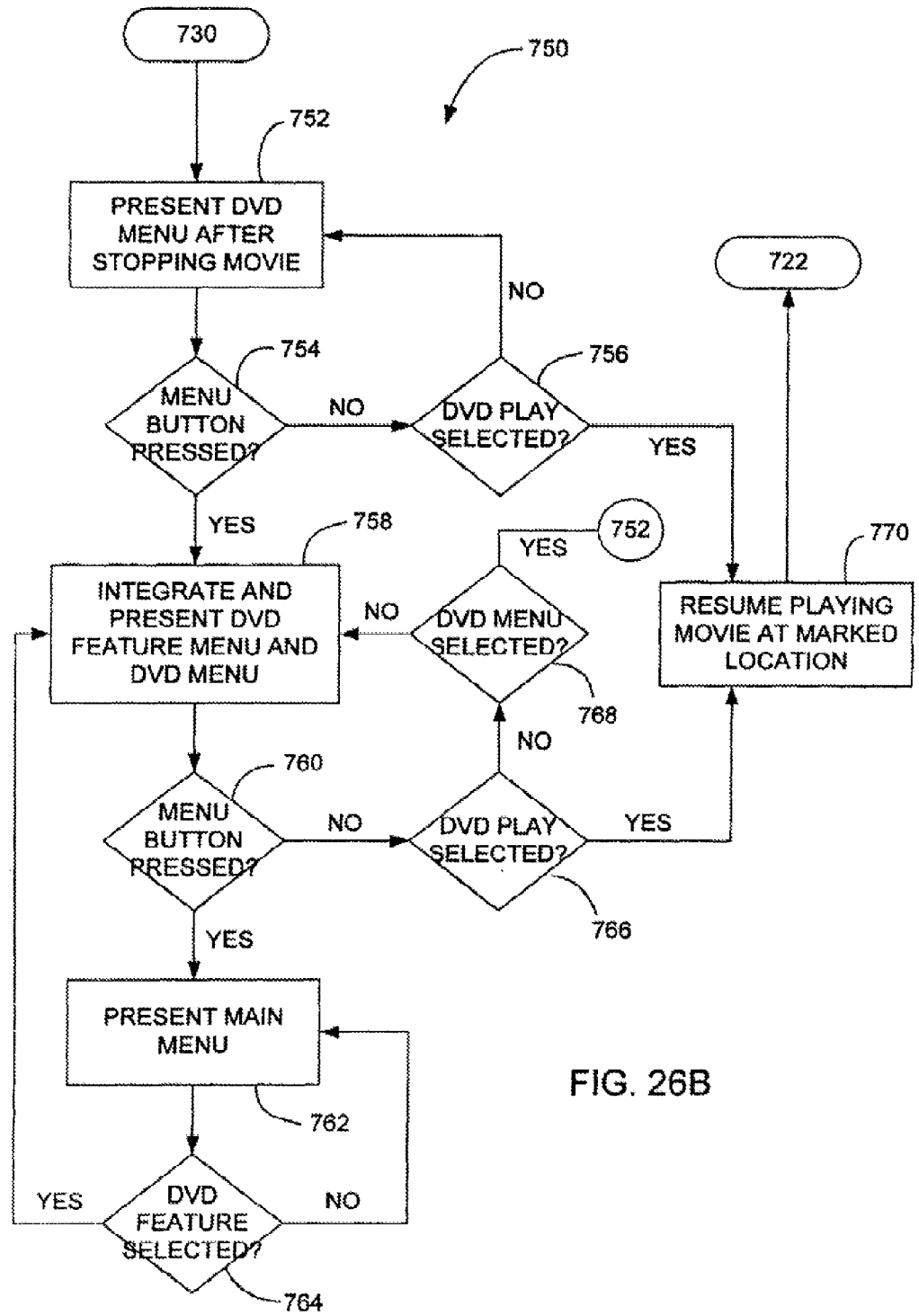
FIG. 26B is a method of operating a DVD player in conjunction with a media control center, in accordance with one embodiment of the present invention.

FIG. 26B is a method 750 of operating a DVD player, in accordance with one embodiment of the present invention. Method 750 may for example start from block 730 in FIG. 26A. In block 752, the DVD menu is presented after stopping the movie. Thereafter, in block 754, a determination is made as to whether or not the menu button on the remote control is pressed. If pressed, the method proceeds to block 758 where the DVD feature menu and DVD menu are integrated and presented. If not pressed, the method proceeds to block 756 where a determination is made as to whether or not a DVD play control has been selected/activated. If so, the method proceeds to block 770 where the movie resumes playing at the last marked location. If not, the method proceeds back to block 752.

Following block 758, the method proceeds to block 760 where a determination is made as to whether or not the menu button has been pressed. If pressed, the method proceeds to block 762 where the main menu is presented. Thereafter in block 764 a determination is made as to whether or not a DVD feature has been selected/activated. If so, the method proceeds back to block 758. If not, the method proceeds back to block 762. If the menu button is not pressed in block 760, the method proceeds to block 766 where a determination is made as to whether or not a DVD play control has been selected/activated. If so, the method proceeds to block 770 where the movie resumes playing at the last marked location. If not, the method proceeds back to block 752. If not, the method proceeds to block 768 where a determination is made as to whether or not the DVD menu has been selected. If so, the method proceeds to block 752. If not, the method proceeds back to block 758.

As should be appreciated, as shown by this method, the virtual chapter is retained in all the various menus. This includes the other media feature menus. The user therefore can resume playing the movie even if they exit the DVD menus and enter the music, photo or video menus.

GUI Examples

FIGS. 27-37 show exemplary GUIs representing various layers of a multimedia control center, in accordance with several embodiments of the present invention.

Figure 27A:
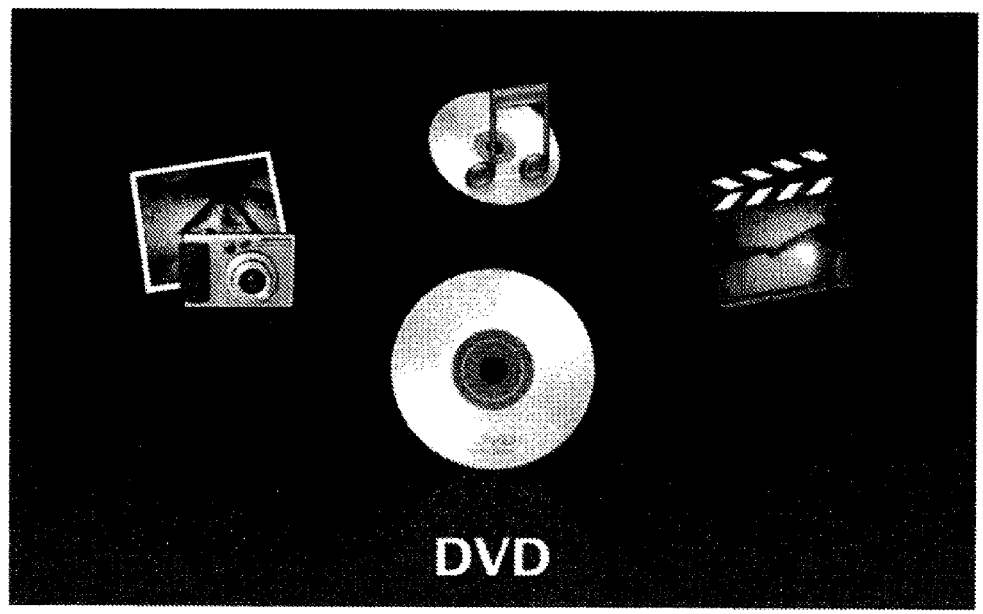
FIGS. 27A-27D are diagrams of a media carousel, in accordance with one embodiment of the present invention.
Figure 27B:
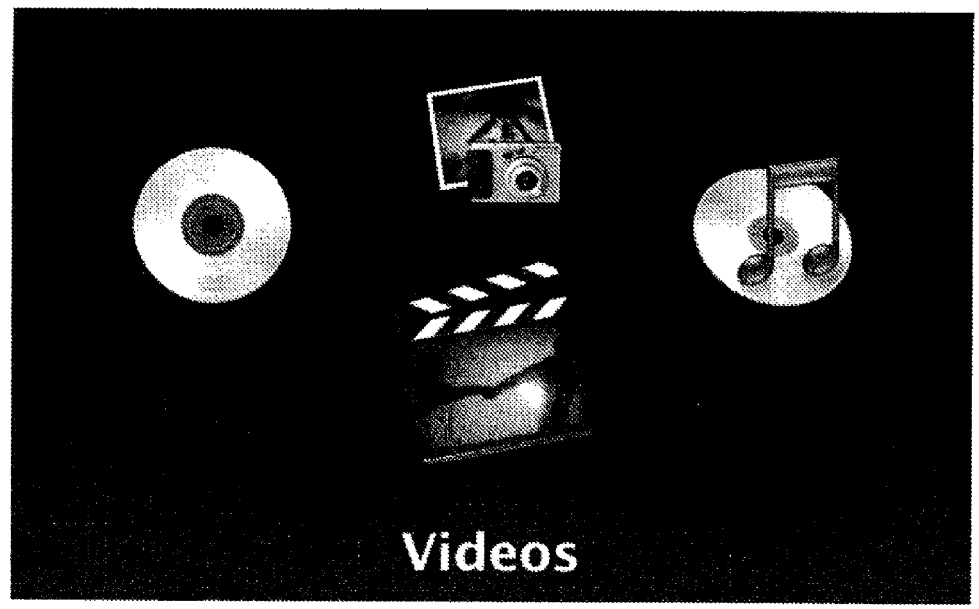
Figure 27C:
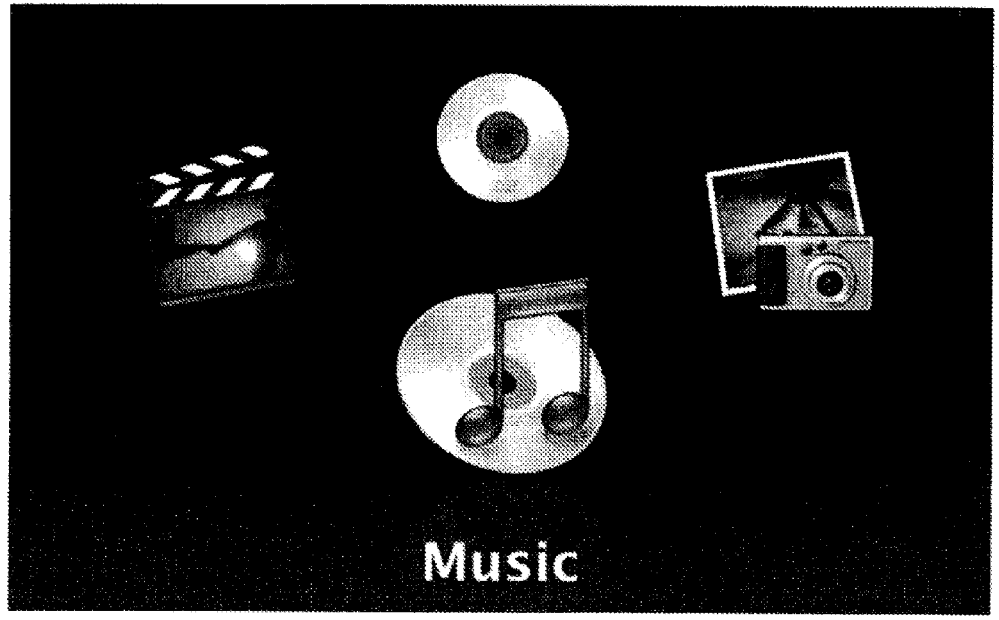
Figure 27D:
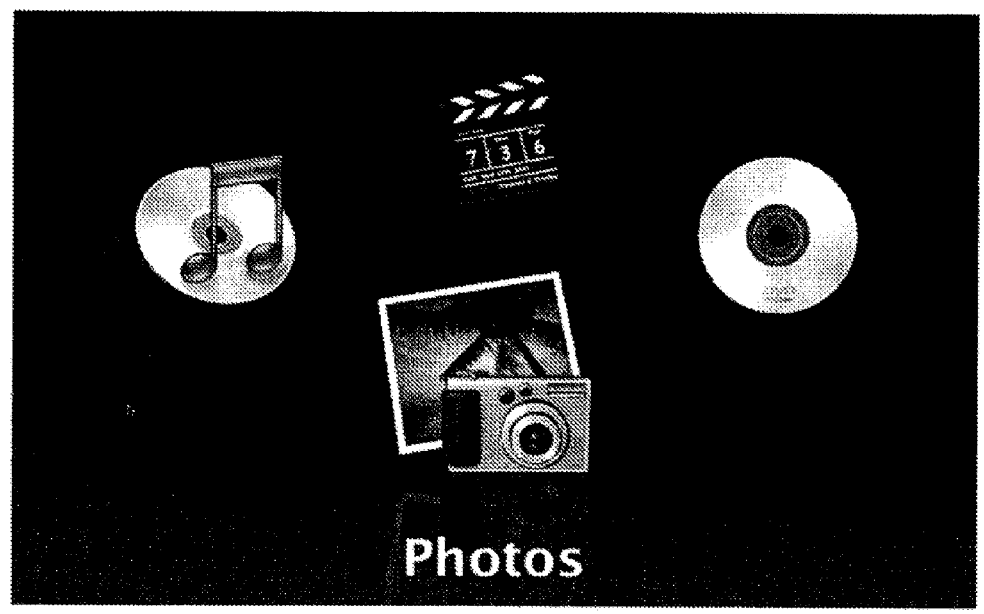
Figure 28A:
FIGS. 28A-28E are diagrams of a media carousel transitioning from an application window, in accordance with one embodiment of the present invention.
Figure 28B:
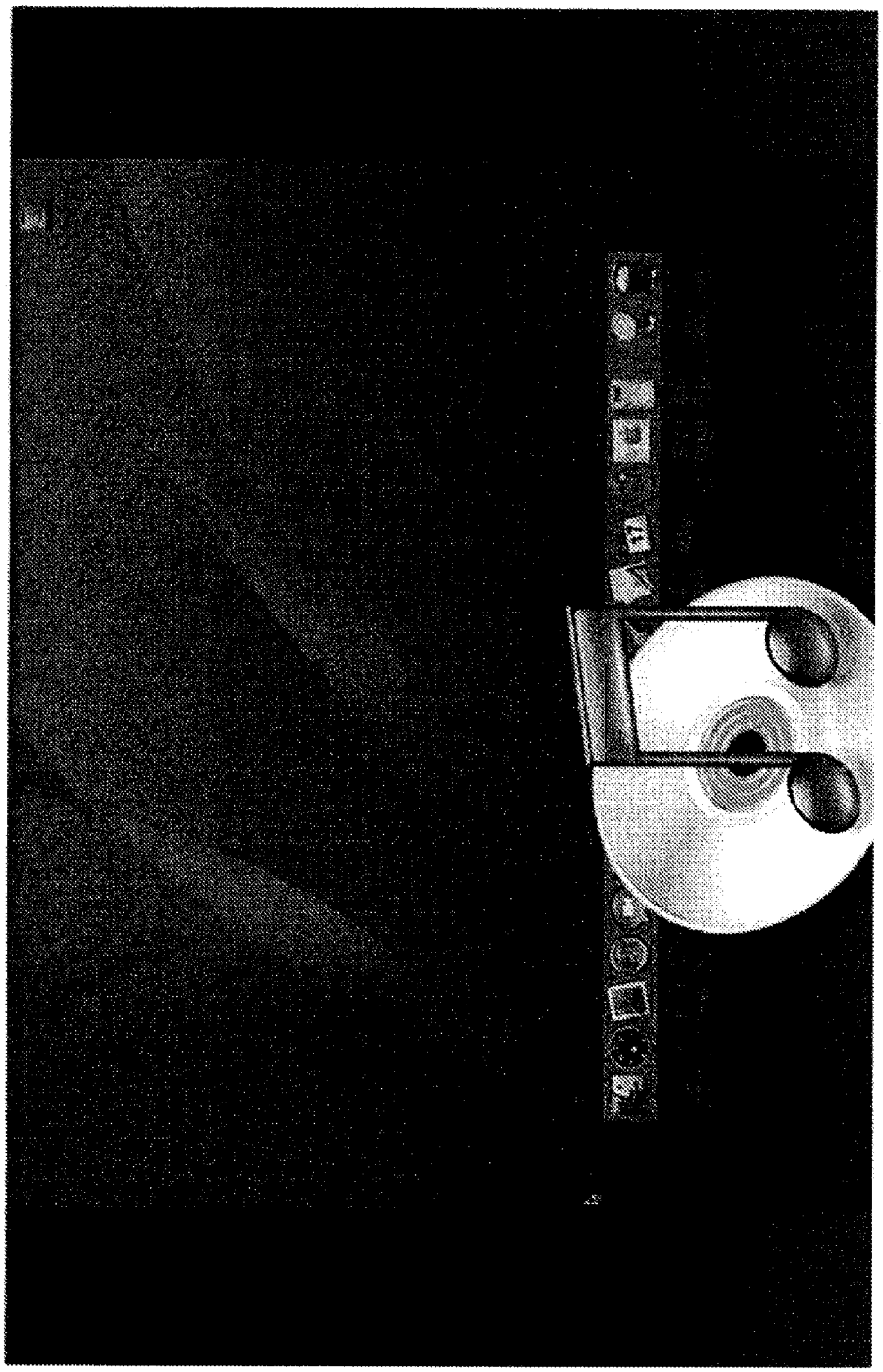
Figure 28C:
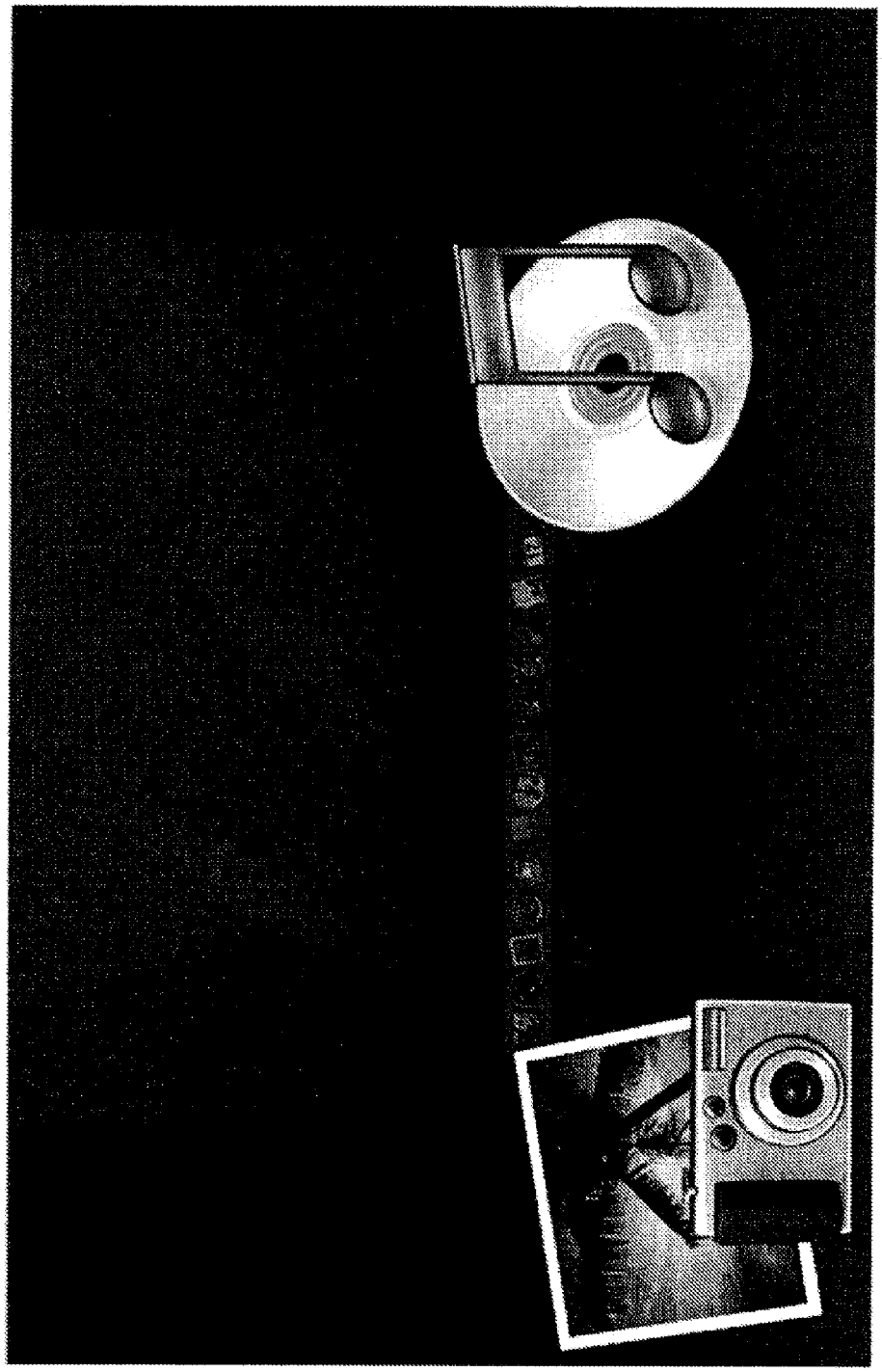
Figure 28D:
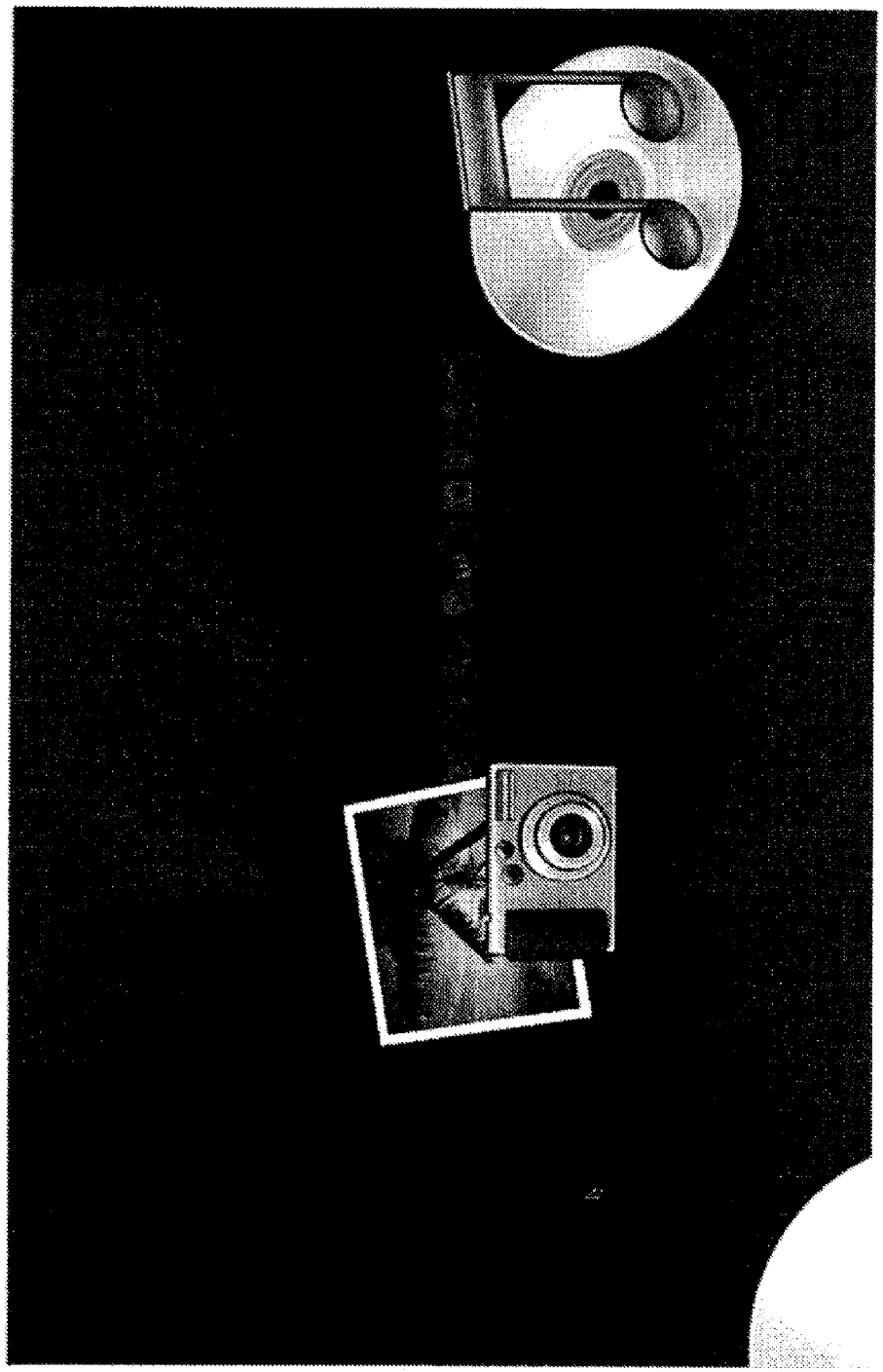
Figure 28E:
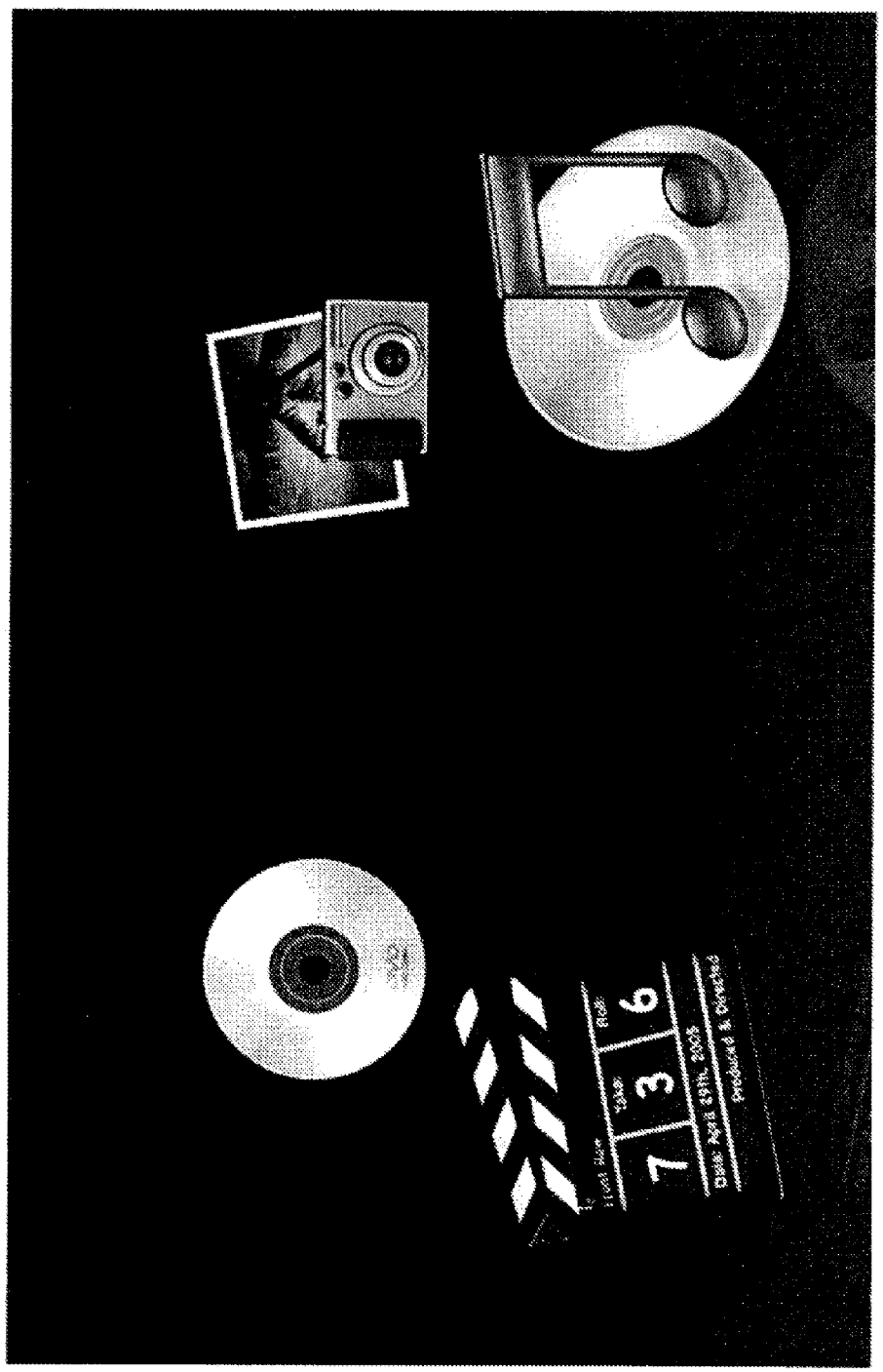

FIGS. 27A-27D are diagrams of a media carousel. The media carousel may function similarly to the media carousel described in FIG. 6. The media carousel includes four media icons including a DVD icon, a Photo icon, a Music icon, and a Video icon that rotate around an invisible path. The background is graded from darker at the top to lighter at the bottom in order to further enhance the perspective. FIG. 27A shows the DVD icon in the primary position on the path. FIG. 27B shows the Video icon in the primary position on the carousel. FIG. 27C shows the Music icon in the primary position on the carousel. FIG. 27D shows the Photo icon in the primary position on the path.

FIGS. 28A-28E are diagrams of a media carousel transitioning from an application window. The transition may function similarly to the media carousel described in FIGS. 11-12. As shown, the application window slowly disappears out of the screen while the media icons are marched into the screen one by one to the positions on the carousel.

Figure 29A:
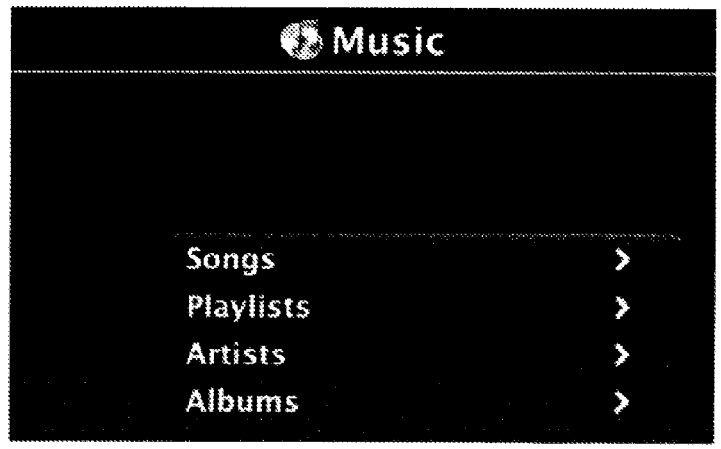
FIGS. 29A-29C are diagrams of a music feature menu, in accordance with one embodiment of the present invention.
Figure 29B:
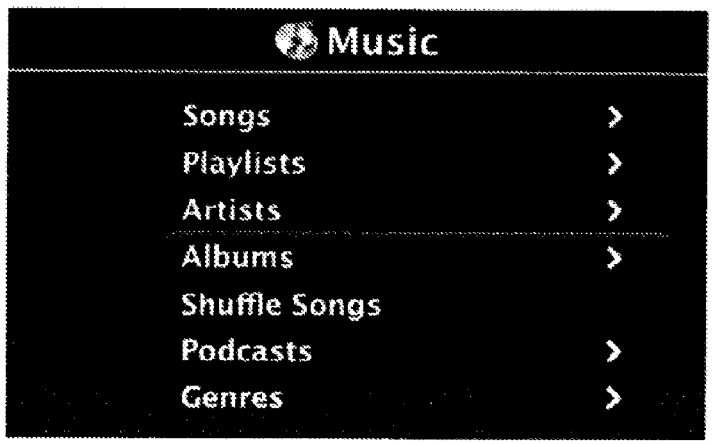
Figure 29C:
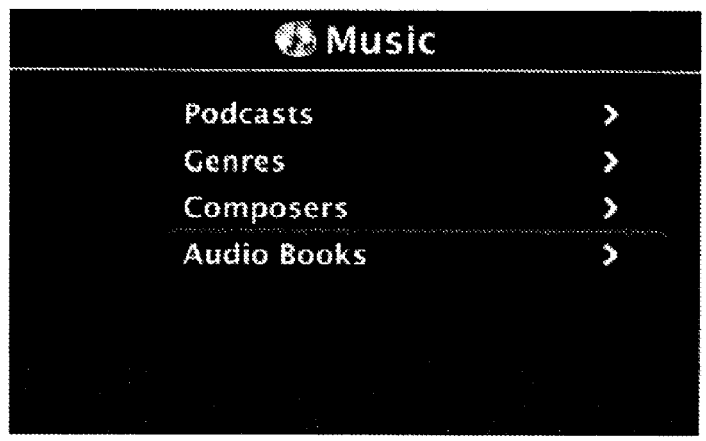

FIGS. 29A-C are diagrams of a music feature menu. The music feature menu comes into view when the music icon on the carousel is activated. Several shots are given in order to show all the media items and control options. When the highlight bar reaches the bottom item, and the screen is full of media items, the top media item moves off screen thereby allowing a new media item to move on screen.

Figure 30:
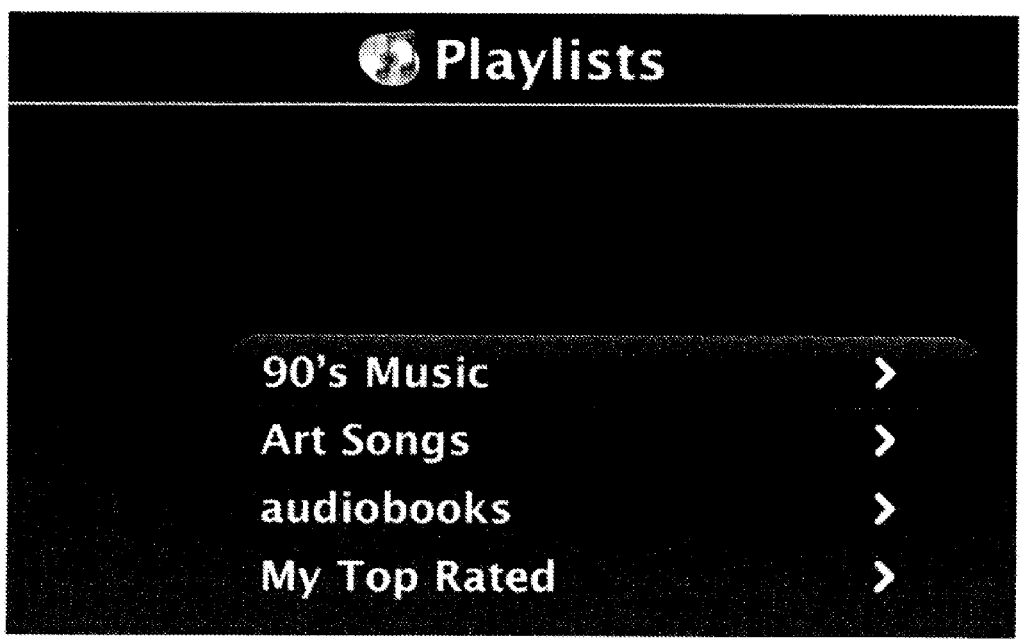
FIG. 30 is a diagram of a playlist folder, in accordance with one embodiment of the present invention.

FIG. 30 is a diagram of a playlist folder. The playlist folder comes into view when the playlist item on the music feature menu is activated. The playlist includes a list of playlists, which are a collection of pre-selected songs, and a highlight bar for traversing through the list of playlists.

Figure 31A:
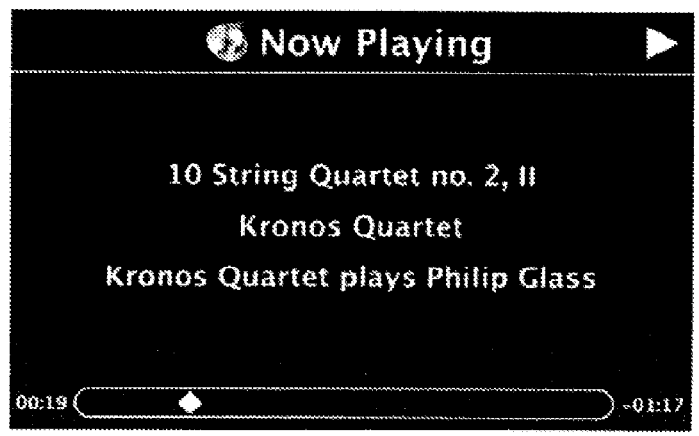
FIGS. 31A-31C are various diagrams of a now playing window, in accordance with one embodiment of the present invention.
Figure 31B:
Figure 31C:

FIGS. 31A-31C are various diagrams of a now playing window. The now playing window includes information about the song. The information may include for example song title, artist, and album title. The information may also include album art (FIGS. 31B and 31C). The now playing window may additionally include indicators associated with the song being played. FIG. 31B shows an example of a volume indicator. FIG. 31C shows an example of a playback indicator. The volume indicator may appear when prompted and disappear after a fixed amount of time (time out). The playback indicator may be present except for when the volume indicator is presented.

Figure 32:
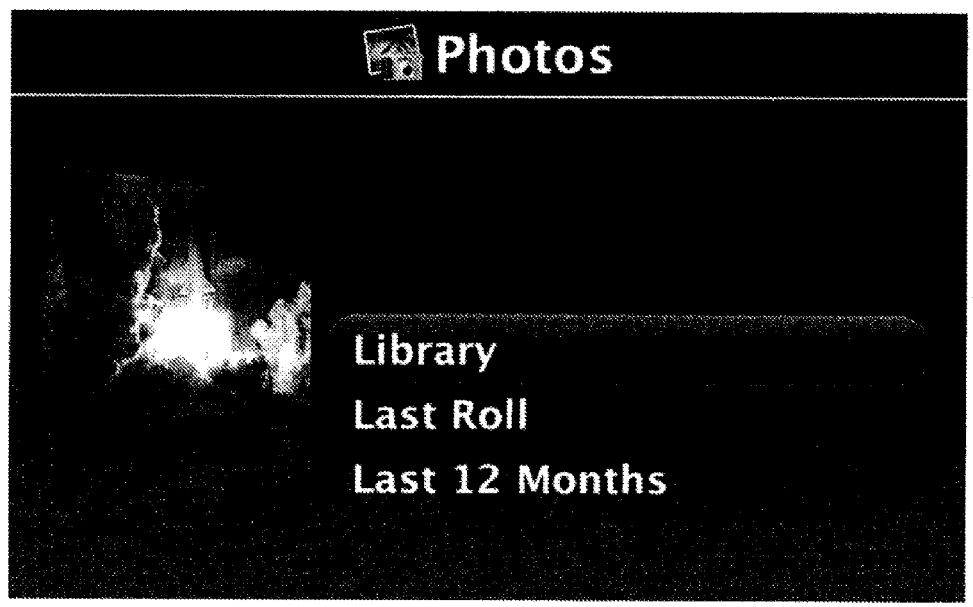
FIG. 32 is a diagram of a photo feature menu, in accordance with one embodiment of the present invention.

FIG. 32 is a diagram of a photo feature menu. The photo feature menu comes into view when the photo icon on the carousel is activated. The photo feature menu includes a list of photo folders that contain images. The folders may for example include an entire library of images (e.g., library), or collections of images from the library (e.g., last roll, last 12 months or photo albums). The photo feature menu also includes a highlight bar for traversing through the list of photo folders. When a folder is highlighted and thereafter activated the images in the folders are presented by way of a slide show via a photo management program. The photo feature menu also includes an area for outputting the images in the highlighted folder. The outputted images may include a reflection and may be skewed (as shown).

Figure 33:
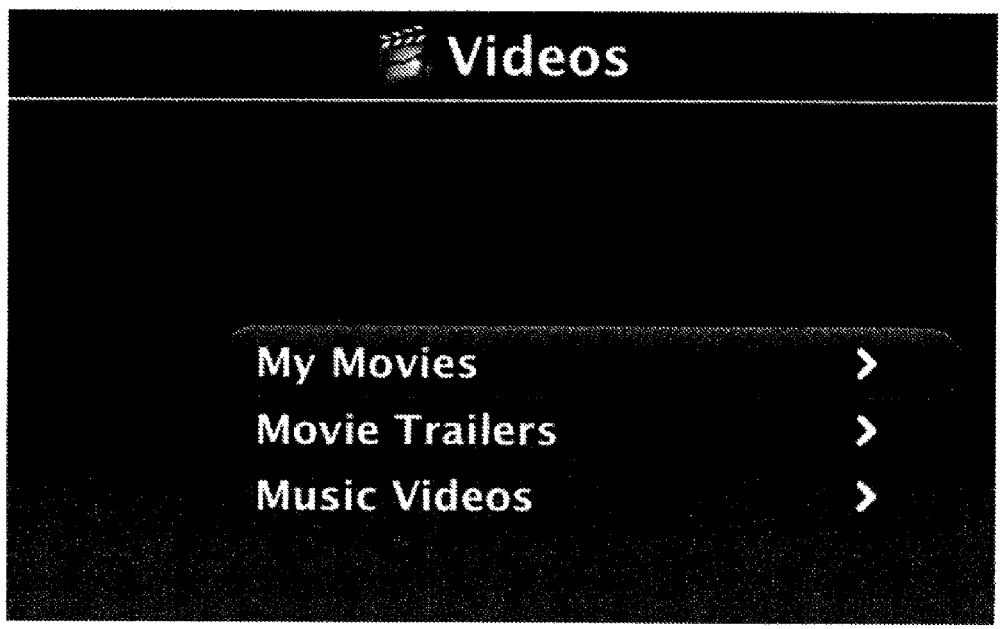
FIG. 33 is a diagram of a video feature menu, in accordance with one embodiment of the present invention.

FIG. 33 is a diagram of a video feature menu. The video feature menu comes into view when the video icon on the carousel is activated. The video feature menu includes a list of different video folders. The video folders contain a collection of videos. In the illustrated embodiment, the folders include MY MOVIES, MOVIE TRAILERS, and MUSIC VIDEOS. MY MOVIES contains downloaded and or home movies. MOVIE TRAILERS include pointers to movie trailers that may be stored locally or remotely on a network. MUSIC VIDEOS contain downloaded music videos. The GUI includes a selector bar that highlights one of the folders. During operation, the selector bar can be moved vertically from one video folder to another.

Figure 34:
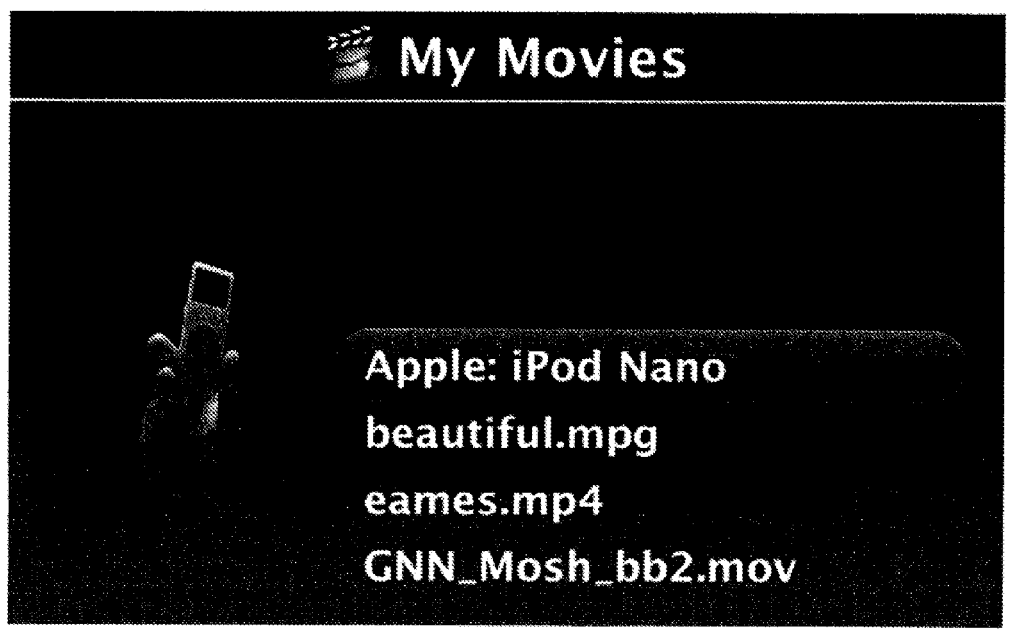
FIG. 34 is a diagram of a video folder, in accordance with one embodiment of the present invention.

FIG. 34 is a diagram of a video folder (My Movies). The video folder comes into view when the My Movies video folder of the video feature menu is activated. The video folder contains a list of video files that can be highlighted with a selector bar. The video folder also includes an area for outputting the highlighted video file. The outputted video may include a reflection and may be skewed (as shown).

Figure 35A:
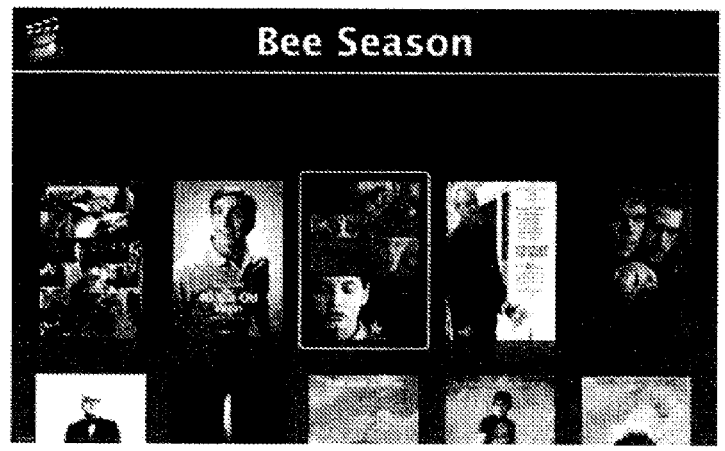
FIGS. 35A-35C are a diagram of a video folder, in accordance with one embodiment of the present invention.
Figure 35B:
Figure 35C:
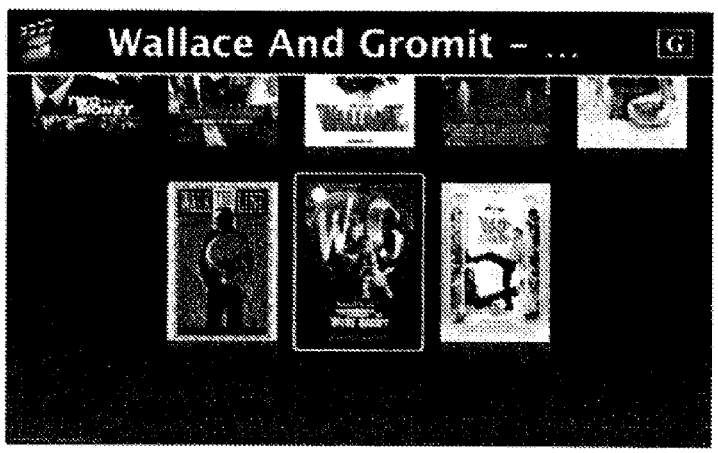

FIGS. 35A-35C are a diagram of a video folder (Movie Trailers). The video folder comes into view when the Movie Trailers video folder of the video feature menu is activated. The video folder includes a plurality of thumbnail images. Each thumbnail image represents a particular movie trailer. By way of example, the thumbnail image may be based on the movie poster. When the thumbnail image is selected and activated, a video application is launched, the movie file associated with the movie trailer is retrieved from a data store, and the movie file is played and outputted based on the video application. In one embodiment, the thumbnail images and movie files associated therewith are retrieved from a remote data store, which may for example be part of a web site. In order to select images inside the rows of thumbnail images, the video folder further includes a slider that is restrained in the center row. The slider is configured to move horizontally inside the primary row from one preset position to the other. The slider is configured to highlight the thumbnail image to be selected. That is, the highlighted thumbnail image will be the media file that is launched if an activation signal is provided.

Figure 36:
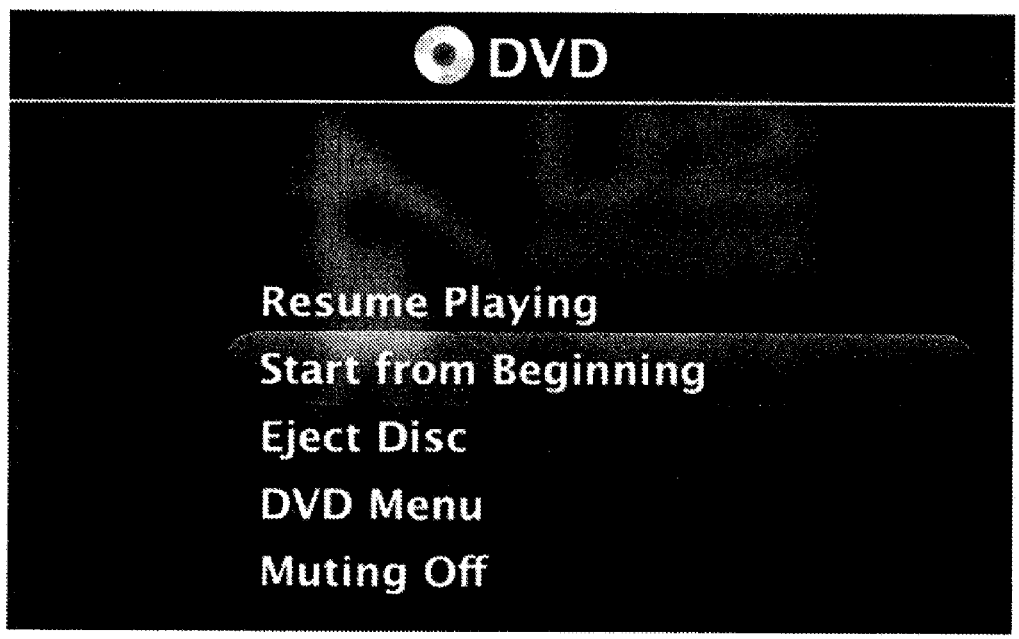
FIG. 36 is a diagram of a DVD feature menu, in accordance with one embodiment of the present invention.
Figure 37A:
Figure 37B:
Figure 37C:
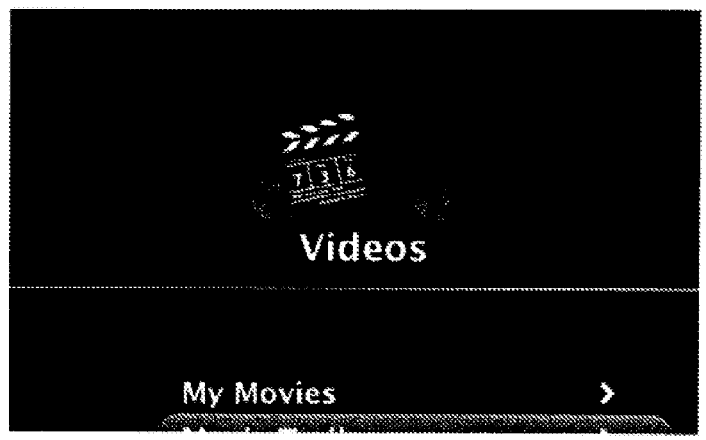
Figure 37D:
Figure 37E:

FIG. 36 is a diagram of a DVD feature menu. The DVD feature menu comes into view when the DVD icon on the carousel is activated. The DVD feature menu includes a list of different DVD control options including fro example resume playing, start from the beginning, eject disc, DVD menu and muting off. The DVD feature menu also includes a selector bar that highlights one of the control options. During operation, the selector bar can be moved vertically from one video control options to another. The DVD feature menu additionally includes the DVD menu from the DVD in the background behind the elements of the DVD feature menu. The DVD menu is also blurred.

FIG. 37A-37F is a diagram of transitioning from a media carousel to a Video feature menu. As shown in these diagrams, when a feature is selected/activated, the media icon and media label in the primary position moves upward. The media icon also shrinks and moves to the side of the media label. In addition, a list of media items is brought into view from the bottom of screen. The list of media items follows the media label and media icon upwards. A line is also brought into view and moved upwards just underneath the media label and media icon. This forms the header of the Video feature menu.

Although not shown in the Figures, the GUIs may additionally include a song folder. The song folder comes into view when the song item on the music feature menu or one of the playlist items in the playlist folder is activated. The song folder includes a list of songs and a highlight bar for traversing through the list of songs. When a song is highlighted and thereafter activated the song is played by a music management program and a now playing window is brought into view on the screen.

While this invention has been described in terms of several preferred embodiments, there are alterations, permutations, and equivalents, which fall within the scope of this invention. For example, although the invention was primarily described as being controlled with a remote control, it should be understood that this is not a limitation and that other input means of a computer system may be used (e.g., keyboard, touch screen, etc.). In addition, although several examples of introducing media items onto a screen were given, it should be noted that other paths may be followed including for example paths that make multiple passes around the carousel before finally ending up on the carousel, or paths that connect the left bottom corner to the leftmost secondary position of the media carousel (or vice versa). Other examples include paths that start at different sides and end at different icon positions. It should also be noted that any of the paths given may be rotated or flipped (horizontally, vertically, etc.) in order to arrive at different entries. Moreover, the media icons may be moved about an axis as they moved along the path (e.g., do not have to stay upright) in one example, the media icons may spin or vibrate as they travel along the path.

It should also be noted that there are many alternative ways of implementing the methods and apparatuses of the present invention. For example, in conjunction with the media carousel, the media items may not be assigned primary and secondary positions such that items can be highlighted and selected while at any position in the carousel. In addition, in conjunction with the slider mentioned in FIGS. 17A-17E, the slider may be configured to traverse rows and columns in a vertical, horizontal, diagonal and/or other direction (rather than just a horizontal direction).

It is therefore intended that the following appended claims be interpreted as including all such alterations, permutations, and equivalents as fall within the true spirit and scope of the present invention.

The invention claimed is:

1. A menu associated with a media control center, said menu comprising:
   a plurality of media items arranged in a list, at least some of the media items having viewable media content associated therewith;
   a movable selector feature capable of traversing through the list of media items so as to highlight one of the media items; and
   a view region displaying:
      viewable media content associated with a highlighted media item, the viewable media content comprising at least a representative image; and
      a reflection that continuously mirrors the viewable media content.

2. The menu as recited in claim 1 wherein the viewable media content is skewed in the view region.

3. The menu as recited in claim 1 wherein the viewable media content is a single image.

4. The menu as recited in claim 1 wherein the viewable media content is a collection of images, and wherein the images are continuously presented one after the other while the media item is highlighted.

5. The menu as recited in claim 1 wherein the viewable media content is video, and wherein the video is continuously presented while the media item is highlighted.

6. A method of operating a menu of a media control center, said method comprising:
   providing a plurality of media items, each media item having viewable media content associated therewith, the viewable media content comprising at least a representative image;
   presenting the media items in a list and including a movable selector feature capable of traversing through the list so as to highlight one of the media items; and
   when a media item is highlighted:
      presenting the viewable media content associated with the highlighted media item next to the list of media items;
      transforming the viewable media content associated with the highlighted media item; and
      displaying the transformed viewable media content.

7. The menu as recited in claim 6 further comprising:
   launching the viewable media content when the highlighted media item is activated.

8. The menu as recited in claim 6 wherein:
   the step of presenting the viewable media content includes:
      retrieving the viewable media content;
      playing the viewable media content; and wherein:
   transforming the viewable media content associated with the highlighted media item transforms individual segments of the viewable media content as the viewable media content is played.

9. The menu as recited in claim 8 wherein the step of transforming the viewable media content includes one or more of the following:
   resizing the viewable media content to fit inside a desired area;
   reconfiguring the viewable media content into another shape; or
   generating a reflected version of the viewable media content and combining the reflected version with the actual viewable media content.

10. The menu as recited in claim 8 wherein the step of transforming comprises:
    receiving an input image of the viewable media content;
    varying the darkness of the input image from lighter to darker from the middle to right edge of the input image;
    making a copy of the darkened input image;
    flipping the copied input image upside down;
    cropping the flipped input image;
    varying the transparency of the cropped input image from partially transparent to fully transparent from the top edge to bottom edge of the input image;
    combining the transparent input image with the darkened input image, the top edge of the transparent image being attached to the bottom edge of the darkened input image; and
    skewing the combined input image by lowering the right upper corner of the combined image and raising the right bottom corner of the combined image.

11. The menu as recited in claim 6 wherein the step of transforming comprises reflecting and skewing the viewable media content.

12. The menu as recited in claim 6 wherein the step of transforming comprises:
    receiving an input image of the viewable media content;
    varying the darkness of the input image from lighter to darker from the middle to right edge of the input image;
    copying of the darkened input image;
    flipping the copied input image upside down;
    cropping the flipped input image;
    varying the transparency of the cropped input image from partially transparent to fully transparent from the top edge to bottom edge of the input image;
    combining the transparent input image with the darkened input image, the top edge of the transparent image being attached to the bottom edge of the darkened input image; and
    skewing the combined input image by lowering the right upper corner of the combined image and raising the right bottom corner of the combined image.

13. The menu as recited in claim 6 wherein the step of transforming comprises:
    receiving an input image of the viewable media content;
    copying of the input image;
    flipping the copied input image upside down;
    cropping the flipped input image; and
    combining the flipped input image with the input image, the top edge of the flipped image being attached to the bottom edge of the input image.

* * * * *

UNITED STATES PATENT AND TRADEMARK OFFICE
CERTIFICATE OF CORRECTION

| | | |
|---|---|---|
| PATENT NO. | : 8,621,393 B2 | Page 1 of 1 |
| APPLICATION NO. | : 13/134245 | |
| DATED | : December 31, 2013 | |
| INVENTOR(S) | : Chaudhri et al. | |

It is certified that error appears in the above-identified patent and that said Letters Patent is hereby corrected as shown below:

On the title page, in column 1, under item "(75) Inventors", line 8, delete "Fabrick," and insert --Fabrick--, therefor Signed and Sealed this
Third Day of June, 2014

Michelle K. Lee
*Deputy Director of the United States Patent and Trademark Office*